United States Patent
Biederman et al.

(10) Patent No.: US 10,848,430 B2
(45) Date of Patent: Nov. 24, 2020

(54) FLEXIBLE PACKET PROCESSING

(71) Applicant: Intel Corporation, Santa Clara, CA (US)

(72) Inventors: Dan Biederman, Saratoga, CA (US); Michael Orr, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/396,266

(22) Filed: Dec. 30, 2016

(65) Prior Publication Data

US 2018/0191631 A1 Jul. 5, 2018

(51) Int. Cl.
*H04L 12/865* (2013.01)
*H04L 29/08* (2006.01)
*H04L 29/06* (2006.01)
*H04L 12/861* (2013.01)

(52) U.S. Cl.
CPC ...... *H04L 47/6275* (2013.01); *H04L 67/2842* (2013.01); *H04L 69/22* (2013.01); *H04L 49/9089* (2013.01)

(58) Field of Classification Search
CPC .......................... H04L 47/6275; G06F 9/4881
See application file for complete search history.

(56) References Cited

U.S. PATENT DOCUMENTS

| | | | |
|---|---|---|---|
| 6,907,041 B1 * | 6/2005 | Turner | H04L 12/5601 370/388 |
| 2007/0061433 A1 * | 3/2007 | Reynolds | H04L 41/0806 709/223 |
| 2009/0135751 A1 | 5/2009 | Hodges et al. | |
| 2011/0268119 A1 | 11/2011 | Pong et al. | |
| 2013/0053151 A1 | 2/2013 | Sohn et al. | |
| 2014/0215047 A1 | 7/2014 | Li et al. | |
| 2015/0138976 A1 | 5/2015 | Lu et al. | |
| 2015/0347185 A1 * | 12/2015 | Holt | H04L 49/00 718/102 |
| 2015/0372860 A1 * | 12/2015 | Anand | H04L 69/22 370/465 |
| 2016/0085577 A1 | 3/2016 | Gray | |
| 2016/0379686 A1 * | 12/2016 | Burger | G06F 3/0604 711/170 |

OTHER PUBLICATIONS

"International Application Serial No. PCT US2017 063449, International Search Report dated Mar. 6, 2018", 3 pgs.
"International Application Serial No. PCT US2017 063449, Written Opinion dated Mar. 6, 2018", 8 pgs.

* cited by examiner

*Primary Examiner* — Shukri Taha
(74) *Attorney, Agent, or Firm* — Schwegman Lundberg & Woessner, P.A.

(57) ABSTRACT

Various systems and methods for implementing a flexible packet processing mechanism are provided herein. A network interface device for implementing flexible packet processing includes a packet parser to: receive a packet; and determine from analyzing the packet, a corresponding processing element that is used to process the packet; and a coordinator circuit to: determine whether the processing element is active in a computing unit; load the processing element when it is not active; and forward the packet to the processing element.

22 Claims, 16 Drawing Sheets

FLEXIBLE PACKET PROCESSING

TECHNICAL FIELD

Embodiments described herein generally relate to data communication systems and in particular to a flexible packet processing mechanism.

BACKGROUND

Currently, network cards receive data packets and pass them on to a computing device for processing. As network use grows and additional systems come online to serve more data to more end users, data communication services need to become faster and more efficient. At the network card level, effective packet processing is needed to increase throughput in a network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
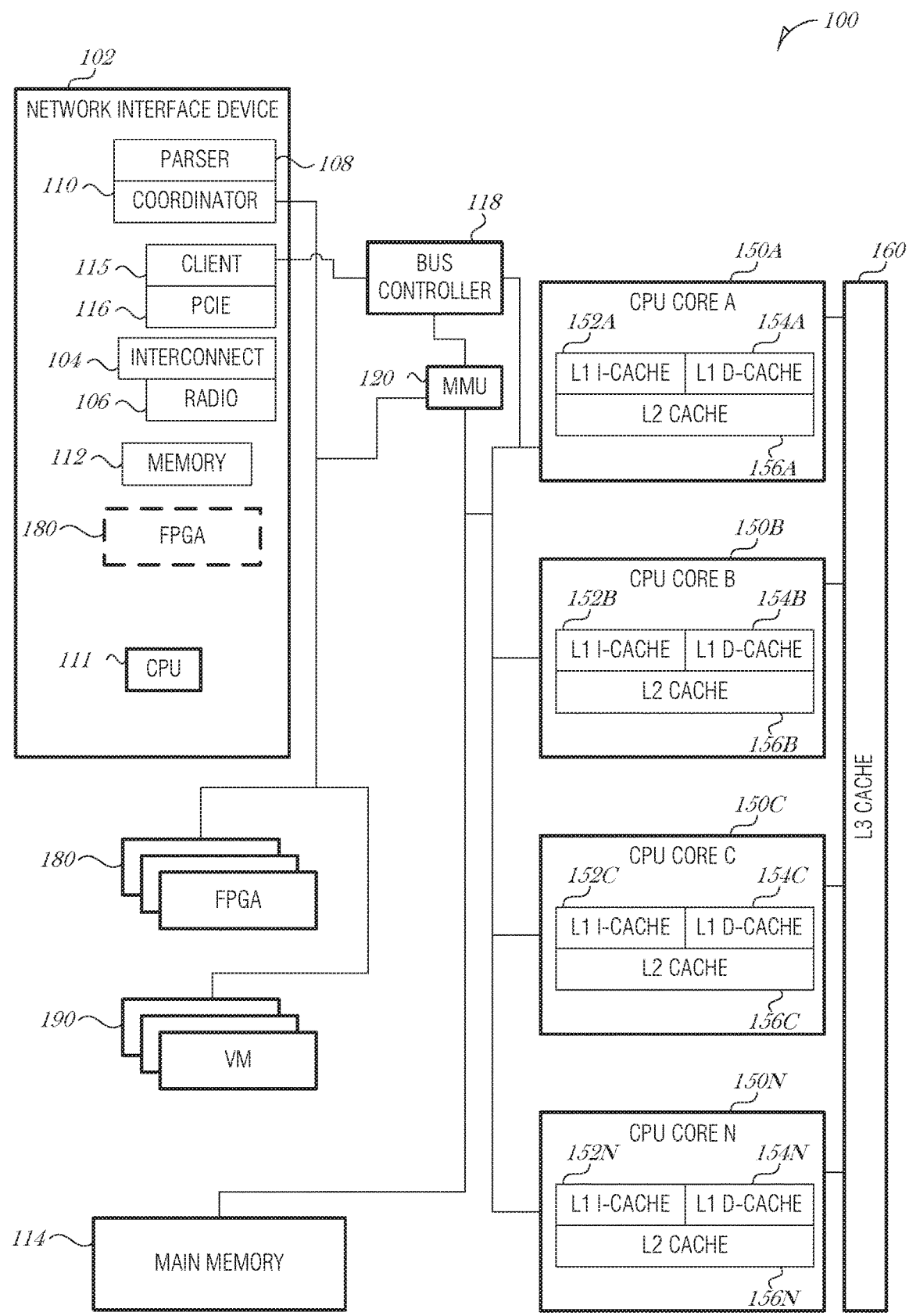
FIG. 1 is a schematic diagram illustrating an operating environment 100, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Various parameters and conditions may affect the performance of packet processing. For example, central processing unit (CPU) speed and utilization, interrupt overhead, bus bandwidth, memory latency, and I/O latency may affect the performance of packet processing applications. Some examples of CPU overhead that affects packet processing include overhead involved with memory allocation and deallocation for each packet, copying data between kernel and user-space, expensive cache misses, and per-packet system calls.

By offloading some tasks from the CPU to a network interface device (NID), overall packet processing speed may be increased and streamlined. The NID may be used as a centralized controller to handle packets and route them to the CPU, co-processors, application-specific integrated circuits (ASICs), or field-programmable gate arrays (FPGAs).

A network interface device (NID) may be, but is not limited to a network interface card, network interface controller, network adapter, physical network interface, or local-area network (LAN) adapter. The NID may be a module in the same ASIC or a neighboring ASIC die in a system-on-chip (SoC). In general, a NID includes electronic circuitry to support the data link layer with a physical device at the physical layer. The NID may provide for communication over various channels and protocols, including Ethernet, Cellular (3G, 4G, 5G, LTE, etc.) WiFi, Omnipath, Fiber Channel, etc.

Programmable GPUs may act as co-processors by receiving code, data, and commands from the host CPU or from the NID. Recent efforts in GPU development have been directed to increasing parallelism. As such, GPUs today may have hundreds or thousands cores. Together, the large number of cores in a GPU may provide greater throughput than the single CPU core for many types of highly parallel tasks. GPU usefulness may be enhanced by launching multiple threads per GPU core to provide high thread-level parallelism. By using high thread-level parallelism, a GPU may reduce apparent memory access latency by executing a considerable number of threads. Accordingly, some embodiments described herein take advantage of the high thread-level parallelism capability of GPUs to perform packet processing functions to reduce or eliminate at least one source of system bottleneck and slowdown.

ASICs and FPGAs may also be used as co-processors for the host CPU or for the NID, for specific processing needs. Multiple ASICs may be incorporated into a host design with each ASIC designed for a specific use, such as voice analysis, image analysis, machine learning, encryption, and the like. Similarly, an FPGA is an integrated circuit that may be configured after manufacturing for a specific use. FPGAs may be configurable and re-configurable at run time, so that the FPGA is able to reconfigure itself to suit the task at hand. ASICS and FPGAs may be used for a wide array of tasks including analog-to-digital converters (ADC), digital-to-analog converters (DAC), encryption/decryption, data compression, networking offloads (e.g., parsing, encapsulation, forwarding, network traffic management, look-ups, etc.), and the like.

For the purposes of the present disclosure, the term "processing element" refers to constructs able to process data, such as processes, threads, virtual machines, and FPGA programs.

For the purposes of this disclosure, a "computing unit" includes any physical component, or logical arrangement of physical components, capable of processing some or all of a network packet. Example computing units include, but are not limited to a CPU, a core, a CPU complex, a server complex, an FPGA, an ASIC, a graphics processing unit (GPU), or other co-processors.

Thus, with this arrangement, the NID with built-in computing units and processing elements and a close-cooperation interface with the host, the NID is able to use knowledge about various conditions in the environment (e.g., both the state of the NID itself and state of the host) to make either its own work on the packet or the work of the host on the packet when it will be forwarded, more efficient, more effective, or more comprehensive. Additionally, the NID is able to affect the environment, either its own environment (e.g., on-NID) or the host's environment, to make packet processing better.

In general, the NID receives a packet or packets over some L1/L2 interface, and uses a (possibly stateful) parser to decide what the next operation is for the packet, where "stateful" may rely on current or historical saved state metadata. The NID may perform on-NID processing using on-NID computing units, such as ASICs, FPGAs, or the like, and processing elements, such as FPGA programs, VMs, or the like. The NID is able to 1) do things related to the packet, such as encapsulate/decapsulate, en/decrypt, add/remove headers, aggregate/split, add timestamps, etc.; and 2) do things related to the state of the packet, such as save/update metadata, change internal or system configurations to handle packet processing, query/use stored metadata, query/use current or historical state of NID or system, request/schedule NID, and system-level state changes (e.g., pre-load caches, load FPGA code in either on-NID FPGA or host FPGA, or both, etc.).

The present disclosure is arranged as:
1. Overview of system architecture and operating environment
2. Packet processing mechanisms
   a. Packet queue prioritization based on environmental state
   b. Packet queue prioritization based on time-division multiplexing
3. Active management of processing elements in the environment
   a. Pre-loading programs/instructions into processing element to prepare the processing element to act on a packet
   b. Prioritization of programs/instructions to load based on metadata
4. Batch processing using prioritization, pre-loading, and other mechanisms.
5. Additional embodiments
   a. Software Defined Networking
   b. Network Function Virtualization
   c. OpenVswitch and Enhanced Berkeley Packet Filter
   d. Internet of Things
   e. Data Center Application
   f. Serializer-Deserializer (SERDES) and Other Components
   g. Data Plane Development Kit Disclosed herein are systems and methods that provide packet processing efficiencies through coordination and integration between a NID and a CPU core, an FPGA, or other processing structure (e.g., an ASIC, a GPU, a co-processor, or a virtual machine (VM)).

1. Overview of System Architecture and Operating Environment

FIG. 1 is a schematic diagram illustrating an operating environment 100, according to an embodiment. The operating environment 100 may be a server computer, desktop computer, laptop, wearable device, hybrid device, onboard vehicle system, network switch, network router, or other compute device capable of receiving and processing network traffic. The operating environment 100 includes a network interface device (NID) 102. NID 102 includes electronic circuitry to support the data link layer with the physical layer. In particular, the NID 102 is able to receive data using an interconnect 104 or radio 106. The interconnect 104 is arranged to accept signals over a physical media, where the signals are arranged into some supported L2 framing, and interpret the incoming signal stream as a stream of bits organized into L2 units called "frames." The interconnect 104 may be an Ethernet port, for example. Other types of communication interfaces may be supported by NID 102, such as Gigabit Ethernet, ATM, HSSI, POS, FDDI, FTTH, and the like. In these cases, appropriate ports may be provided in the NID architecture. The radio 106 is able to send and receive radio frequency (RF) data and is used to communicate over wireless protocols, such as WiFi, Bluetooth, Zigbee, cellular communications, and the like.

The NID 102 includes a packet parser 108 and a coordinator circuit 110. Either or both of the packet parser 108 and the coordinator circuit 110 may be implemented using an on-NID CPU 111, an ASIC, an FPGA 180, or other type of computing unit on the NID. The packet parser 108 and the coordinator circuit 110 may use NID memory 112 or main memory 114 for various operations such as queuing packets, saving state data, storing historical data, supporting a neural network, or the like.

The NID 102 may communicate with the cores 150A-N, main memory 114, or other portions of operating environment 100 via a suitable interconnect channel, such as Peripheral Component Interconnect Express (PCIe) connector 116. PCIe connector 116 may be of any width (e.g., x1, x4, x12, x16, or x32). Other interconnect channels include Intel On-Chip System Fabric (IOSF) and QuickPath Interconnect (QPI).

The operating environment 100 also includes central processing unit (CPU) cores 150A, 150B, 150C, and 150N (collectively referred to as 150A-N). Although four cores are illustrated in FIG. 1, it is understood that more or fewer cores may exist in particular CPU architectures. Additionally, there may be multiple CPUs logically grouped together to create a CPU complex. Mechanisms described herein may be used for a single-core CPU, a multi-core CPU, or multiple CPUs acting in concert.

The NID 102 may communicate with cores 150A-N over a bus, such as a PCIe bus. A PCIe client 115 controls the bus and the PCIe connector 116 in the NID 102 that interfaces with a bus controller 118. The PCIe client 115 may perform additional functions, such as controlling allocation of internal resources to virtual domains, support various forms of I/O virtualization (e.g., single root input/output virtualization (SR-IOV)), and other functions. The PCIe bus controller 118 may be incorporated into the same die that includes the cores 150A-N. A platform controller hub may include the PCIe bus controller 118, memory management unit (MMU)

120, Serial ATA controllers, Universal Serial Bus (USB) controllers, clock controller, trusted platform module (TPM), serial-peripheral interface (SPI), and other components in the processor die.

Modern processor architectures have multiple levels in the cache hierarchy before going to main memory. In many designs the outermost level of cache is shared by all cores on the same physical chip (e.g., in the same package) while the innermost cache levels are per core.

In the example illustrated in FIG. 1, each CPU core 150A-N includes a corresponding L cache, separated into an L1 instruction cache 152A, 152B, 152C, 152N (collectively referred to as 152A-N) and an L1 data cache 154A, 154B, 154C, 154N (collectively referred to as 154A-N). The cores 150A-N also each include an L2 cache 156A. 156B, 156C, 156N (collectively referred to as 156A-N). The size of the L1 caches and L2 caches vary depending on the processor design. Conventional sizes range from 32 KB to 64 KB for L1 cache size (e.g., 16 KB instruction and 16 KB data, or 32 KB instruction and 32 KB data), and 256 KB to 512 KB for L2 cache size. L3 cache size may vary from 8 MB to 12 MB or more.

When data is successfully found in the cache, it is called a "cache hit." Cache is very fast memory and the data pathways for the innermost levels of cache are optimized for fast data throughput. Even so, when a cache hit occurs, data in L1 cache (e.g., cache 152A) may take a few processor cycles to access, data in L2 cache (e.g., cache 156A) may take ten or more cycles to access, and data in L3 cache (e.g., cache 160) may take fifty or more cycles. If there is a cache miss, such that the processor has to go to main memory to obtain the data or instruction, the operation may take hundreds of cycles. Thus a cache miss is very computationally costly.

In order to increase communication efficiency and efficacy, the NID 102 may process network packets in a manner to assist the cores 150A-N and avoid cache misses or increase cache hits. Example processes are described herein.

In other embodiments, the operating environment 100 includes one or more FPGAs 180. The FPGAs 180 may exist on-NID or in the host. The coordinator circuit 110 may interface with an FPGA 180 to determine its status, request a reconfiguration (or partial reconfiguration), or provide data for the FPGA 180 to act upon. A partial reconfiguration is when a smaller portion of the FPGA 180 is reconfigured, as opposed to the entire FPGA 180. The NID 102 may act as a co-processor or assistant to the FPGA 180. When a packet arrives at the NID 102 that the FPGA 180 is able to process, then it is referred to as a "FPGA hit" in a manner similar to a cache hit. Conversely, if a packet arrives and the FPGA 180 is not configured to handle the packet and needs to be reconfigured, this may be referred to as an "FPGA miss." The coordinator circuit 110 may interface with one or more FPGAs 180 to reduce FPGA misses or increase FPGA hits. Example processes are described herein.

In other embodiments, the operating environment 100 includes one or more virtual machines (VMs) 190. VM 190 includes "Containers" and "VM-Containers" and other similar virtualization "guest" constructs. VMs 190 may be executed on a CPU core 150A-N, on-NID CPU 111, or elsewhere. The coordinator circuit 110 may interface with a VM 190 to determine its status, request a reconfiguration, or provide data for the VM 190 to act upon. In an analogous manner, the VMs 190 may be rotated periodically or on demand. When a packet arrives at the NID 102 that a VM 190 is able to process, then it may be referred to as a "VM hit" and conversely, a "VM miss" is where the packet is unable to be immediately processed because a corresponding VM 190 is not loaded. The NID 102 may act as a co-processor or assistant to the VM 190 to reduce VM misses or increase VM hits. Example processes are described herein.

Figure 2:
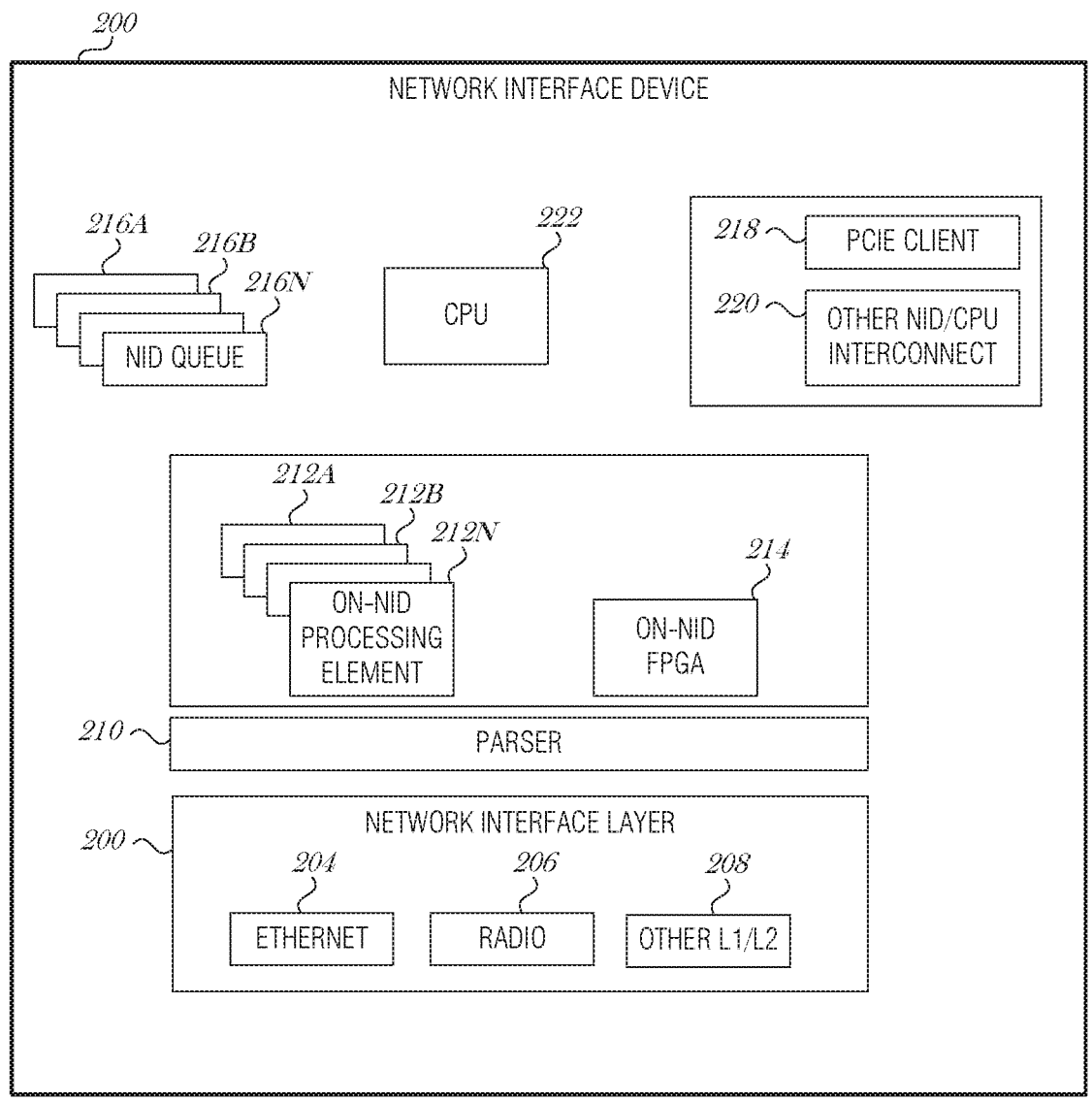
FIG. 2 is a is a schematic diagram illustrating a NID, according to an embodiment.

FIG. 2 is a schematic diagram illustrating a NID 200, according to an embodiment. The NID 200 includes a network interface layer 202, which includes an Ethernet interface 204, a radio 206, and possibly other L1/L2 interfaces 208. A parser 210 receives data from the network interface layer 202 and also is configured to transmit data out through the network interface layer 202. The parser 210 may provide functionality of both the parser 108 and coordinator circuit 110 of FIG. 1. The NID 200 includes on-NID processing elements 212A, 212B, 212N (collectively referred to as 212A-N). The processing elements 212A-N may be threads, processes, virtual machines, FPGA programs, and other constructs able to process packet data. These elements 212A-N may also be used to provide some coordinator functionality. The NID 200 also includes an on-NID FPGA 214, which may be configured by the parser 210 to perform functions described herein. The NID 200 includes on-NID queues 216A, 216B, 216N (collectively referred to as 216A-N), which may include data queues, event queues, completion queues, request/command queues, etc. To communicate with the host system, the NID 200 includes a PCIe client 218 and optionally other NID/CPU interconnects 220. The NID 200 may also include its own CPU 222 for onboard processing.

2. Packet Processing Mechanisms

Several packet processing mechanisms are described here. The NID is able to schedule packet processing dynamically based on environmental factors. The environmental factors may be stored in a metadata database, which is accessible by the NID and other components of the host. The metadata database may include various information about packets, programs, FPGA configurations, historical packet information, host or NID CPU load, host or NID memory utilization, power consumption levels, etc.

2.a. Packet Queue Prioritization Based on Environmental State

One way to increase packet processing efficiencies is to modify the queued order of packets such that packets that are more likely to be processed by existing instructions in an instruction cache (e.g., cache 152A), partition of an FPGA 180, or virtual machine 190, are prioritized over packets that are less likely to be processed by such processing elements. As such, packet scheduling may be influenced in order to reduce cache, FPGA, or virtual machine misses. The resulting packet scheduling may be unfair in terms of bandwidth, but the overall performance of the processing element is better.

Figure 3:
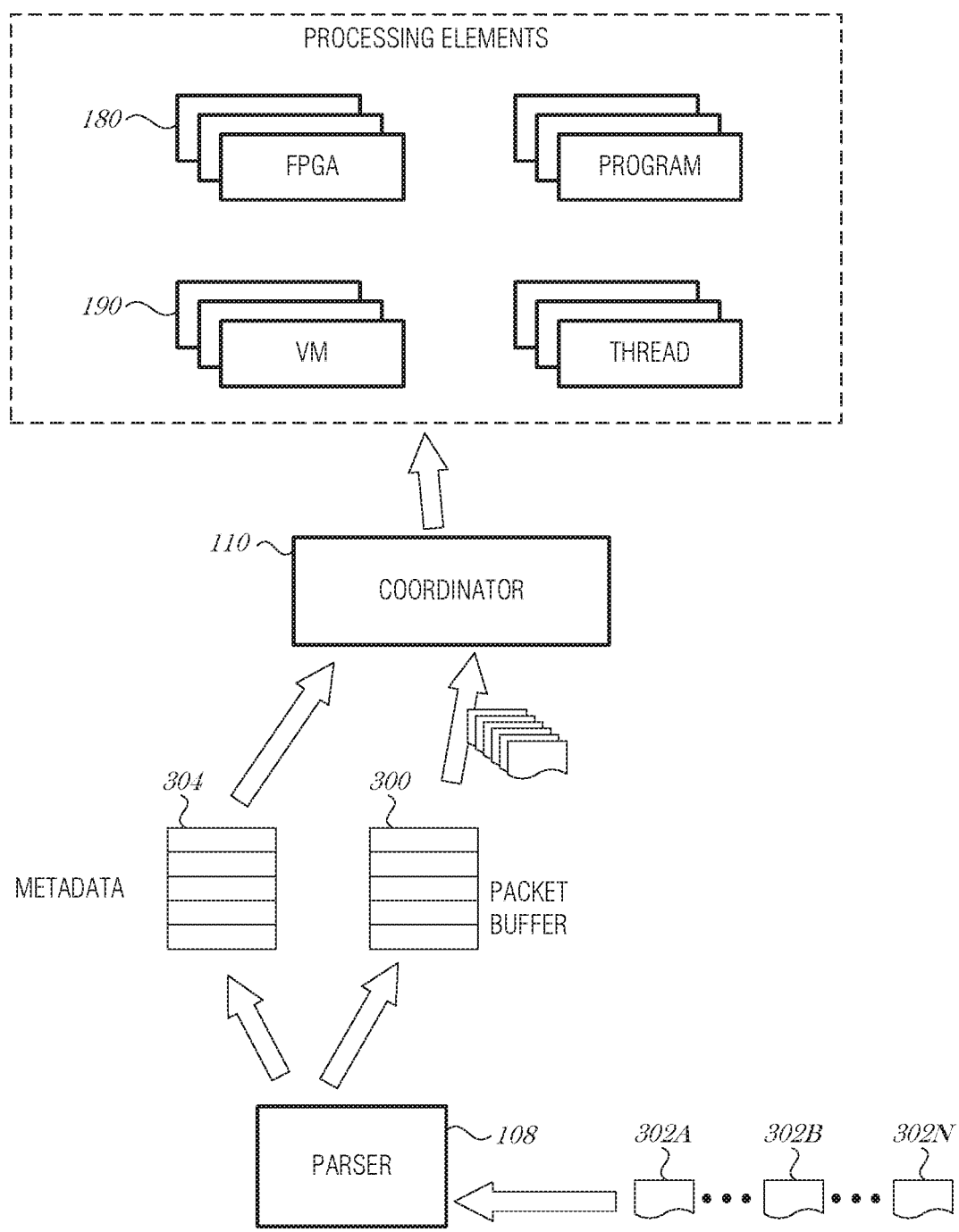
FIG. 3 is a schematic diagram illustrating packet processing, according to an embodiment.

FIG. 3 is a schematic diagram illustrating packet processing, according to an embodiment. A packet buffer 300 acts as a storage space set aside for storing packets received from the network. The packet buffer 300 may be located in the NID (e.g., NID 102 or NID 200) or may be located in the host computer (e.g., operating environment 100).

As packets 302A, 302B, 302N (collectively referred to as 302A-N) are received by the packet parser 108, they may be stored in the packet buffer 300. The packet parser 108 inspects the contents of the incoming packet 302A-N using packet inspection mechanisms, for example, using a TCP Offload Engine (TOE) and corresponding features. Looking up the layers in the packet's encapsulation, the packet parser 108 is able to determine the Source/Destination, Traffic-handling and meta-data markings, application, or even the data contents. The packet inspection does not have to be deep packet inspection. It could be as simple as looking at the source address/port number/other header information, and knowing that all traffic from this source address/port number/header information needs to be processed using a particular program or processing element.

Information obtained during the process of packet analysis is stored in a metadata database 304. The metadata database 304 may store various metadata about a packet or group of packets 302A-N. For example, the metadata database 304 may include a number of packets of certain type, a program needed to process the packet or similar packets, a virtual machine needed to process the packet or similar packets, an FPGA program to process the packet or similar packets, a statistical profile of the packet or similar packets, and the like. The metadata database 304 is used by the coordinator circuit 110 to manage coordination, scheduling, loading, and unloading of processing elements.

The coordinator circuit 110 needs have synchronization with the processing element (e.g., core 154A, FPGA 180, or VM 190) in order to determine proper scheduling decisions. The concept of process synchronization is related to just-in-time (JIT) processing. JIT processing is similar to JIT manufacturing. JIT manufacturing is where the parts to assemble a device, such as a car, are delivered shortly before the assembly of the device. This allows the manufacturer to maintain a smaller inventory and still quickly produce the product. In the present context, if coordinator circuit 110 is synchronized to the processing element, and understands what may be processed and when, the coordinator circuit 110 is able to deliver data that needs to be processed just before it is needed. This may result in fewer cache/FPGA/VM misses and also allows for smaller hardware (e.g., cache) requirements in design.

A tightly compact set of instructions may be used in JIT processing. Prior to the time the processing element executes that set of instructions, the coordinator circuit 110 may load the incoming packet data into to the processing element (e.g., cache). This allows the instructions and data to arrive, just in time to be processed. For the coordinator circuit 110 to synchronize with the processing element(s), the synchronization needs to be very accurate and precise. This precision and accuracy may be accomplished by sharing the same clock circuitry. However, in some cases this is not possible. Hence, other synchronization mechanisms, such as IEEE 1588 Precision Time Protocol (PTP), IEEE 802.1 Time-Sensitive Networking (TSN), Synchronous Ethernet. Network Time Protocol (NTP), or wireless network time synchronization mechanisms (e.g., Reference Broadcast Synchronization (RBS), Timing-sync Protocol for Sensor Networks (TPSN), Flooding Time Synchronization Protocol (FTSP), etc.) may be used. Likewise Precision Time Measurement (PTM) may be used over PCIe interfaces.

The coordinator circuit 110 is able to use an appropriate timing constraints to synchronize with various processing elements, such as a processor core, FPGA 180, VM 190, or other things like GPUs, accelerator circuits, general purpose GPUs (GPGPU), etc. In the case of an FPGA 180, for example, lead time may be different in that the FPGA 180 may take a significant amount of time to reprogram itself or a partition. To accommodate this extended reprogramming time, the coordinator circuit 110 is operable to send in the program first, and when the partition is just about to finish programming, send the data so that it may be processed nearly immediately after being loaded into the FPGA 180.

The coordinator circuit 110 may organize the packet buffer 300 using various mechanisms to prioritize or drop packets from the packet buffer 300. Prioritization may be implemented by analyzing the metadata database 304 to determine which instructions are needed to process the packet 302A-N, interface with the processing element to determine how the processing element is configured (e.g., which instructions are in cache or will be in cache soon, which programs are in a FPGA partition, etc.), and assign a priority or queue position to the packet 302A-N based on whether there is an expected cache/FPGA/VM hit.

In some embodiments, the expected hit is used as one of several factors when determining queue position. In a first aspect, a conventional prioritization scheme is {priority, order}, where priority is a packet priority and order is a round robin ordering. Using this hierarchy, a packet 302A-N is analyzed first with respect to priority and then with respect to the round robin order if there are several packets 302A-N with the same priority. Priorities may range from zero to seven for example, with zero being a highest priority and seven being the lowest. Other ranges of values may be used, for example 1-8, 1-100, 1-5, etc. and other priority schemes may be used, for example, five is the highest priority and one is the lowest. Priorities may be assigned based on what type of data is to be stored in the packet 302A-N, what application is associated with the packet 302A-N, user preferences, etc. For instance, a packet 302A-N that carries data for a real-time interface, such as video conferencing, may be assigned a higher packet priority than a background process, such as a software update service.

A revised prioritization scheme may be used in a first embodiment. The revised prioritization scheme may include the "hit" as a factor in the priority determination. An example revised prioritization scheme includes {priority, hit order}, where hit is a Boolean value of true or false, and is true when the instructions, program, or other configuration of the processing element is such that the processing element is able to process the packet 302A-N immediately.

In a second embodiment of a priority scheme, a conventional prioritization scheme may be {CIR, priority, order}, where CIR is committed information rate, and refers to the bandwidth that is guaranteed by a service provider. Above the CR is an allowance of burstable bandwidth, which may be expressed as the excess information rate (EIR). The sum of the CIR and EIR is the peak information rate (PIR). A revised prioritization scheme may be {CIR, hit, priority, order}. In such an embodiment, the committed data rates are met and anything after that is based on expected processing element performance, packet data priority, and round robin ordering.

In a third embodiment of a priority scheme, a conventional prioritization scheme may be {CIR, priority, order}, and a revised prioritization scheme may be {CIR, priority, hit, order}. In such an embodiment, the committed data rates are met and the packet data priority are considered before processing element performance, with round robin ordering being the last factor considered.

Other prioritization schemes may be developed that include the hit factor. Example prioritization schemes include, but are not limited to {CIR, PIR, hit, priority, order}, {CIR, hit, PIR, priority, order}, {CIR, priority, hit, PIR, order}, and {hit, priority, TTL, order}, where TTL is a time-to-live (TTL) value assigned to instructions or programs that are used to process packets 202A-N. When a packet 302A-N needs to be processed, the coordinator circuit 110 or other component may check whether the instructions or programs are loaded into a cache/FPGA/VM.

If the instructions/program are not available, then any instructions that have an expired TTL may be evicted before other instructions. If a packet 302A-N arrives and is processed by instructions/programs that were in already in memory (e.g., a cache hit or an FPGA hit), then the instructions/programs may have their respective TTL values refreshed, updated, or otherwise modified. TTL values may be used in combination with priority schemes.

For example, if two sets of packets each have instructions loaded in cache to process them, and the packets have the same priority, then the instructions with the lower or expired TTL value may be used over instructions with a higher or unexpired TTL. The reason is that the instructions with the lower or expired TTL have that value because, at least in part, the instructions have not been used as recently. As such, an inference may be made that the instructions that have been used more recently (those with the higher or unexpired TTL values), may be used again in additional packet processing, so packets using such instructions should be prioritized.

When the packet buffer 300 becomes full, packets 302A-N may be dropped from the packet stream. A head drop is where when the packet buffer 300 is full, a drop decision is made based on an understanding of what is in the packet 302A-N. A tail drop is where when the packet buffer 300 is full, the last packet 302N is dropped regardless of the packet priority or classification.

To implement an intelligent dropping mechanism, the coordinator circuit 110 may inspect the packets' contents, inspect the configuration of the processing element, and decide which packet or packets to drop based on what is in each. By considering the configuration of the processing element (e.g., the instructions in cache), the coordinator circuit 110 is able to reduce or avoid cache/FPGA/VM misses. An inverse priority scheme is used where the packet or packets with the lowest priority are dropped.

In a first embodiment of an inverse priority scheme, a "likely miss" metric is used in combination with conventional priority factors. For instance, a conventional inverse priority scheme may be {inverse priority, order}, where inverse priority is the packet priority sorted by lowest priority to highest priority, and where order is the order in round robin processing. An intelligent inverse priority scheme may be {inverse priority, likely miss, order}, where likely miss is a metric, value, or rating of whether the packet data would experience an expected cache/FPGA/VM miss. The likely miss factor is extendable to any processing element that is configurable to process packets.

In a second embodiment of an inverse priority scheme, a committed information rate (CIR) is added with the order of importance being inverse CIR (e.g., CIR met or exceeded), likely miss, inverse priority, and then round robin order. This may be expressed as {inverse CIR, likely miss, inverse priority, order}. As with the first embodiment of the inverse priority scheme described above, the likely miss factor is extendable to any processing element that is configurable to process packets.

Additional or alternative factors may be combined, reordered, or adjusted with the factors discussed in the first and second embodiments of the inverse priority schemes. An example additional factor is TTL.

Figure 4:
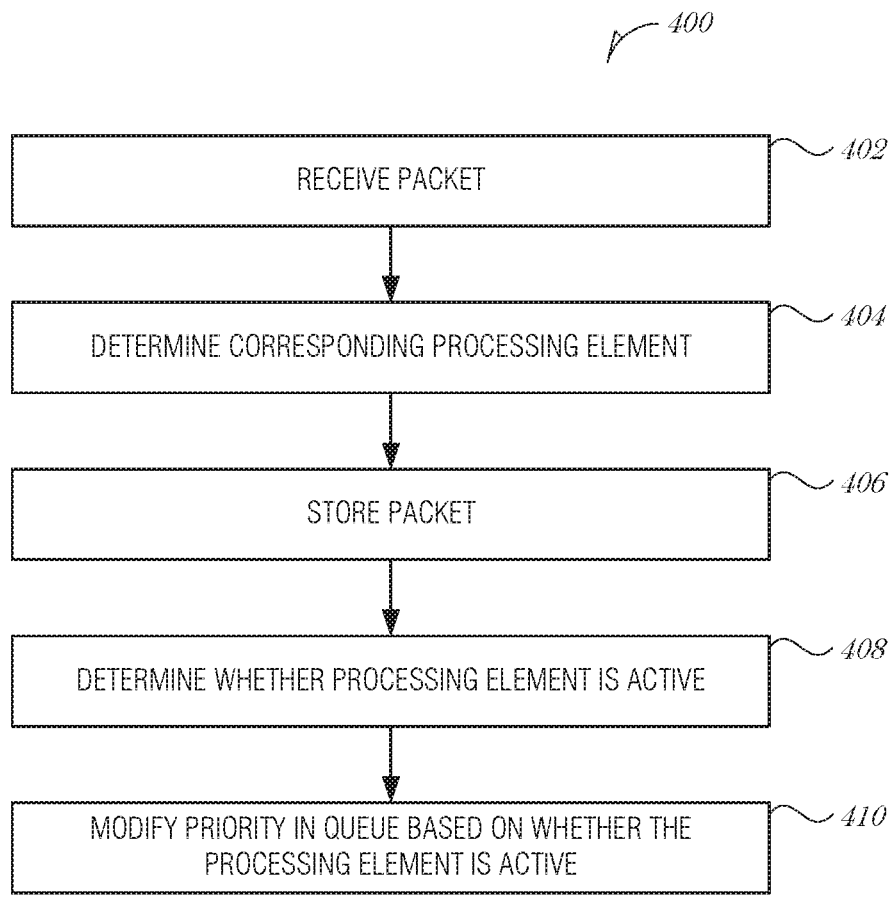
FIG. 4 is a flowchart illustrating a method for flexible packet scheduling, according to an embodiment.

FIG. 4 is a flowchart illustrating a method 400 for flexible packet scheduling, according to an embodiment. At block 402, a packet is received. A corresponding processing element that is used to process the packet is determined from analyzing the packet (operation 404). In various embodiments, the processing element comprises a computing process, a thread, a virtual machine, or a field-programmable gate array (FPGA). The packet is stored in a queue (e.g., a packet buffer) (operation 406).

At block 408, it is determined whether the processing element is active in a computing unit. In various embodiments, the computing unit comprises a central processing unit (CPU), a processor core, a CPU complex, a field-programmable gate array (FPGA), or a graphics processing unit (GPU).

In an embodiment, determining from analyzing the packet that, the corresponding processing element that is used to process the packet comprises using a TCP offload engine to inspect the packet and identify the corresponding processing element.

In an embodiment, determining whether the processing element is active in the computing unit comprises interfacing with the computing unit to determine whether the processing element is active. In a further embodiment, the computing unit is a processor core, and to interface with the computing unit, the coordinator circuit is to receive an indication of the contents of a cache operated by the computing unit. In a further embodiment, the indication of the contents of the cache are provided by a memory management unit (MMU).

In an embodiment, the computing unit is an FPGA, and to interface with the computing unit, the coordinator circuit is to communicate with an FPGA interface to determine whether the processing element is active in the computing unit. In a further embodiment, the FPGA interface maintains a record of which FPGA programs have been loaded in the FPGA.

At block 410, the priority of the packet in the queue is modified based on whether the processing element is active in the computing unit. Each packet or group of packets in the queue may have a priority assigned to it. The processing elements are monitored. Monitoring may include determining which instructions are in cache (in the case of a process or thread), determining which instructions are likely to be put in cache soon, determining which virtual machine is loaded, determining how an FPGA is currently configured, etc. As the monitoring is conducted, the priority of the packet or group of packets may be increased or decreased. The priority may be increased if, for example, the instructions currently in cache are ones that would operate on the data in the queue (e.g., a cache hit). The priority may be decreased if, for example, the instructions needed to process the data in the queue are currently in main memory—in other words, a cache miss is likely.

In an embodiment, modifying the priority of the packet in the queue based on whether the processing element is active in the computing unit comprises increasing the priority of the packet when the processing element is active in the computing unit. In a further embodiment, increasing the priority of the packet comprises including that the processing element is active with at least two other factors selected from the list of: a packet priority, a round robin order, a committed information rate, and a processing element time-to-live value.

In an embodiment, modifying the priority of the packet in the queue based on whether the processing element is active in the computing unit comprises decreasing the priority of the packet when the processing element is not active in the computing unit. In a further embodiment, decreasing the priority of the packet comprises including that the processing element is not active with at least two other factors selected from the list of: a packet priority, a round robin order, a committed information rate, and a processing element time-to-live value.

In an embodiment, modifying the priority of the packet in the queue based on whether the processing element is active in the computing unit includes the operations of determining whether to drop the packet from the queue when the processing element is not active in the computing unit and dropping the packet from the queue based on the determination. In a further embodiment, determining whether to drop the packet from the queue comprises including that the processing element is not active with at least two other factors selected from the list of: an inverse packet priority, a round robin order, an inverse committed information rate, and a processing element time-to-live value.

It is understood that the prioritization and dropping techniques described in this section may be used in combination with techniques from other sections in this document. Additionally, the prioritization and dropping techniques may be combined so that multiple prioritization or dropping techniques are used in series, in parallel, or otherwise.

2.b. Packet Queue Prioritization Based on Time-Division Multiplexing

In some configurations, processing elements may be provided a limited amount of time to execute before being swapped out. In this configuration, a flexible, intelligent NID may perform packet scheduling based on when the processing element that is used to process a particular packet will be available on the computing unit.

As such, another way to increase packet processing efficiencies is to synchronize the packet delivery to the computing unit with the time slot that the processing element used to process the packet is active. A time slot is a period of time when the processing element is able to execute. The time slot may be of any length, such as from microseconds to minutes, depending on the design and configuration of the processing element and computing unit. By using a time-aware scheduling mechanism, the coordinator circuit 110 is able to avoid or reduce costly context switches at the computing unit.

As with other scheduling mechanisms described in this document, synchronization is important. Just prior to the time the processing element is going to execute instructions to process the packet, the coordinator circuit 110 may load the packet data into to the processing element (e.g., cache). This allows the instructions and data to arrive, just in time to be processed. For the coordinator circuit 110 to synchronize with the processing element(s), the synchronization needs to be very accurate and precise. Synchronization mechanisms discussed herein, such as IEEE 1588 Precision Time Protocol (PTP), IEEE 802.1 Time-Sensitive Networking (TSN), Synchronous Ethernet, Network Time Protocol (NTP), wireless network time synchronization mechanisms (e.g., Reference Broadcast Synchronization (RBS), Timing-sync Protocol for Sensor Networks (TPSN). Flooding Time Synchronization Protocol (FTSP), etc.), or Precision Time Measurement (PTM) may be used.

Figure 5:
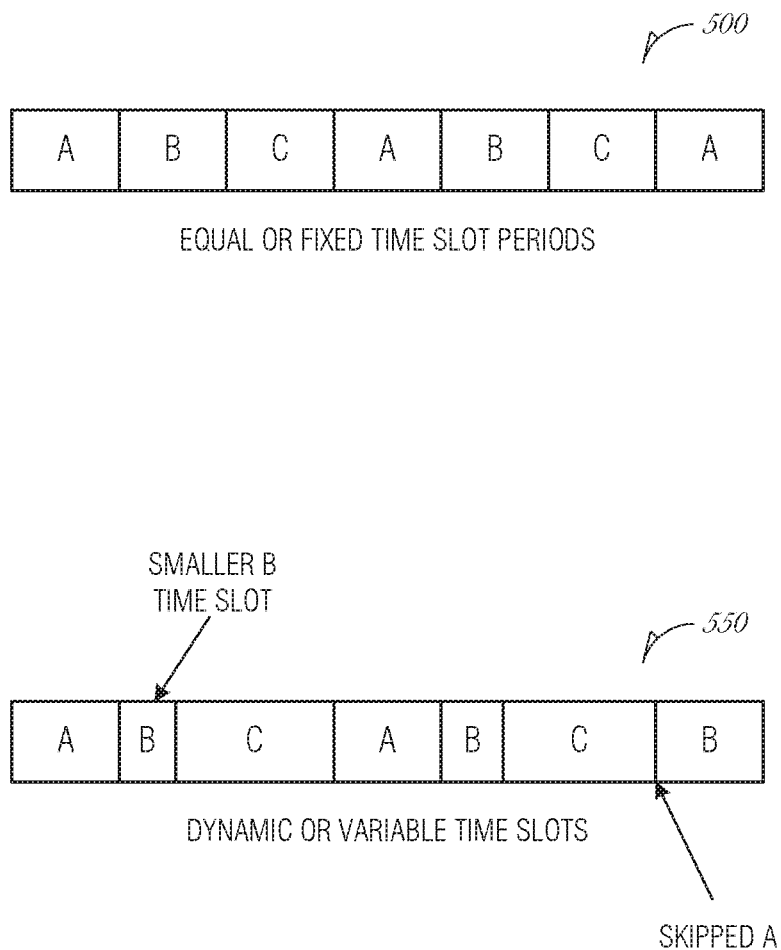
FIG. 5 is a schematic diagram illustrating a processing element's configuration over time, according to an embodiment.

FIG. 5 is a schematic diagram illustrating a processing element's configuration over time, according to an embodiment. The processing element may be a thread, set of instructions, program in virtual machine, FPGA program, or the like. The processing element may be scheduled to execute at certain periods to provide alternating services over time. This design may be referred as processor sharing, time sharing, or time-division multiplexing. In arrangement 500, each program A. B, and C have an equal amount of processor time. The theory here is that all programs are treated equally. In arrangement 550, the programs A, B, and C have dynamic periods. Dynamic periods may be used to accommodate prioritization schemes or workload distribution among processing elements.

The coordinator circuit 110 is aware of the time slots of each program A, B, and C. The coordinator circuit 110 then schedules packets with a higher priority at the appropriate time slot to process those packets. An example prioritization scheme is {time slot, priority, order}, where time slot is a value indicating whether the processing element is active or a distance to when the next time slot occurs, priority is the packet priority, and order is the round robin order for packets with the same priority.

The time slot value may be a 0 or 1 (e.g., 1-bit value), where 0 is used to indicate that the program is not active and 1 is used to indicate that the program is active. The 1-bit time slot value may be used to filter or weight a packet's queue priority. Alternatively, the time slot value may be a 2-bit value, where a value of 3 indicates that the program is currently executing or loaded, 2 indicates that the program is next to execute, 1 indicating that it is two positions away from being loaded, and 0 indicating that it is three positions away from being loaded. It is understood that the values of 1-bit and 2-bit time slot values may be modified to fit other prioritization schemes. Additionally, more bits may be used.

Further, more or fewer programs/instructions may be used than what is illustrated in FIG. 5. In the case where there are fewer programs sharing time, then some bit values may not be used or ignored (e.g., as a do not care (DNC) value). For instance, if there are only two programs being alternated, then in a 2-bit scheme, values of 1 and 0 are meaningless and may be ignored.

Additional or alternative factors may be combined, reordered, or adjusted with the factors discussed in the priority scheme. Example additional factors include committed information rate (CIR). For instance, if the CIR is not satisfied, then a packet that at least partially satisfies the CIR may be prioritized.

Returning to FIG. 3, when the packet buffer 300 becomes full, packets 302A-N may be dropped from the packet stream. A head drop is where when the packet buffer 300 is full, a drop decision is made based on an understanding of what is in the packet 302A-N. A tail drop is where when the packet buffer 300 is full, the last packet 302N is dropped regardless of the packet priority or classification.

To implement an intelligent dropping mechanism, the coordinator circuit 110 may inspect the packets' contents, inspect the configuration of the processing element, and decide which packet or packets to drop based on what is in each. In particular, an inverse priority scheme is used to identify the packet or packets with the lowest priority, which may then be dropped. By considering the configuration of the processing element (e.g., the instructions in cache), the coordinator circuit 110 is able to reduce or avoid cache/FPGA/VM misses by dropping packets that will not be handled for some time.

As such, an inverse prioritization scheme for an intelligent dropping mechanism may be {inverse time slot, inverse priority, order}, where inverse time slot is used to weight the priority when a program/instruction is not loaded or may not be loaded for some time. Inverse time slot may be a 1-bit value where 1 is used to indicate that the program/instruction is not loaded and 0 is used to indicate that it is loaded. As another example, inverse time slot may be a 2-bit value where 0 indicates that the program is currently loaded, 1 indicates that the program is next, 2 indicates that the program is two positions away from being active, and 3 indicates that the program is three positions away from being active. Thus, a program that is not loaded will be reflected in a higher drop priority of the packet (e.g., more likely that the packet will be dropped from the queue). It is understood that the values of 1-bit and 2-bit inverse time slot values may be modified to fit other prioritization schemes. Additionally, more bits may be used.

Additional or alternative factors may be combined, reordered, or adjusted with the factors discussed in the inverse priority scheme. Example additional factors include committed information rate (CIR). For instance, if the CIR has been satisfied, then a packet that would provide additional service related to the CIR may be de-prioritized and dropped.

Figure 6:
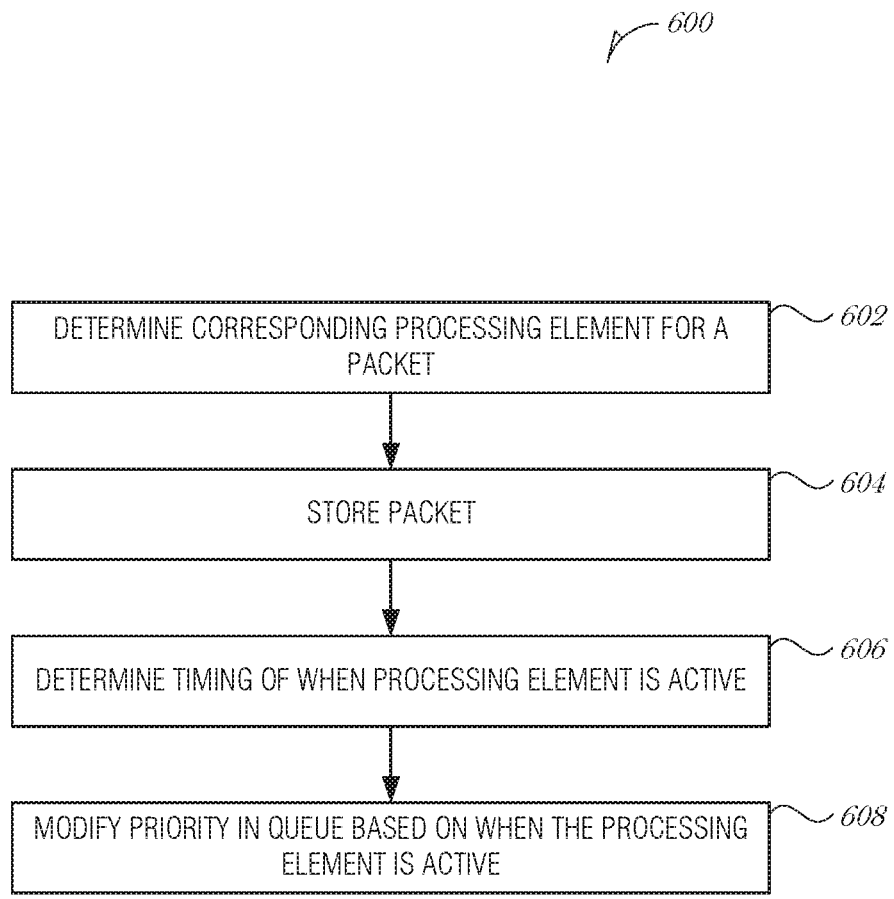
FIG. 6 is a flowchart illustrating a method for time-based flexible packet scheduling, according to an embodiment.

FIG. 6 is a flowchart illustrating a method 600 for time-based flexible packet scheduling, according to an embodiment. At block 602, a packet is received and a corresponding processing element that is used to process the packet is determined from analyzing the packet. In various embodiments, the processing element comprises a computing process, a thread, a virtual machine, or a field-programmable gate array (FPGA). In an embodiment, determining the corresponding processing element that is used to process the packet comprises using a TCP offload engine to inspect the packet and identify the corresponding processing element. The packet is stored in a queue (e.g., a packet buffer) (operation 604).

At block 606, a timing of when the processing element is active in a computing unit is determined. In various embodiments, the computing unit comprises a central processing unit (CPU), a processor core, a CPU complex, a field-programmable gate array (FPGA), or a graphics processing unit (GPU).

In an embodiment, determining the timing of when the processing element is active in the computing unit comprises being synchronized with the computing unit. In a further embodiment, wherein being synchronized with the computing unit is performed by using at least one of: IEEE 1588 Precision Time Protocol, IEEE 802.1 Time-Sensitive Networking, Synchronous Ethernet, Network Time Protocol, or Precision Time Measurement.

In an embodiment, determining the timing of when the processing element is active in the computing unit comprises interfacing with the computing unit to determine when the processing element is active. In a further embodiment, the computing unit is a processor core, and interfacing with the computing unit comprises receiving an indication of the contents of a cache operated by the computing unit. In a further embodiment, the indication of the contents of the cache are provided by a memory management unit (MMU).

In another embodiment, the computing unit is an FPGA, and interfacing with the computing unit comprises communicating with an FPGA interface to determine whether the processing element is active in the computing unit. In a further embodiment, the FPGA interface maintains a record of which FPGA programs have been loaded in the FPGA.

At block 608, the priority of the packet in the queue is modified based on the timing of when the processing element is active in the computing unit. In an embodiment, modifying the priority of the packet in the queue based on the timing of when the processing element is active in the computing unit comprises increasing the priority of the packet when the processing element is active or will be active soon in the computing unit. In a further embodiment, increasing the priority of the packet comprises including that the processing element is active or will be active soon with at least one factor selected from the list of: a packet priority and a round robin order.

In another embodiment, modifying the priority of the packet in the queue based on the timing of when the processing element is active in the computing unit comprises decreasing the priority of the packet when the processing element is not active or will not be active soon in the computing unit. In a further embodiment, decreasing the priority of the packet comprises including that the processing element is not active with at least one factor selected from the list of: a packet priority and a round robin order.

In another embodiment, modifying the priority of the packet in the queue based on whether the processing element is active in the computing unit includes determining whether to drop the packet from the queue when the processing element is not active or will not be active soon in the computing unit, and dropping the packet from the queue based on the determination. In a further embodiment, determining whether to drop the packet from the queue comprises including that the processing element is not active or will not be active soon with at least one factor selected from the list of: an inverse packet priority and a round robin order.

It is understood that the prioritization and dropping techniques described in this section may be used in combination with techniques from other sections in this document. Additionally, the prioritization and dropping techniques may be combined so that multiple prioritization or dropping techniques are used in series, in parallel, or otherwise.

3. Active Management of Processing Elements in the Environment

Active management of processing elements includes the concepts of monitoring processing elements to determine their state and future state, and configuring the processing element so that it is able to act on the data packet more quickly. Active management may be used with queue prioritization, packet aggregation, and other techniques described in this document, in order to reduce packet processing time.

3.a. Pre-Loading Programs/Instructions into Processing Element

Another way to increase processing performance is to actively manage the instructions, programs, virtual machines, or other types of processing elements that act on packets. Active management includes, but is not limited to, loading or evicting instructions for an instruction cache (e.g., cache 152A); loading, reprogramming, or unloading programs in FPGA partitions; and loading or unloading virtual machine instances. When a packet arrives, instructions, programs, or other processing elements may be loaded to process the packet immediately, or at least in a prioritized manner. Packets that arrive in bunches, such as those related to an image, may be more efficiently processed if the corresponding processing element is made available more quickly. By pre-loading the processing element before forwarding the data obtained from the packet (or packets), the system avoids a cache miss and its associated delays. Preloading may occur within a relatively small period before the packet is processed, such as 100 ns, so that the instructions are available for the data when the data arrives. As such, active management may reduce the number of context switches that a computing unit may have to undertake while processing packets. Multiple packets may be batch processed to further increase processing efficiencies. This is described further in Section 4.

Figure 7:
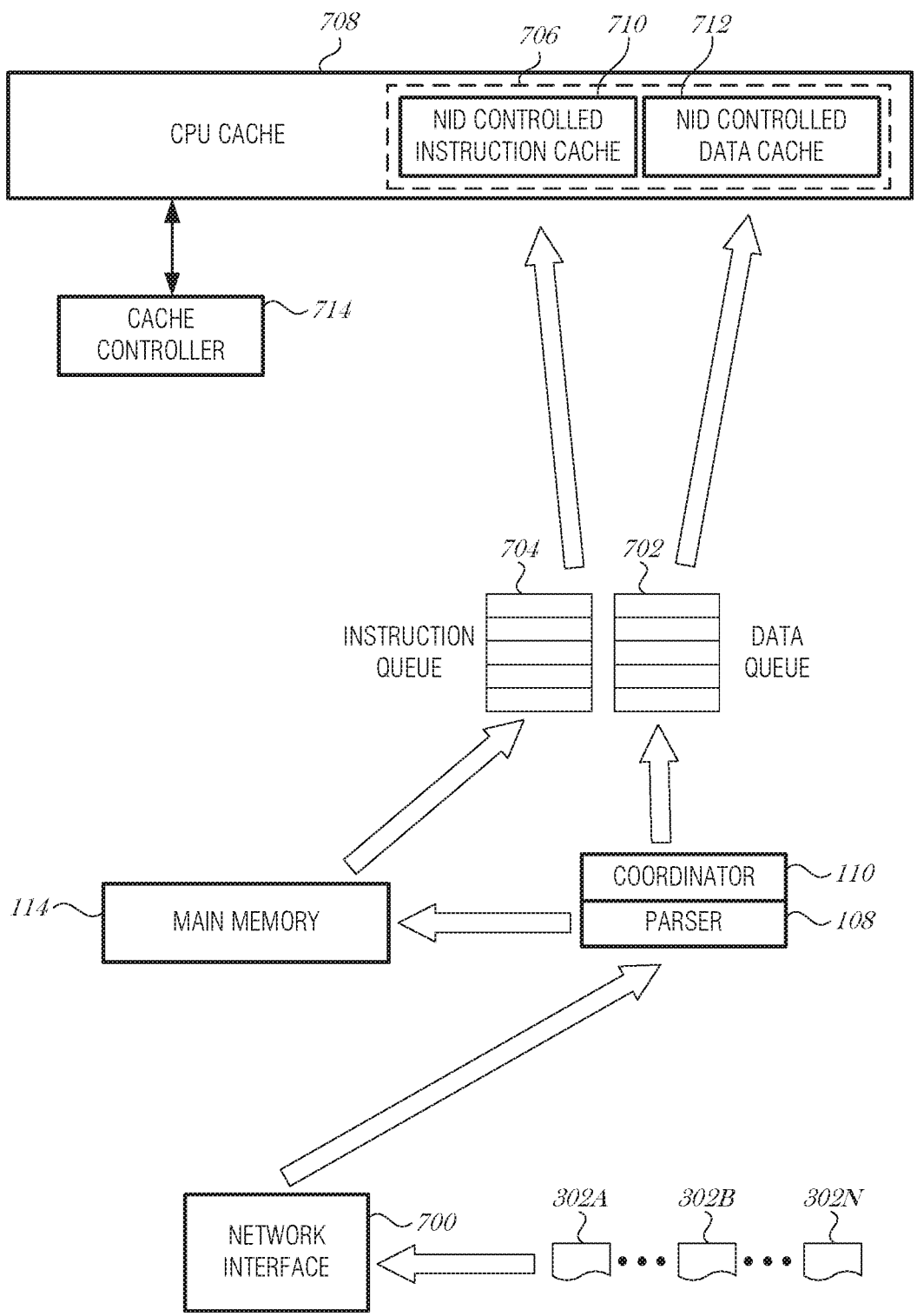
FIG. 7 is a schematic diagram illustrating control and data flow during packet processing, according to an embodiment.

FIG. 7 is a schematic diagram illustrating control and data flow during packet processing, according to an embodiment. Packets 302A-N are received at a network interface 700. The packet parser 108 inspects the packet 302A-N and identifies processing required by the packet 302A-N. The packet 302A-N is processed to determine a corresponding program to be run by the processor core (e.g., core 150A). The packet processing may include referencing a metadata database (e.g., database 304), main memory 114, or NID memory 112 to obtain additional information and correlate the packet information with the corresponding program.

The packet 202A-N is placed in a data queue 702. The data queue 702 may be on-NID, such as in NID memory 112. Alternatively, the data queue 702 may be in main memory 114.

The instructions needed to process the packet 302A-N are retrieved from main memory 114 and placed in an instruction queue 704. The instruction queue 704 may be on-NID, such as in NID memory 112. Alternatively, the instruction queue 704 may be in main memory 114. After the instructions are fetched, then the instructions may be loaded into a reserved portion or area 706 of the cache 708. The cache 708 may be an L1, L2, or L3 cache of a processor core or CPU complex. The reserved portion of cache 706 includes a NM-controlled instruction cache 710 and a NID-controlled data cache 712.

The reserved portion of cache 706 may be controlled directly by the NID 102, such as with direct memory access. Alternatively, the reserved portion of cache 706 may be controlled by the NID 102 indirectly, such as via a cache controller 714, memory management unit, or the like. The coordinator circuit 110 may pass an address or address range to the cache controller 314 to load into cache 708. The cache controller 714 may be used to load and evict instructions from cache 708. The reserved portion of cache 706 may be allocated dynamically by the cache controller 714. The NID 102 may request additional allocation in the cache 708, depending on network load, packet priority, or other factors.

After the instructions and data are loaded from their respective queues 704, 702 into the cache 708, the processing core is able to operate on the data without a cache miss for either the data or instructions.

In an embodiment, the NID controls an area of cache. In most cases, the CPU or MMU controls the cache; however, in this embodiment, the NID controls this area of the cache. For instance, the NID-controlled area may be in the last level cache (e.g., L3 160). The NID 102 understands the program for the incoming data packet is at location A in the main memory 114, it retrieves those instructions, and places them in the NIC-controlled area of the last level cache with the packet data (e.g., reserved area 706). When the CPU core (e.g., core 154A) starts to process this packet, it will go out to its instruction cache (e.g., cache 152A) and try to retrieve the instructions. The CPU will miss all levels of cache until the last level. Here it will grab the instructions and bring them into the L1 cache (e.g., cache 152A).

In another embodiment, the NID interacts with the cache controller 714 (e.g., MMU). In such a case, the NID may instruct the cache controller 714 to load instructions A by time B to process the incoming data. The cache controller 714 may then fetch the missing instructions just in time to process the incoming data, avoiding the cache-miss.

Preloading instructions may be especially effective when used with several related packets. Many packets may be queued together and burst to the NID-controlled data cache 312. In this case, the instructions only need to be fetched once over the group of packets. Grouping related packets may be performed using TCP offload and large receive offload (LRO) mechanisms.

Figure 8:
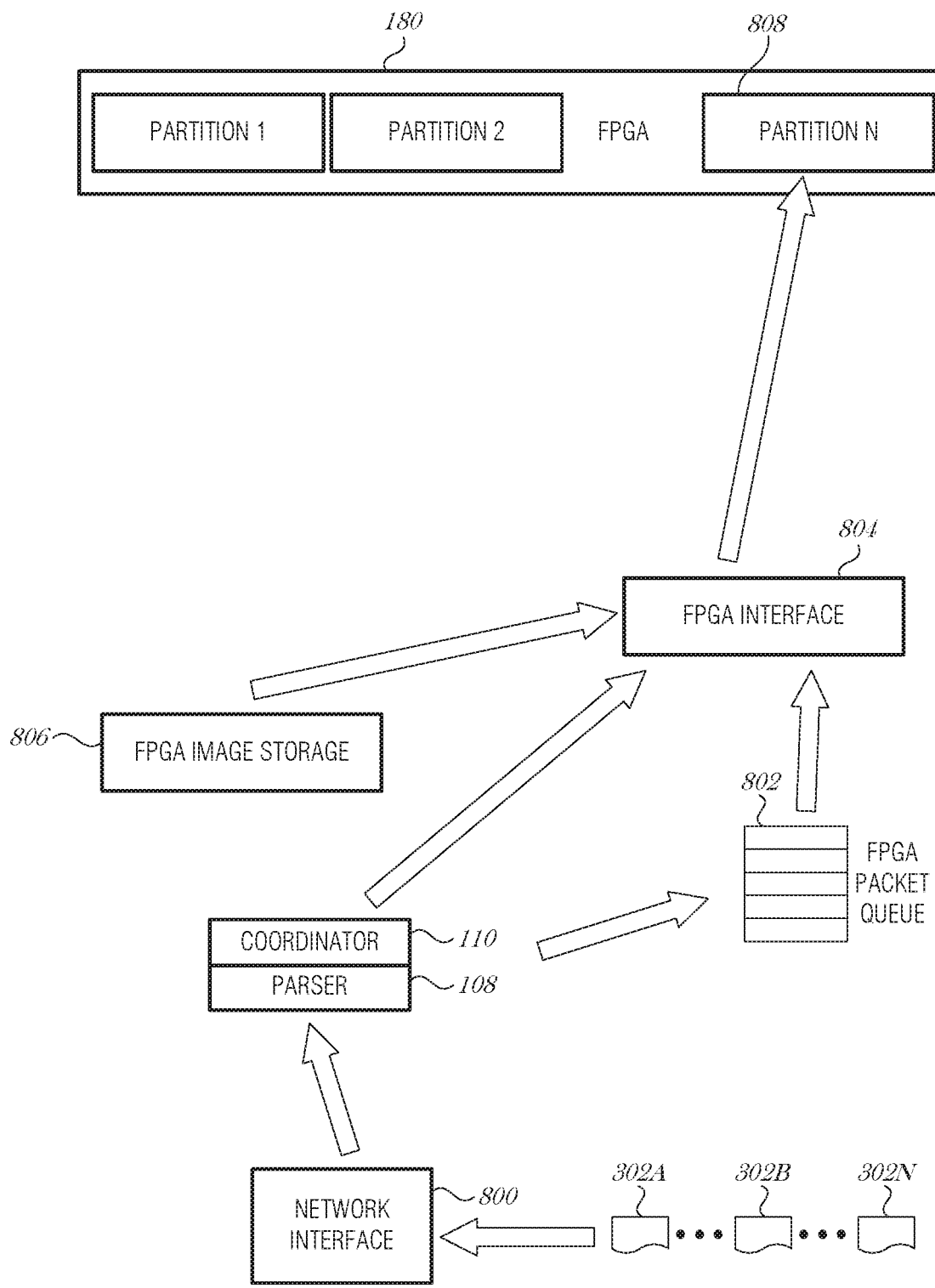
FIG. 8 is a schematic diagram illustrating control and data flow during packet processing, according to an embodiment.

FIG. 8 is a schematic diagram illustrating control and data flow during packet processing, according to an embodiment. Similar to how packet processing was described in FIG. 7 with reference to loading instructions and data in a processor cache, programs or data may be loaded into an FPGA partition to reduce or eliminate delays due to an FPGA miss. Packets 302A-N are received at a network interface 800. The packet parser 108 inspects the packet 302A-N and identifies processing required by the packet 302A-N. The packet 302A-N is parsed to determine a corresponding program to be run by the FPGA 180. The packet 302A-N is placed in a FPGA packet queue 802. The FPGA packet queue 802 may be in the FPGA 180, FPGA interface controller 804, in main memory 114, or in NID memory 112. The packet parser 108 or coordinator circuit 110 determines the FPGA program needed to process the packet 302A-N. This information is sent to an FPGA interface controller 804.

The FPGA interface controller 804 may be configured to track the programs loaded in the partitions of the FPGA 180. If the program is already in the FPGA 180, then the packet 302A-N may be forwarded without additional delay. If the program indicated by the packet parser 108/coordinator circuit 110 is not in the FPGA 180, then the FPGA interface controller 804 may obtain the proper image from an FPGA image storage 806. The FPGA interface controller 804 then loads the program into a partition 808. After the program is loaded into the FPGA 180, then the FPGA interface controller 804 obtains the packet data from the FPGA packet queue 802 and sends it to the FPGA 180 where it is processed.

The partition 808 that the FPGA interface controller 404 loads may be a reserved partition space in the FPGA 180. The reserved partition space may be controlled by the FPGA interface controller 804 and set aside so that the FPGA 180 does not use it for other programs.

In a first aspect, the coordinator circuit 110 interfaces with a processing element through various mechanisms that are appropriate for the type of processing element. In the case of a processing core (e.g., core 150A), for example, the coordinator circuit 110 may interface with a memory management unit (MMU) to identify the contents of L1, L2, or L3 cache. In the case of an FPGA 180, the coordinator circuit 110 may transmit a request to the FPGA 180 to determine the contents of the FPGA's partitions. The coordinator circuit 110 may work in conjunction with a FPGA interface controller 804, as described above in FIG. 8.

Alternatively, the coordinator circuit 110 may control a portion of the cache or FPGA partition. In the case of a processing core (e.g., core 150A), the coordinator circuit 110 may use direct memory access to write instructions and data to a reserved area of L1, L2, or L3 cache. The reserved area may include the area controlled by the coordinator circuit 110, as discussed in FIG. 7. Cache evictions are controlled by the coordinator circuit 110. Evictions may be based on various priority or other schemes, such as those described herein.

Similarly, in the case of an FPGA 180, the coordinator circuit 110 may use an FPGA interface controller 804 that is connected to FPGAs on the host system (or internal to the NID 102) and is operable to track FPGA programs in the FPGAs. and load or unload FPGA programs in a partition that is controlled by the FPGA interface controller 804. The coordinator circuit 110 or the FPGA interface controller 804 may perform evictions of obsolete, unused, or underutilized programs. The coordinator circuit 110 or the FPGA interface controller 804 may keep track of which FPGA partitions have been loaded and not reload programs that are already in an FPGA partition.

Multiple partitions may be reconfigured as part of this process. For example, to process a data set partitions P1, P2, P3, P4, and P5 need to be programmed. Since the algorithms are processed in order, the FPGA interface controller 804 may program P1, then while programming P2, send data to P1. When P2 is done being programmed, P1's data may move to P2, while P3 is being programmed, and so on. In fact, once P1 is done processing, it may be reprogrammed to process a different data set.

Figure 9:
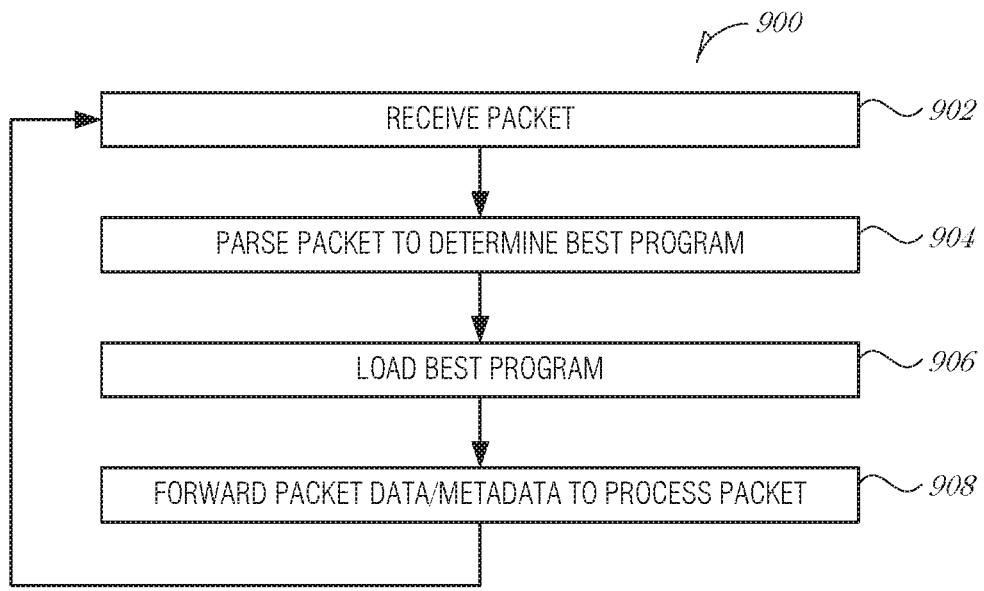
FIG. 9 is a flowchart illustrating a method for managing packet processing, according to an embodiment.

FIG. 9 is a flowchart illustrating a method 900 for managing packet processing, according to an embodiment. Packets are received (operation 902) and then parsed to determine the best program (operation 904). The parsing (operation 904) may identify a set of instructions to load into a cache or a program to load into an FPGA, for example. After operation 904, the best program is loaded (operation 906). If the best program is already in the computing unit, then the method may just proceed to operation 908 where the packet is forwarded to the computing unit to be processed. The method 900 continues processing packets as they arrive.

In a second aspect, instructions or programs may be loaded based on a priority system. The priority system may be referred to as a class of service or a quality of service. The packet 302A-N may be parsed to determine the most likely program or instructions used to process the packet 302A-N. This metadata may be stored in the metadata database 304. The coordinator circuit 110 may then determine a priority of the program or instructions used to process a packet 302A-N. If the priority is higher than a current program or instruction in FPGA or cache, then the current program or instruction is flushed and replaced with the program or instructions used to process the packet 302A-N. This reduces or eliminates the wait time that the packet 302A-N would have experienced if there were a cache miss or FPGA miss.

3.b. Prioritization of Programs/Instructions Based on Metadata

Metadata is data about data. In the context of packet processing, metadata may include various facts about the packet, data about the environment (either on-NID or in host), data about instructions or programs, historical data, and the like. Metadata may be used as part of operations by the parser 108, the coordinator 110, or other processing elements such as 212A-N, on-NID FPGA 214, on-NID CPU 222, etc.

In some instances, instead of flushing out anything mid-operation to take care of a higher level priority task, grades of priority may be used. Based on the priority of the instructions, a decision is made based on the priority of the currently executing instruction and the one ready to be loaded. The instructions that are executing may be provided a little more time to see if it finishes by then, and if not, then they are flushed. Other prioritization and timing schemes are considered to be within the scope of this disclosure.

Additionally, based on priority, the coordinator circuit 110 may increase or decrease the amount of cache or partition available for instructions or programs. For example, the coordinator circuit 110 may load more instructions when there is a much higher priority set of instructions and associated packets. Using a larger cache/partition space may act to reduce further cache/FPGA misses for complex processing, thereby ensuring faster processing and a better user experience. High-priority programs, such as a video conferences, may use complex processes to ensure real-time or near real-time audio and video presentation.

In some cases, the priority of packets may change over time, even during the stream of packets in a given instance. For example, when a large image in a webpage is being received by the NID 102, the first packets are of higher value to present the image to the user a responsively as possible. However, at the tail of the packet stream, where most of the image has been displayed to the user, the later packets may receive a lower priority. Cache misses and the associated delay later in the image presentation process may not be perceivable by the user, as the user's attention may have moved on to other portions of the webpage. For instance, later packets may only add resolution to an already-displayed image. As such, the later packets may not be as important to the user experience.

Figure 10:
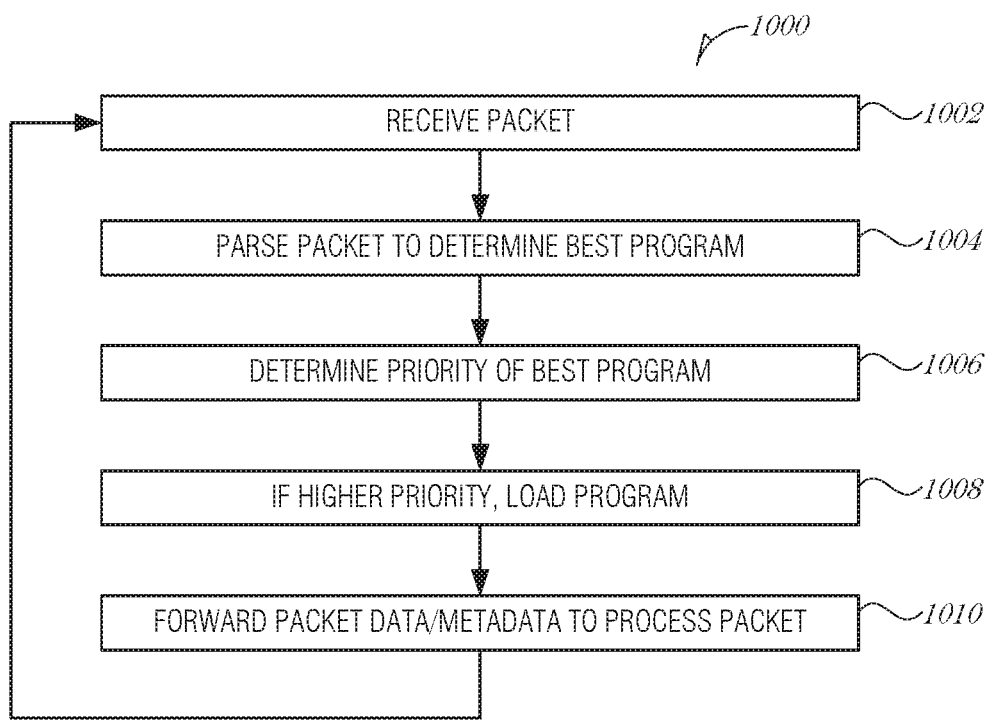
FIG. 10 is a flowchart illustrating a method for managing packet processing, according to an embodiment.

FIG. 10 is a flowchart illustrating a method 1000 for managing packet processing, according to an embodiment. Packets are received (operation 1002) and then parsed to determine the best program (operation 1004). The parsing (operation 1004) may identify a set of instructions to load into a cache or a program to load into an FPGA, for example. The priority of the best program is determined (operation 1006) and if it has a higher priority than what is currently loaded, then the best program is loaded (operation 1008). There may be a timeout used to ensure that the currently-loaded program is able to finish a certain amount of work before being evicted. If the best program is already in the computing unit, then the method may just proceed to operation 1010 where the packet is forwarded to the computing unit to be processed. The method 1000 continues processing packets as they arrive.

In another aspect, priority may be adjusted using a history of packet processing. Loading and evictions may be controlled or influenced by the statistical profile of one or more packets. The statistical profile may include a histogram of packets of a certain type arriving over an interval. The statistical profile of a packet or packet type may be revised after each packet is received, or may be updated over a window of time. The statistical profile may be built using artificial intelligence, machine learning, genetic algorithms, neural networks, or other types of optimization algorithms. Additionally, or alternatively, Security Algorithms, Software Defined Networking Algorithms, Network Function Virtualization Algorithms, Internet of Things (IoT) algorithms, data mining algorithms, data analytics, or network/network traffic analytics may be used to build the statistical profile. The statistical profile may take into consideration whether the packet type is common or uncommon, typical numbers of such packets, time of day when packets are typically received, sender information, and other traffic pattern data.

In addition to using the statistical profile for packet processing and routing, the packet parser 108 or coordinator circuit 110, or other portions of the NID 102, may use the statistical profile to detect a potential cyber-attack (e.g., a denial-of-service attack). For example, if a large number of packets are received requesting data over a file transfer protocol (FTP) session, the NID 102 may flag it as a potential cyber-attack. In the case of security, the NID 102 or coordinator circuit 110 may use analytics or other methods to examine the treads in the packets. If a new trend is determined to occur, the NID 102/coordinator circuit 110 may spawn off a new virtual machine to analyze the traffic/data, sending new packets to the new virtual machine for analysis. The possibly bad/unsecure/malicious packets may be spanned/split so that they are processed by both the new security-based virtual machine as well as the normal processing path. While in this example, a virtual machine has been used, it may be implemented with an FPGA partition, GPGPU, or a coprocessor that does the processing. Further, the NID 102 or coordinator circuit 110 may determine which of a plural of security algorithms or instructions should be used and forward that to the processing element.

Using the statistical profile, the coordinator circuit 110 or FPGA interface controller 804 may adaptively load instructions or a program that serves the larger number of packets, thereby reducing or eliminating context switches in cache or FPGA. For example, if the NID-controlled area of cache has room for only one program and there are two packet types A and B, if stats show that there are more A packets than B packets likely to be received, then the coordinator circuit 110 may load the cache with the program for A. Over time, there may be more B packets than A. In this case, the coordinator circuit 110 may switch the instructions to process B packets. The goal is to reduce the context switching for the largest number of packets.

Figure 11:
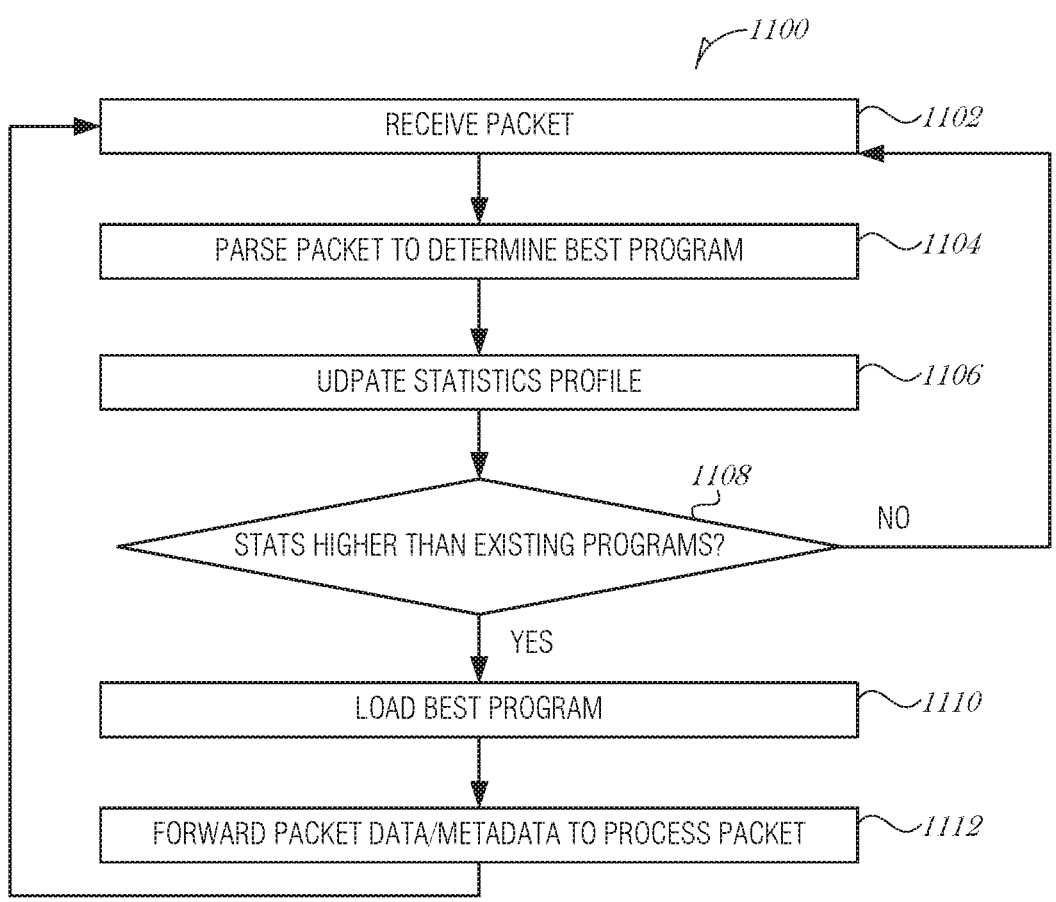
FIG. 11 is a flowchart illustrating a method for managing packet processing, according to an embodiment.

FIG. 11 is a flowchart illustrating a method 1100 for managing packet processing, according to an embodiment. Packets are received (operation 1102) and then parsed to determine the best program (operation 1104). The parsing (operation 1104) may identify a set of instructions to load into a cache or a program to load into an FPGA, for example. A statistical profile is updated for the packet type or program (operation 1106). At operation 1108, it is determined whether the statistics of the program or packet type are better than those programs currently loaded in the computing unit. If the statistics of the program or packet type is not better than those already being used, then the packet is processed using conventional packet processing. Otherwise, the new program is loaded (operation 1110) and the packet is forwarded to the computing unit to be processed (operation 1112). The method 1100 continues processing packets as they arrive.

In another aspect, programs or instructions may be unloaded using a time-to-live (TTL) value assigned to instructions or programs that are used to process packets. When a packet needs to be processed, the coordinator circuit 110, FPGA interface controller 404, or other component may check whether the instructions or programs are loaded into a cache/FPGA. If the instructions/program are not available, then any instructions that have an expired TTL may be evicted before other instructions.

If a packet arrives and is processed by instructions/ programs that were in already in memory (e.g., a cache hit or an FPGA hit), then the instructions/programs may have their respective TTL values refreshed, updated, or otherwise modified.

TTL values may be used in combination with priority schemes. For example, if two sets of instructions have a low priority and a high priority, respectively, and each set has an expired TTL value, then the respective controller may evict the low priority instructions in order to make room in the cache. If it is not enough room, then the high priority instructions with the expired TTL value may also be evicted.

The various aspects may be combined in packet processing. For example, a priority scheme may be used to determine which program to load into an FPGA that is capable of holding several programs. The program to unload from the FPGA to make room for the new program may be chosen based on a TTL evaluation.

As another example, the priority of packets may be combined with the statistical profile of the packets. If the packets are historically common and the priority is high, then the packets may be prioritized over packets that are historically rare, even with high priority. Other combinations are considered to be within the scope of the present disclosure.

Figure 12:
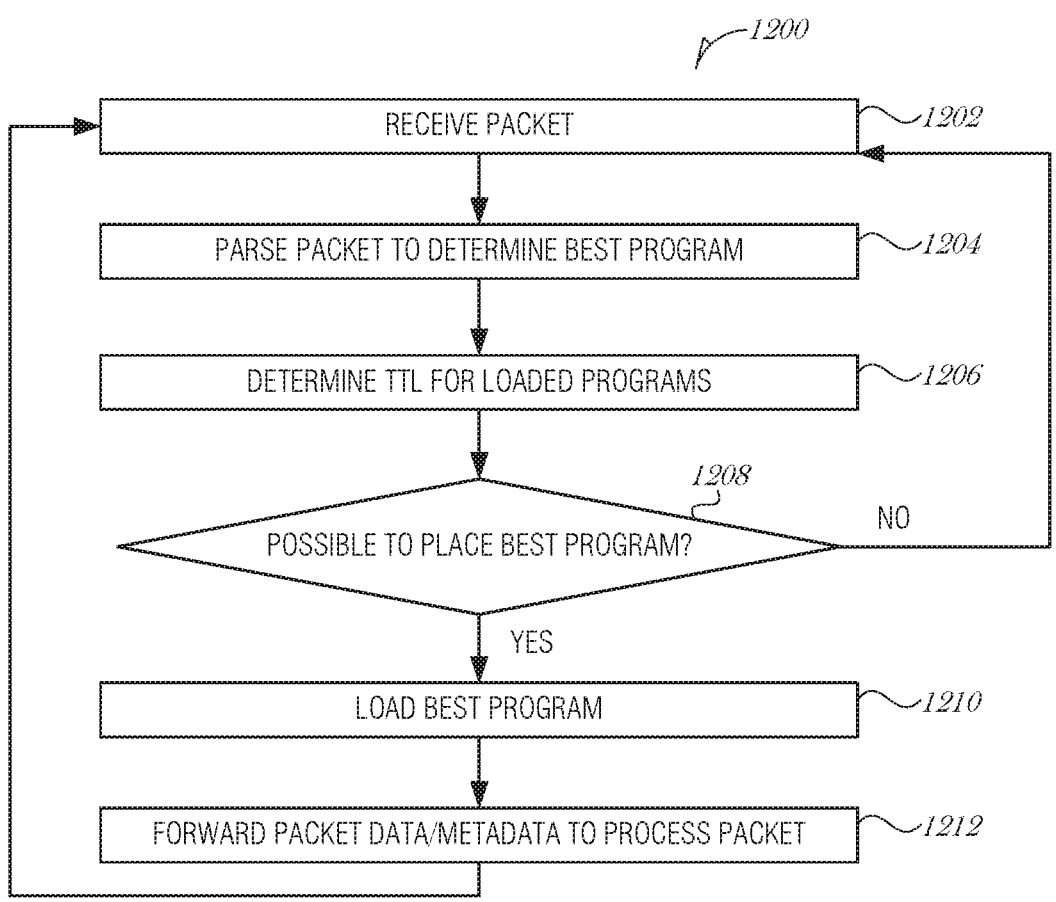
FIG. 12 is a flowchart illustrating a method for managing packet processing, according to an embodiment.

FIG. 12 is a flowchart illustrating a method 1200 for managing packet processing, according to an embodiment. Packets are received (operation 1202) and then parsed to determine the best program (operation 1204). The parsing (operation 1204) may identify a set of instructions to load into a cache or a program to load into an FPGA, for example. A time-to-live (TTL) value is determined for loaded programs (operation 1206). At operation 1208, it is determined whether the best program identified in operation 1204 is able to be loaded into the computing unit. The determination may be based on whether the TTL has expired for any of the loaded programs. The determination may also be based on other factors, such as priority of loaded programs, whether the programs have processed any packets recently, the size of the program, etc. If the best program cannot be loaded, then the packet is processed using conventional packet processing. Otherwise, a loaded program with an expired TTL is evicted, and the new program is loaded (operation 1210). After the new program is loaded, the packet is forwarded to the computing unit to be processed (operation 1212). The method 1200 continues processing packets as they arrive.

It is understood that the prioritization, loading, and eviction techniques described in this section may be used in combination with techniques from other sections in this document. Additionally, the prioritization, loading, and eviction techniques may be combined so that multiple techniques are used in series, in parallel, or otherwise.

4. Batch Processing Using Prioritization, Pre-Loading, and Other Mechanisms

The effectiveness of queue management and processing element management may be further enhanced by batch processing. Disclosed herein are systems and methods that provide packet processing efficiencies through the use of batch processing along with coordination and integration with a CPU core, an FPGA, or other processing structure (e.g., an ASIC, GPU, Co-Processor or a virtual machine (VM)).

One way to increase packet processing efficiencies is to process similar packets together. In a first embodiment, similar packets may be grouped and stored in queues. At an appropriate time, some or all of a queue may be flushed, thereby transmitting a number of similar packets to a computing unit for processing. In a second embodiment, packets that make up a larger data chunk (e.g., several packets used to transfer an image file) may be combined in memory before being transmitted to a computing unit for processing. In such embodiments, packet aggregation or grouping reduces the number of context switches that a computing unit may have to undertake while processing packets.

Figure 13:
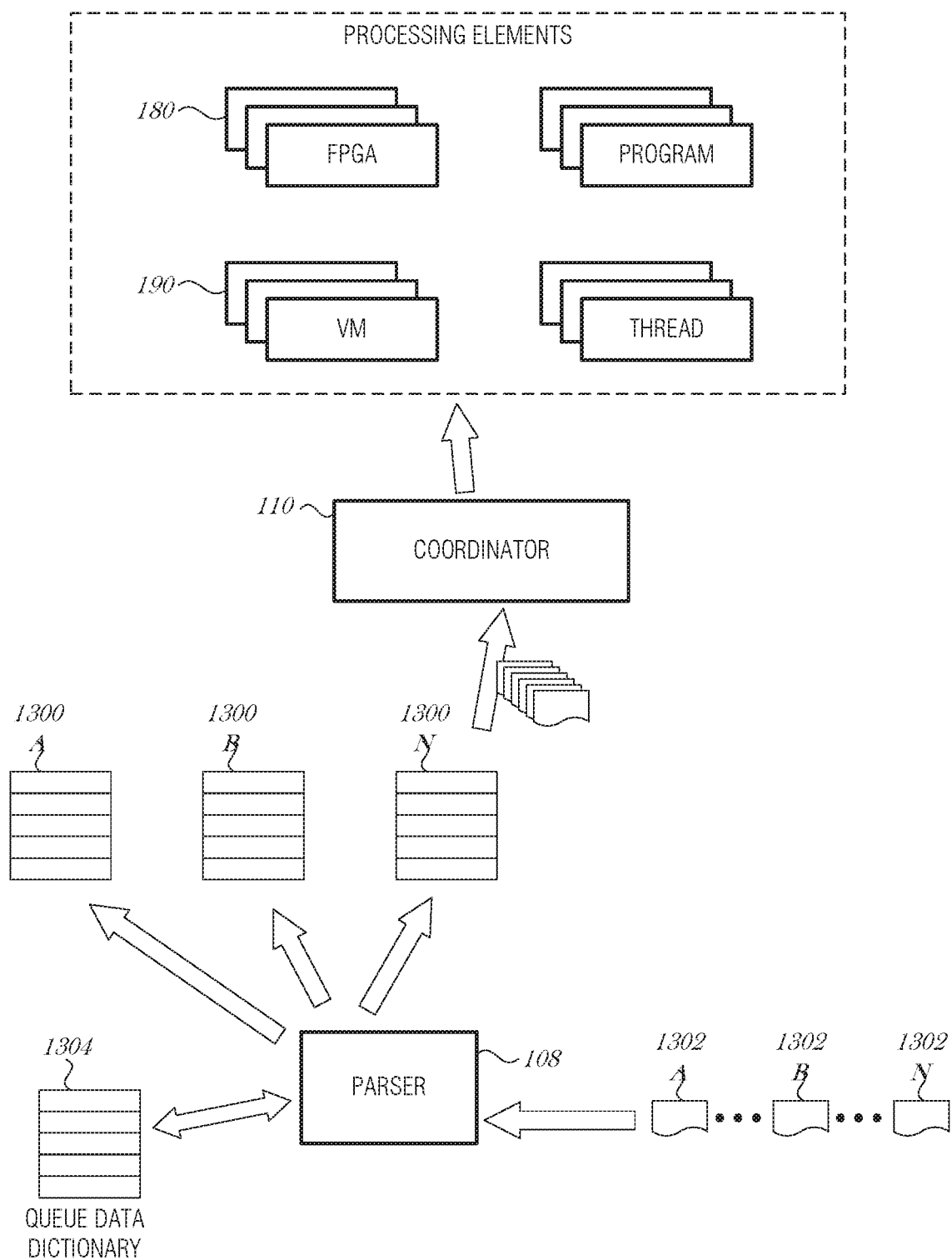
FIG. 13 is a schematic diagram illustrating packet processing, according to an embodiment.

FIG. 13 is a schematic diagram illustrating packet processing, according to an embodiment. Multiple queues 1300A, 1300B, 1300N (collectively referred to as 1300A-N) are allocated. The queues 1300A-N may be of any size and may be dynamically allocated so that they may increase or decrease depending on the available memory. Each queue 1300A-N or a subset of queues 1300A-N may be associated with a communication end-point, such as a program, thread, process, or virtual machine.

As packets 1302A, 1302B, 1302N (collectively referred to as 1302A-N) are received by the packet parser 108, they may be enqueued in one of the queues 1300A-N. The packet parser 108 inspects the contents of the incoming packet 1302A-N using packet inspection mechanisms, for example, using a TCP Offload Engine (TOE) and corresponding features. Looking up the layers in the packet's encapsulation, the packet parser 108 is able to determine the Source/Destination, Traffic-handling and meta-data markings, application, or even the data contents. Using this information, and possibly information about the state of the system, the packet parser 108 will steer the packet 1302A-N to a particular queue 1300A-N. In some implementations, if an appropriate queue does not exist, the packet parser 108 may act to create one. The packet parser 108 or another component of the NID 102 may allocate memory for the new queue and create an entry in a queue data dictionary 1304. The queue data dictionary may store various characteristics of the queues 1300A-N, such as the queue name, priority, maximum or minimum size, associated computing unit, associated process or thread, associated program, or the like.

The coordinator circuit 110 monitors the queues 1300A-N. Additionally, the coordinator circuit 110 may also monitor the computing unit, process, thread, program, or other destination associated with a queue 1300A-N. Each queue 1300A-N may have a designated priority. Priorities may range from zero to seven for example, with zero being a highest priority and seven being the lowest. Other ranges of values may be used, for example 1-8, 1-100, 1-5, etc. and other priority schemes may be used, for example, five is the highest priority and one is the lowest. Priorities may be assigned based on what type of data is to be stored in the queue, what application is associated with the queue, user preferences, etc. For instance, a queue that handles data for a real-time interface, such as real-time video, speech, traffic information, vehicle control systems, map data, virtual reality applications, online gaming, and the like.

The coordinator circuit 110 may monitor a CPU cache (e.g., L1 instruction cache 152A-N. L2 cache 156A-N. or L3 cache 160). If the cache has instructions or will have instructions in it soon that are used to process packets associated with a particular queue, then the coordinator circuit 110 assign a higher priority to the that particular queue 1300A-N.

Periodically, the coordinator circuit 110 may determine the queue 1300A-N with the highest priority and forward a group of packets from the winning queue (e.g., queue 1300N) to a processing element (e.g., core A 150A data cache 154A). Processing elements include, but are not limited to processes, threads, virtual machines, and FPGAs. The group of packets may be of any number, for example thirty-two packets. The group of packets represent packets that are processed by the process, thread, instruction, virtual machine, or other processing element that is currently executing or will be executing soon. Batch processing increases the efficiency of processing and packet throughput. And forwarding packet data into the caches of a processing elements that will be executing soon makes that processing element more efficient in that it has data to process already loaded into the relevant caches, and dos not need to first load it.

The coordinator circuit 110 may enforce a traffic regulation policy. In a committed information rate (CIR) based system, the coordinator circuit 110 may take tokens from a token bucket for each packet sent from the queue for processing. A token may be returned to the token bucket after the thread, process, program, etc. has finished processing the packet. Tokens may also be refreshed at a periodic rate. For example, if there is a certain bandwidth the port is trying to reach, the tokens would be refreshed at a rate equivalent to the desired bandwidth. The number of tokens used restricts the rate of transfer from the queue 1300A-N to the processing element.

The CIR is the bandwidth that is guaranteed by a service provider. Above the CIR is an allowance of burstable bandwidth, which may be expressed as the excess information rate (EIR). The sum of the CR and EIR is the peak information rate (PIR). In some embodiments, the coordinator circuit 110 may transmit at higher than PIR for a temporary period.

Alternatively, the coordinator circuit 110 may enforce a round robin policy. In general, round robin policies attempt to balance fairness of processing time with data throughput. While each queue may be serviced for roughly equal periods, those queues with more data may not be able to move their data through as quickly. Other round robin variants may be used, like deficit weighted round robin or weighted fair queueing.

In an example round robin priority scheme, a priority-based scheduler goes round and round, at each time-tick deciding which queue to service. With strict-priority, at each tick the scheduler looks at queues from top-to-bottom by priority, and services the first queue that is not empty. Thus if a queue is empty, the next lowest priority queue is examined; if not, the highest non-empty queue is serviced in this time-tick. With weights, the scheduler may allocate K time-ticks to a queue with priority K, and 2K time-ticks to a queue with double the priority. Thus, each queue gets serviced for a portion of total time based on its priority. Other more complex methods exists as to how the queue scheduler decides which queue to service next, and for how long (e.g., it can look at the queue occupancy, at the length of packets waiting, etc.).

In another example round robin priority scheme, with four queues that have a high priority and three queues at a low priority, the system may round robin among the four high priority queues until they are empty, then round robin among the 3 low priority queues.

Figure 14:
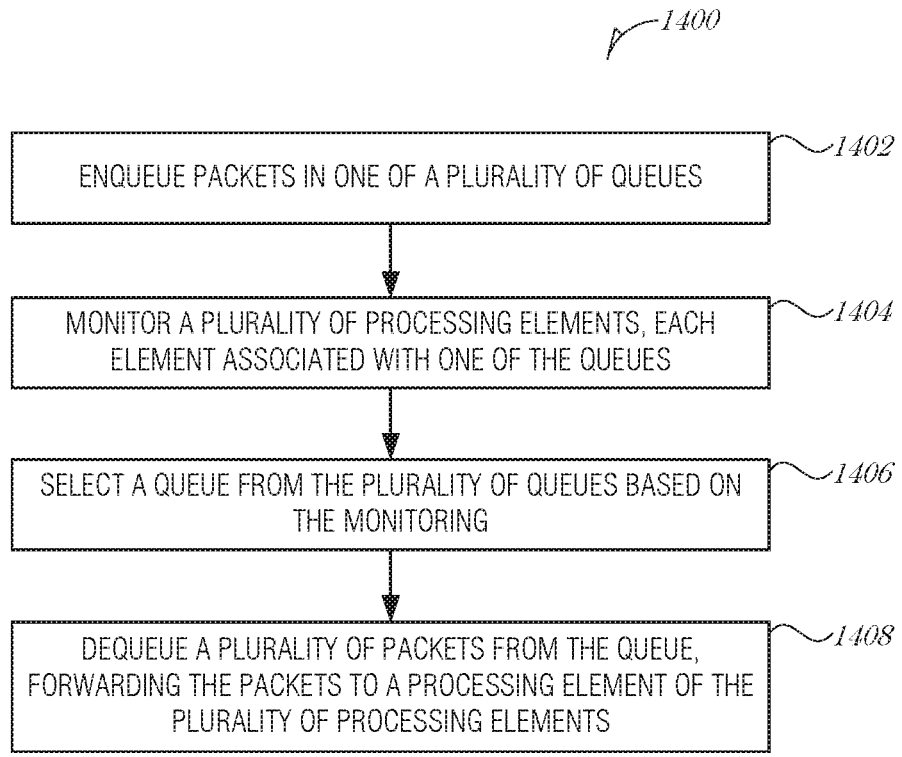
FIG. 14 is a flowchart illustrating a method for packet processing, according to an embodiment.

FIG. 14 is a flowchart illustrating a method 1400 for packet processing, according to an embodiment. As packets are received at a NIC, they are enqueued on one of a plurality of queues (operation 1402). The packets are divided among the queues based on the packets' contents. Packets that are similar or may be processed using similar instructions or processing units may be queued together. In this manner, the packets are likely to be processed more efficiently when eventually forwarded together to the processing unit.

Each queue may have a priority assigned to it. The queues may be associated with one of a plurality of processing elements. Processing elements include, but are not limited to processes, threads, virtual machines, and FPGAs (which may include a portion of an FPGA or multiple FPGAs working together). The processing elements are monitored (operation 1404). Monitoring may include determining which instructions are in cache (in the case of a process or thread), determining which instructions are likely to be put in cache soon, determining which virtual machine is loaded, determining how an FPGA is currently configured, etc. As the monitoring is conducted, the priority of the queue may be increased or decreased. The priority may be increased if, for example, the instructions currently in cache are ones that would operate on the data in the queue (e.g., a cache hit). The priority may be decreased if, for example, the instructions needed to process the data in the queue are currently in main memory—in other words, a cache miss is likely.

At operation 1406, a queue is selected from the plurality of queues based on the monitoring. For instance, the queue with the highest priority at the time of the next processing window is selected. A number of packets are dequeued from the selected queue and forwarded to the processing element in order to be processed. The number of packets is arbitrary and may be set by the designer or operator, or be determined by the results of monitoring of processing elements, as described above. In various embodiments, the number of packets is thirty-two, sixty-four, or as many as the data cache may hold.

Figure 15:
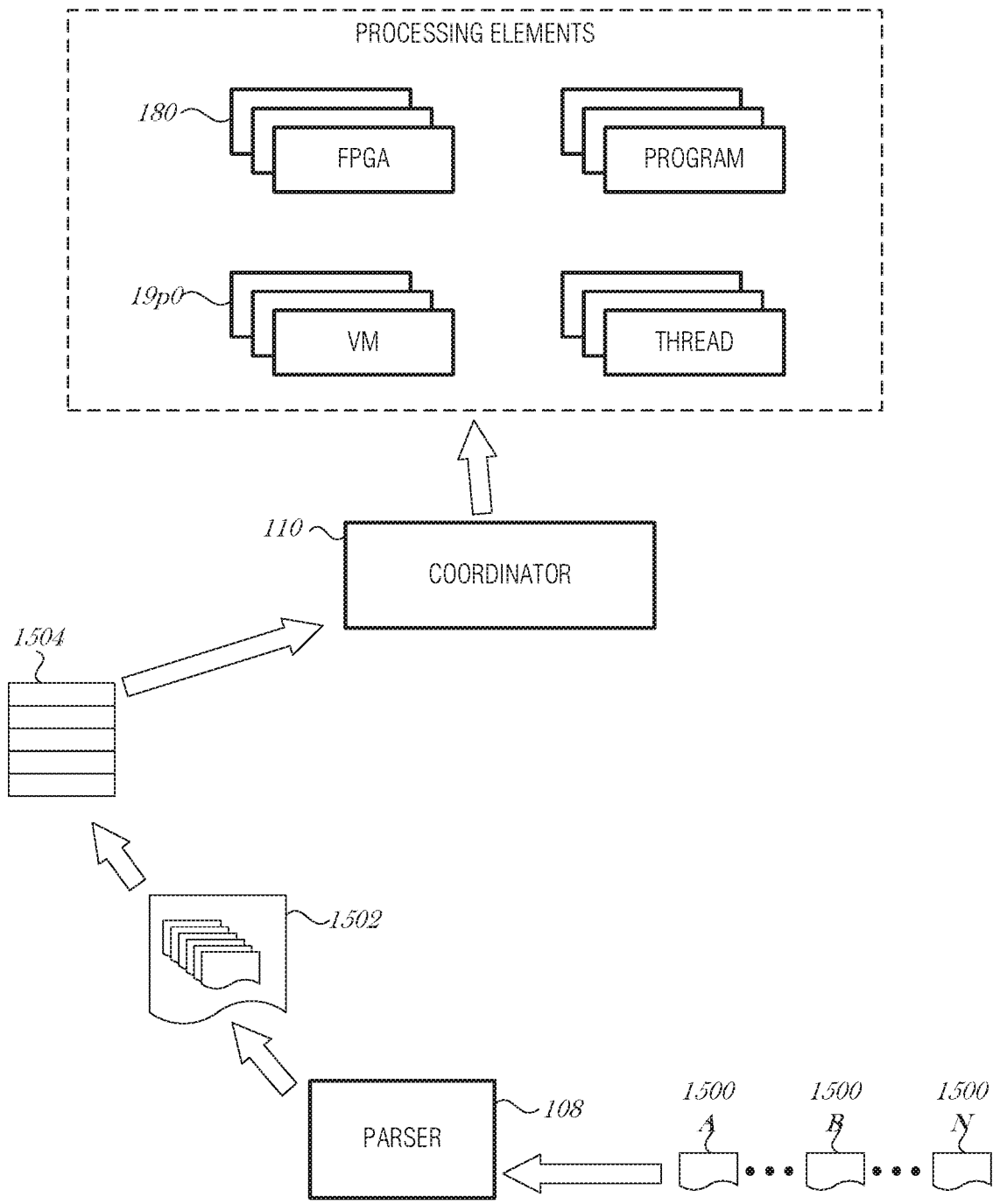
FIG. 15 is a schematic diagram illustrating another example of packet processing, according to an embodiment.

FIG. 15 is a schematic diagram illustrating another example of packet processing, according to an embodiment. In networking, large receive offload (LRO) is a mechanism to increase data throughput and reduce CPU overhead. LRO reassembles multiple incoming packets 1500A, 1500B, 1500N (collectively referred to as 1500A-N) into a combined packet 1502. The resulting combined packet 1502 is stored in the buffer 1504 before it is passed up the networking stack. As such, the CPU has to process fewer packets and is able to obtain more data in each packet transaction.

The combined packet 1502 is analyzed by the coordinator circuit 110 (or the parser 108) to determine the instructions, process, thread, virtual machine, FPGA, or other processing element, that it requires. Forwarding decisions made by the coordinator circuit 110 are then based on whether the processing element is ready.

Alternatively, the coordinator circuit 110 may determine the appropriate processing element for a combined packet 1502 and request that the processing element be loaded. For instance, the coordinator circuit 110 may determine that the combined packet 1502 is an image file, and that a certain set of instructions are needed to process the image file. The coordinator circuit 110 may request that the instructions are loaded into CPU cache so that when the combined packet 1502 is forwarded to the CPU, the CPU is able to act upon it without delay. Similarly, in the instance of a reconfigurable FPGA environment, the coordinator circuit 110 may request or cause the FPGA 180 to reconfigure itself in order to prepare for the incoming combined packet 1502. Virtual machines, processes, threads, and other processing elements may be managed in a similar manner.

As another alternative, the coordinator circuit 110 may cause the processing element to load the correct program, instructions, partition, persona, etc., by forwarding dummy data of the same type of the combined packet 1502. For example, the combined packet 1502 may be image data. An FPGA may be programmed to handle digital signal processing. In order to cause the FPGA to reprogram itself, the coordinator circuit 110 may forward an image packet. The image packet may be from a repository of dummy packets used for this type of triggering mechanism. In response to receiving the image packet, the FPGA may reconfigure itself to handle the new data. This may be done in parallel to receiving additional packets comprising part of the 1502 packet. The coordinator circuit 110 may then cancel the processing of the dummy image packet and forward the combined packet 1502 for processing.

With improved look ahead and other processing techniques, the combined packet 1502 may be processed nearly immediately after having been received and reassembled in the buffer 1504. For instance, packet headers may be inspected at the beginning of the LRO operation to determine a data type, file type, or other information about the data in the packets 1500A-N. In anticipation of receiving a number of packets, and before the packet reassembly is complete, a triggering dummy packet may be forwarded to the FPGA 180 in order to cause reprogramming. In this manner, by the time the combined packet 1502 is assembled and put into the buffer 1504, the FPGA 180 may be reprogrammed and ready for processing. The coordinator circuit 110 may cancel the dummy job and then forward the combined packet 1502 from the buffer 1504. Using this mechanism, the combined packet 1502 would wait a minimum amount of time in buffer 1504. Instead of one combined packet 1502, there may be multiple combined packets 1502 to transfer large data sets, such as image date. In this case, multiple combined packets 1502 may go to the FPGA 180 for processing.

Instead of LRO, other types of offloading may be used, for example generic receive offload (GRO), which uses a different criteria for packet merging.

Figure 16:
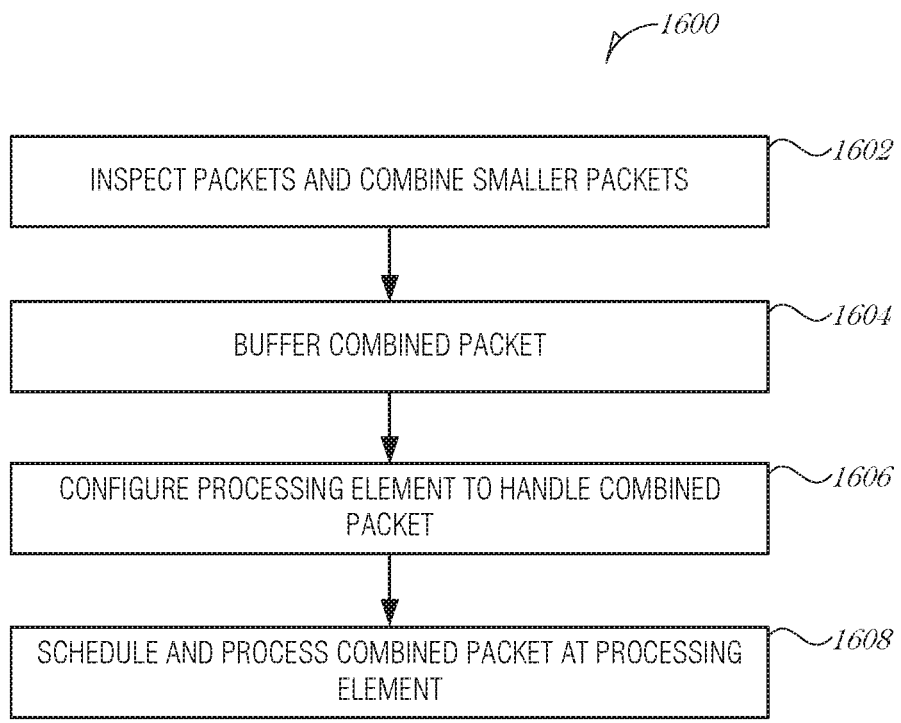
FIG. 16 is a flowchart illustrating a method for packet processing, according to an embodiment.

FIG. 16 is a flowchart illustrating a method 1600 for packet processing, according to an embodiment. As packets are received at a NIC, they are inspected and smaller packets are combined (operation 1602). This may be performed using TOE and LRO or GRO, for example. If packets are over a threshold size, then they may be buffered without being modified by LRO/GRO. At operation 1604, the combined packet (or large uncombined packet) is buffered.

At operation 1606, a processing element is configured to handle the next packet from the buffer. The processing element may be a thread, CPU core, virtual machine, FPGA, etc. At operation 1608, the combined packet is scheduled and processed by the processing element.

Figure 17:
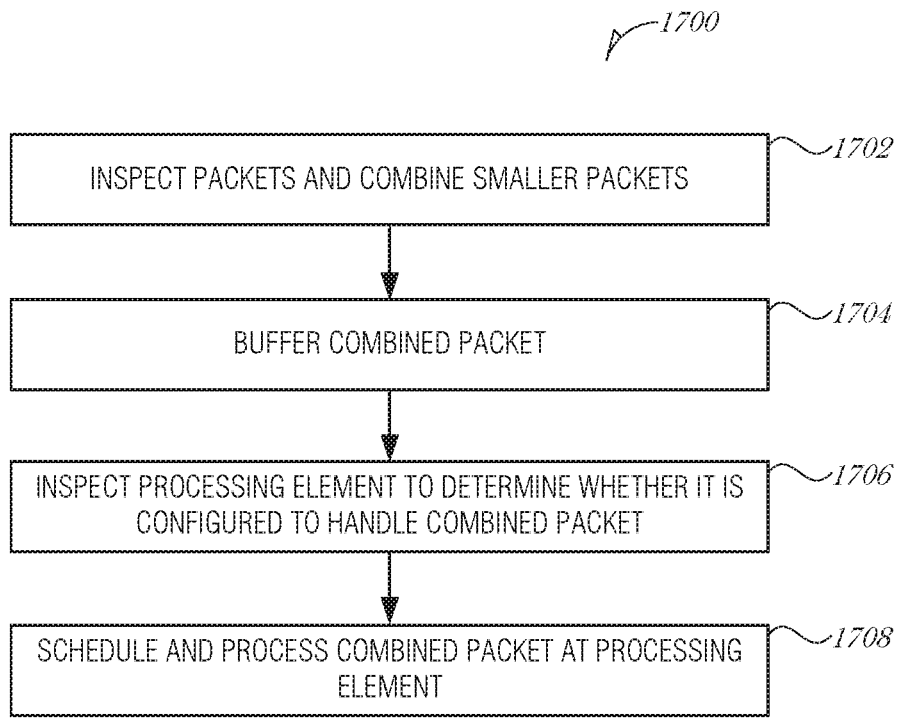
FIG. 17 is a flowchart illustrating a method for packet processing, according to an embodiment.

FIG. 17 is a flowchart illustrating a method 1700 for packet processing, according to an embodiment. As packets are received at a NIC, they are inspected and smaller packets are combined (operation 1702). This may be performed using TOE and LRO or GRO, for example. If packets are over a threshold size, then they may be buffered without being modified by LRO/GRO. At operation 1704, the combined packet (or large uncombined packet) is buffered.

At operation 1706, a processing element is inspected to determine whether the processing element is configured to handle the next packet from the buffer. The processing element may be a thread, CPU core, virtual machine, FPGA, GPU, coprocessor, portion of an FPGA, etc. If so, then at operation 1708, the combined packet is scheduled and processed by the processing element.

It is understood that the batch processing techniques described in this section may be used in combination with techniques from other sections in this document.

5. Additional Embodiments 5.a. Software Defined Networking

Some embodiments may use Software Defined Networking (SDN), which may be defined as the physical separation of the network control plane from the forwarding plane, and where a control plane controls several devices. This control plane that controls several devices may be implemented with an Intel Server or group of servers. This systems and methods described here may parse/process each incoming packet, identify a program or instructions set associated with the incoming packet, and send the packet and instructions to the NID-controlled portion of the cache, with the intent of reducing the risk of cache misses. In the case where coordinator circuit cannot control the instructions loaded in the cache, it may instruct the MMU to do it, or it may send a dummy packet that can be processed quickly to force the load of instructions.

In the case of the FPGA, the coordinator circuit 110 may verify that the FPGA has the necessary algorithms/partitions programmed and then program the missing partition(s) or simply forward the data/data packets if the necessary algorithms/partitions are already programmed. The coordinator circuit may also temporarily store packets that can be sent into the FPGA once it is loaded with the correct programming. Note that the data/data packets from these networked devices may be grouped together to be processed with the same algorithm in an LRO type fashion.

5.b. Network Function Virtualization

Another technology is Network Function Virtualization (NFV), which is an effort to make network services virtualized. These network services may then be implemented on servers, such as those supplied by Intel, and implement a specific function as processes or threads on their CPUs, or use Virtualization (virtual machines) that may be spawned as needed. As networking devices are added or traffic increases, more servers/virtual machines may be started to process the increase load. Using this mechanism described in this disclosure, the NID 102/coordinator circuit 110 may parse the NFV packet, determine the appropriate instructions to process the packet, and then forward NFV packet data and associated instructions to the CPU, virtual machine, FPGA, or other processing element's cache for processing. Similarly, the NID 102/coordinator circuit 110 may forward multiple packets that have been parsed and classified to use the same set of instructions.

5.c. Open Vswitch and Enhanced Berkeley Packet Filter

A ubiquitous form of packet handling on servers supporting VMs is a virtual switch, with OpenVswitch (OVS) being a common installation. A virtual switch forwards packets from VMs to the world via the system's NID, or from VM to VM, which may be done directly or also via the NID (e.g., VM1-to-NID-to-VM2). The usual implementation is that the NID serves only as a way to get packets from the physical media to the OVS and back. However, a NID with built-in processing elements, such as that described herein, may offload some of the operations of OVS and perform them on the NID, thus making OVS more efficient. Most commonly what is offloaded is the function of parsing incoming packets and doing a lookup with (some of) the parsing results to determine a set of actions to be applied to the packet, with the last (logically) action being forwarding it to desired destination(s).

Enhanced Berkeley Packet Filter (eBPF) is a technique by which a user of the system may write small programs, each of which does a relatively small and narrowly-defined set of operations on its input, and generates desired output. The user may then specify sequences of these small programs to be executed in order (e.g., user defines programs A, B, C, D, E, F, G, and H, and specifies two sequences of application A→B→F→H and A→B→C→D→G). This is commonly used with packets serving as input and (possibly modified) packets being output from each program. In this case, a suitably equipped NID, such as that described herein, may offload some or all of the operations of the user-supplied small programs, thus carrying out at least in part the sequence of operations to be applied to packets.

It is worth noting that OVS may be implemented so that the tasks of parsing, doing lookups, and applying the actions selected by the lookups may be implemented using eBPF (e.g., eBPF programs or perhaps a sequence of eBPF programs, are written to do the parsing, then some additional eBPF programs implement the desired lookups and apply actions to the packet). In such a case, a suitably-equipped NID, such as that described herein, that offloads some or all of the eBPF Operation also automatically ends up offloading OVS.

With an eBPF based implementation, the system manager may just install a new eBPF module into a running OVS without even having to stop it. As this happens, offloading the OVS kernel part also must have programmability, and moreover the OVS kernel part becomes a sequence of small elements, each logically independent, so a system designer may selectively offload some of the elements and arrange for them to interact with the elements left in the host. The result is that the system no longer has to offload all of the OVS kernel part. Again, with a more intelligent NIC, such as that described herein, and better cooperation/coordination with the host's state, a system designer is able to do a better job of deciding what to offload, and even have different set of offloads for different packet flows. For example, for some flows we will offload the tunneling/detunneling and decryption/encryption, and for others choose to let the host do that, based on knowledge of what the host state is. e.g., if an FPGA has a suitable partition to do these jobs.

5.d. Internet of Things

Further, the techniques in this application apply to the IoT fog. For example, the concept of TTL may imply that the packet should be dropped, as its data is no longer useful. For instance, a car is trying to get route information for an intersection to determine if it should go straight or turn. If that information arrives after a determination has been made (too late to change lanes or already past the intersection), there is no need to send that information. For this to work properly, time must be synchronized between device across the network (e.g., using techniques like IEEE 1588 and Synchronized Ethernet and/or wireless synchronization techniques).

5.e. Data Center Application

In today's data center, a significant amount of artificial intelligence and machine learning is being performed. This mechanisms described herein may facilitate these algorithms by loading the algorithm instructions into the cache with the data arriving. It may also preload the cache with parameters needed to facilitate the processing. For example in neural networks, the parameters or weights needed to run the neural network may be preloaded into the cache with the arriving data, thus allowing for JT processing of the incoming data. Similarly in an FPGA context, the FPGA may be reprogrammed to implement the Artificial Intelligence/Machine Learning/Neural Network in the FPGA, and then preload weights and other parameters prior to processing the incoming data. By allowing the necessary program, program data, and incoming data to be quickly accessed, the chance of a cache-miss/FPGA-miss is greatly reduce allowing for quick processing.

Additionally in Artificial Intelligence there are many tools. Two of the main tools are the Inference Engine (rules and deduction) and the Knowledge Base (an understanding of the problem). As new data sets arrive, the data may be compared with the knowledge base using rules, and deduce new knowledge. Using the mechanisms described herein, knowing that packets require artificial intelligence, the mechanisms described herein may load the knowledge base and rules for the incoming data, such that the cache has all required information for the knowledge base, inference engine, or other routines to allow the algorithm to produce results with a significantly reduced risk of a cache miss/FPGA miss.

Further, with knowledge of the time and processing, the coordinator circuit may feed additional data as needed. For example, if the Neural Network is trying to identify an incoming cat image versus other animals images. If the coordinator circuit knows that it takes 1 us to compare the incoming image to known images, the coordinator circuit may schedule that each image from the knowledge base be inserted into the coordinator controlled area of the cache every 1 us. For example, the algorithm may compare the incoming image against a human image, a horse image, a dog image, a cat image, a fish image, a whale image, and a bird image. Each one of those images may be placed in the cache (or FPGA) just prior to the time needed, so that there are no cache misses while processing the incoming image versus the compared images.

5.f Serializer-Deserializer (SERDES) and Other Components

Different technologies for SERDES and ASIC/MCM/Silicon Photonics/RAM in today's manufacturing a microchip may consist of multiple modules from different technology nodes. For example the SERDES may be using the latest 10 nm process, while the coordinator circuit. FPGA, and/or CPU may be using a 16 nm FinFET process or individually optimized processes. Likewise, the Silicon Photonics may use a process designed specifically for that technology, and the RAM may be using a process designed for high speed and high density. All of these components may then be combined in the microchip to provide the mechanisms described herein. The chips may communicate with each other over a substrate or other means. Note the technologies mentioned may vary. For example, the components may use any of these nodes: 45 nm, 28 nm, 22 nm, 16 nm, 14 nm, 10 nm, 8 nm, etc. Each die in the multichip module may be developed on the same or different process nodes.

5.g. Data Plane Development Kit (DPDK)

Many NIDs include some virtualization mechanism. One common mechanism is single root input/output virtualization (SR-IOV). Using a virtualization mechanism the client (e.g., a VM, container, or even a thread) on the host is given the illusion that it has its own NID with one or more ports to the wire. The client then may use DPDK to read/write packets to/from this virtual NID, which is a virtual entity maintained by a real NID, bypassing the host's kernel and the usual packet handling mechanism. As an advantage, the bypassing is faster. However, each client has to basically have a copy of everything for networking and because the clients do not know that they are not alone, they may experience the "noisy neighbor" problem, affecting other clients.

Because the packets bypass the host's kernel, the NID is now closer to the VM/container that is the packet source or destination. The host operating system (OS) still controls which VM/container runs and when, and still has the same caches as before using the virtualization mechanism. The host's MMU allows the NID to read/write packets from the host's main memory in locations assigned/owned by a given VM/container. When a special function is needed by a VM/container/thread or other client, the client may still use coprocessors, GPUs, FPGAs, etc.

Using the systems and mechanisms described herein, if a NID has better knowledge of when a VM/container will be executing, and how the MMU allocated memory, and cache or FPGA contents, the various prioritizations, queuing, scheduling, loading, eviction, and other mechanisms described here may be applied. The NID may still apply some operations to the packet and then schedule it for delivery to/from a client. The NID may interface with DPDK to determine when the VM/container may run, for example, and then use DPDK libraries to forward the packet for processing. As another example, the NID may interface with DPDK and determine that the VM/container is suspended for a long time, and as a result may drop a packet from a packet buffer or queue.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 18:
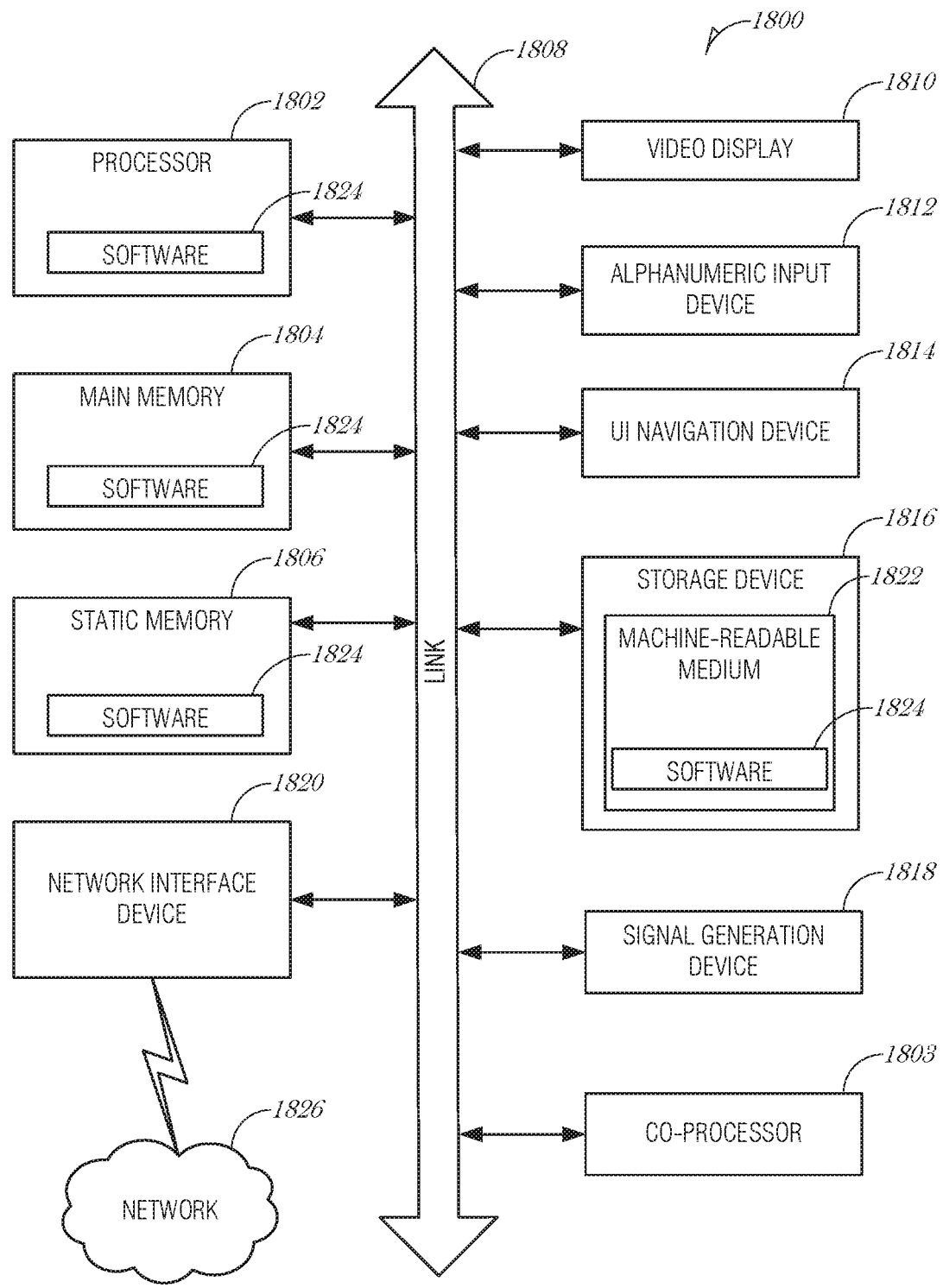
FIG. 18 is a block diagram illustrating an example machine upon which any one or more of the techniques (e.g., methodologies) discussed herein may perform, according to an example embodiment.

FIG. 18 is a block diagram illustrating a machine in the example form of a computer system 1800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1800 includes at least one processor 1802 (e.g., a central processing unit (CPU), a graphics processing unit (GPU) or both, processor cores, compute nodes, etc.), at least one co-processor 1803 (e.g., FPGA, specialized GPU, ASIC, etc.), a main memory 1804 and a static memory 1806, which communicate with each other via a link 1808 (e.g., bus). The computer system 1800 may further include a video display unit 1810, an alphanumeric input device 1812 (e.g., a keyboard), and a user interface (UI) navigation device 1814 (e.g., a mouse). In one embodiment, the video display unit 1810, input device 1812 and UI navigation device 1814 are incorporated into a touch screen display. The computer system 1800 may additionally include a storage device 1816 (e.g., a drive unit), a signal generation device 1818 (e.g., a speaker), a network interface device 1820, and one or more sensors (not shown), such as a global positioning system (GPS) sensor, compass, accelerometer, gyrometer, magnetometer, or other sensor.

The storage device 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804, static memory 1806, and/or within the processor 1802 during execution thereof by the computer system 1800, with the main memory 1804, static memory 1806, and the processor 1802 also constituting machine-readable media.

While the machine-readable medium 1822 is illustrated in an example embodiment to be a single medium, the term "machine-readable medium" may include a single medium or multiple media (e.g., a centralized or distributed database, and/or associated caches and servers) that store the one or more instructions 1824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1824 may further be transmitted or received over a communications network 1826 using a transmission medium via the network interface device 1820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Network interface device 1820 may be configured or programmed to implement the methodologies described herein. In particular, the network interface device 1820 may provide various aspects of packet inspection, aggregation, queuing, and processing. The network interface device 1820 may also be configured or programmed to communicate with a memory management unit (MMU), processor 1802, main memory 1804, static memory 1806, or other components of the system 1800 over the link 1808. The network interface device 1820 may query or otherwise interface with various components of the system 1800 to inspect cache memory; trigger or cease operations of a virtual machine, process, or other processing element; or otherwise interact with various computing units or processing elements that are in the system 1800 or external from the system 1800.

Additional Notes & Examples

Example 1 is a network interface device for implementing intelligent packet aggregation, the network interface device comprising: a packet parser to receive a plurality of packets and route each packet of the plurality of packets to a queue of a plurality of queues, the packets divided among the queues based on the packets' characteristics; and a coordinator circuit to: interface with a processing element to determine a current operational state of the processing element; select a queue from the plurality of queues based on the current operational state of the processing element; and forward a number of packets from the selected queue to the processing element.

In Example 2, the subject matter of Example 1 optionally includes wherein the processing element comprises a computing process.

In Example 3, the subject matter of any one or more of Examples 1-2 optionally include wherein the processing element comprises a thread.

In Example 4, the subject matter of any one or more of Examples 1-3 optionally include wherein the processing element comprises a virtual machine.

In Example 5, the subject matter of any one or more of Examples 1-4 optionally include wherein the processing element comprises a field-programmable gate array (FPGA) program.

In Example 6, the subject matter of any one or more of Examples 1-5 optionally include wherein the packet parser includes a TCP offload engine to inspect the packets.

In Example 7, the subject matter of any one or more of Examples 1-6 optionally include wherein the packet parser is to: attempt to identify a queue of the plurality of queues that corresponds to a particular packet; allocate a new queue when the identification fails; and store the particular packet in the new queue.

In Example 8, the subject matter of any one or more of Examples 1-7 optionally include wherein to interface with the processing element, the coordinator circuit is to interface with a memory management unit (MMU) to inspect a cache memory associated with the processing element.

In Example 9, the subject matter of any one or more of Examples 1-8 optionally include wherein the current operational state of the processing element comprises a current operating thread.

In Example 10, the subject matter of any one or more of Examples 1-9 optionally include wherein the current operational state of the processing element comprises a current operating process.

In Example 11, the subject matter of any one or more of Examples 1-10 optionally include wherein the current operational state of the processing element comprises a current operating virtual machine.

In Example 12, the subject matter of any one or more of Examples 1-11 optionally include wherein the current operational state of the processing element comprises a current FPGA configuration.

In Example 13, the subject matter of any one or more of Examples 1-12 optionally include wherein to select the queue from the plurality of queues, the coordinator circuit is to: determine a current priority associated a set of queues of the plurality of queues; and select a queue with a highest priority from the set of queues.

In Example 14, the subject matter of Example 13 optionally includes wherein the current priority of a queue is increased when the current operational state indicates that the processing element is able to process packets stored in the queue.

In Example 15, the subject matter of any one or more of Examples 13-14 optionally include wherein the current priority of a queue is decreased when the current operational state indicates that the processing element is unable to process packets stored in the queue.

In Example 16, the subject matter of any one or more of Examples 1-15 optionally include wherein to forward the number of packets from the selected queue to the processing element, the coordinator circuit is to enforce a traffic regulation policy while forwarding the packets.

In Example 17, the subject matter of Example 16 optionally includes wherein the traffic regulation policy comprises a committed information rate mechanism.

In Example 18, the subject matter of any one or more of Examples 16-17 optionally include wherein the traffic regulation policy comprises a round robin mechanism.

In Example 19, the subject matter of any one or more of Examples 1-18 optionally include wherein the number of packets is thirty-two packets.

Example 20 is a method of implementing intelligent packet aggregation, the method comprising: receiving, at a packet parser, a plurality of packets and route each packet of the plurality of packets to a queue of a plurality of queues, the packets divided among the queues based on the packets' characteristics; interfacing with a processing element to determine a current operational state of the processing element; selecting a queue from the plurality of queues based on the current operational state of the processing element; and forwarding a number of packets from the selected queue to the processing element.

In Example 21, the subject matter of Example 20 optionally includes wherein the processing element comprises a computing process.

In Example 22, the subject matter of any one or more of Examples 20-21 optionally include wherein the processing element comprises a thread.

In Example 23, the subject matter of any one or more of Examples 20-22 optionally include wherein the processing element comprises a virtual machine.

In Example 24, the subject matter of any one or more of Examples 20-23 optionally include wherein the processing element comprises a field-programmable gate array (FPGA) program.

In Example 25, the subject matter of any one or more of Examples 20-24 optionally include wherein the packet parser includes a TCP offload engine to inspect the packets.

In Example 26, the subject matter of any one or more of Examples 20-25 optionally include attempting to identify a queue of the plurality of queues that corresponds to a particular packet; allocating a new queue when the identification fails; and storing the particular packet in the new queue.

In Example 27, the subject matter of any one or more of Examples 20-26 optionally include interfacing with the processing element comprises interfacing with a memory management unit (MMU) to inspect a cache memory associated with the processing element.

In Example 28, the subject matter of any one or more of Examples 20-27 optionally include wherein the current operational state of the processing element comprises a current operating thread.

In Example 29, the subject matter of any one or more of Examples 20-28 optionally include wherein the current operational state of the processing element comprises a current operating process.

In Example 30, the subject matter of any one or more of Examples 20-29 optionally include wherein the current operational state of the processing element comprises a current operating virtual machine.

In Example 31, the subject matter of any one or more of Examples 20-30 optionally include wherein the current operational state of the processing element comprises a current FPGA configuration.

In Example 32, the subject matter of any one or more of Examples 20-31 optionally include wherein selecting the queue from the plurality of queues comprises: determining a current priority associated a set of queues of the plurality of queues; and selecting a queue with a highest priority from the set of queues.

In Example 33, the subject matter of Example 32 optionally includes wherein the current priority of a queue is increased when the current operational state indicates that the processing element is able to process packets stored in the queue.

In Example 34, the subject matter of any one or more of Examples 32-33 optionally include wherein the current priority of a queue is decreased when the current operational state indicates that the processing element is unable to process packets stored in the queue.

In Example 35, the subject matter of any one or more of Examples 20-34 optionally include wherein forwarding the number of packets from the selected queue to the processing element comprises enforcing a traffic regulation policy while forwarding the packets.

In Example 36, the subject matter of Example 35 optionally includes wherein the traffic regulation policy comprises a committed information rate mechanism.

In Example 37, the subject matter of any one or more of Examples 35-36 optionally include wherein the traffic regulation policy comprises a round robin mechanism.

In Example 38, the subject matter of any one or more of Examples 20-37 optionally include wherein the number of packets is thirty-two packets.

Example 39 is at least one machine-readable medium including instructions, which when executed by a machine, cause the machine to perform operations of any of the methods of Examples 20-38.

Example 40 is an apparatus comprising means for performing any of the methods of Examples 20-38.

Example 41 is an apparatus for implementing intelligent packet aggregation, the apparatus comprising: means for receiving, at a packet parser, a plurality of packets and route each packet of the plurality of packets to a queue of a plurality of queues, the packets divided among the queues based on the packets' characteristics; means for interfacing with a processing element to determine a current operational state of the processing element; means for selecting a queue from the plurality of queues based on the current operational state of the processing element; and means for forwarding a number of packets from the selected queue to the processing element.

In Example 42, the subject matter of Example 41 optionally includes wherein the processing element comprises a computing process.

In Example 43, the subject matter of any one or more of Examples 41-42 optionally include wherein the processing element comprises a thread.

In Example 44, the subject matter of any one or more of Examples 41-43 optionally include wherein the processing element comprises a virtual machine.

In Example 45, the subject matter of any one or more of Examples 41-44 optionally include wherein the processing element comprises a field-programmable gate array (FPGA) program.

In Example 46, the subject matter of any one or more of Examples 41-45 optionally include wherein the packet parser includes a TCP offload engine to inspect the packets.

In Example 47, the subject matter of any one or more of Examples 41-46 optionally include means for attempting to identify a queue of the plurality of queues that corresponds to a particular packet; means for allocating a new queue when the identification fails; and means for storing the particular packet in the new queue.

In Example 48, the subject matter of any one or more of Examples 41-47 optionally include the means for interfacing with the processing element comprise means for interfacing with a memory management unit (MMU) to inspect a cache memory associated with the processing element.

In Example 49, the subject matter of any one or more of Examples 41-48 optionally include wherein the current operational state of the processing element comprises a current operating thread.

In Example 50, the subject matter of any one or more of Examples 41-49 optionally include wherein the current operational state of the processing element comprises a current operating process.

In Example 51, the subject matter of any one or more of Examples 41-50 optionally include wherein the current operational state of the processing element comprises a current operating virtual machine.

In Example 52, the subject matter of any one or more of Examples 41-51 optionally include wherein the current operational state of the processing element comprises a current FPGA configuration.

In Example 53, the subject matter of any one or more of Examples 41-52 optionally include wherein the means for selecting the queue from the plurality of queues comprise: means for determining a current priority associated a set of queues of the plurality of queues; and means for selecting a queue with a highest priority from the set of queues.

In Example 54, the subject matter of Example 53 optionally includes wherein the current priority of a queue is increased when the current operational state indicates that the processing element is able to process packets stored in the queue.

In Example 55, the subject matter of any one or more of Examples 53-54 optionally include wherein the current priority of a queue is decreased when the current operational state indicates that the processing element is unable to process packets stored in the queue.

In Example 56, the subject matter of any one or more of Examples 41-55 optionally include wherein the means for forwarding the number of packets from the selected queue to the processing element comprise means for enforcing a traffic regulation policy while forwarding the packets.

In Example 57, the subject matter of Example 56 optionally includes wherein the traffic regulation policy comprises a committed information rate mechanism.

In Example 58, the subject matter of any one or more of Examples 56-57 optionally include wherein the traffic regulation policy comprises a round robin mechanism.

In Example 59, the subject matter of any one or more of Examples 41-58 optionally include wherein the number of packets is thirty-two packets.

Example 60 is at least one machine-readable medium including instructions for implementing intelligent packet aggregation, which when executed by a machine, cause the machine to: receive, at a packet parser, a plurality of packets and route each packet of the plurality of packets to a queue of a plurality of queues, the packets divided among the queues based on the packets' characteristics; interface with a processing element to determine a current operational state of the processing element; select a queue from the plurality of queues based on the current operational state of the processing element; and forward a number of packets from the selected queue to the processing element.

In Example 61, the subject matter of Example 60 optionally includes wherein the processing element comprises a computing process.

In Example 62, the subject matter of any one or more of Examples 60-61 optionally include wherein the processing element comprises a thread.

In Example 63, the subject matter of any one or more of Examples 60-62 optionally include wherein the processing element comprises a virtual machine.

In Example 64, the subject matter of any one or more of Examples 60-63 optionally include wherein the processing element comprises a field-programmable gate array (FPGA) program.

In Example 65, the subject matter of any one or more of Examples 60-64 optionally include wherein the packet parser includes a TCP offload engine to inspect the packets.

In Example 66, the subject matter of any one or more of Examples 60-65 optionally include instructions to: attempt to identify a queue of the plurality of queues that corresponds to a particular packet; allocate a new queue when the identification fails; and store the particular packet in the new queue.

In Example 67, the subject matter of any one or more of Examples 60-66 optionally include the instructions to interface with the processing element comprise instructions to interface with a memory management unit (MMU) to inspect a cache memory associated with the processing element.

In Example 68, the subject matter of any one or more of Examples 60-67 optionally include wherein the current operational state of the processing element comprises a current operating thread.

In Example 69, the subject matter of any one or more of Examples 60-68 optionally include wherein the current operational state of the processing element comprises a current operating process.

In Example 70, the subject matter of any one or more of Examples 60-69 optionally include wherein the current operational state of the processing element comprises a current operating virtual machine.

In Example 71, the subject matter of any one or more of Examples 60-70 optionally include wherein the current operational state of the processing element comprises a current FPGA configuration.

In Example 72, the subject matter of any one or more of Examples 60-71 optionally include wherein the instructions to select the queue from the plurality of queues comprise instructions to: determine a current priority associated a set of queues of the plurality of queues; and select a queue with a highest priority from the set of queues.

In Example 73, the subject matter of Example 72 optionally includes wherein the current priority of a queue is increased when the current operational state indicates that the processing element is able to process packets stored in the queue.

In Example 74, the subject matter of any one or more of Examples 72-73 optionally include wherein the current priority of a queue is decreased when the current operational state indicates that the processing element is unable to process packets stored in the queue.

In Example 75, the subject matter of any one or more of Examples 60-74 optionally include wherein the instructions to forward the number of packets from the selected queue to the processing element comprise instructions to enforce a traffic regulation policy while forwarding the packets.

In Example 76, the subject matter of Example 75 optionally includes wherein the traffic regulation policy comprises a committed information rate mechanism.

In Example 77, the subject matter of any one or more of Examples 75-76 optionally include wherein the traffic regulation policy comprises a round robin mechanism.

In Example 78, the subject matter of any one or more of Examples 60-77 optionally include wherein the number of packets is thirty-two packets.

Example 79 is a network interface device for implementing intelligent packet aggregation, the network interface device comprising: a packet parser to receive a plurality of packets and aggregate the plurality of packets into a combined packet; and a coordinator circuit to: interface with a processing element to determine a current operational state of the processing element; and forward the combined packet to the processing element based on the current operational state.

In Example 80, the subject matter of Example 79 optionally includes wherein the processing element comprises a computing process.

In Example 81, the subject matter of any one or more of Examples 79-80 optionally include wherein the processing element comprises a thread.

In Example 82, the subject matter of any one or more of Examples 79-81 optionally include wherein the processing element comprises a virtual machine.

In Example 83, the subject matter of any one or more of Examples 79-82 optionally include wherein the processing element comprises a field-programmable gate array (FPGA).

In Example 84, the subject matter of any one or more of Examples 79-83 optionally include wherein the packet parser includes a large receive offload engine to aggregate the plurality packets.

In Example 85, the subject matter of any one or more of Examples 79-84 optionally include wherein to interface with the processing element, the coordinator circuit is to interface with a memory management unit (MMU) to inspect a cache memory associated with the processing element.

In Example 86, the subject matter of any one or more of Examples 79-85 optionally include wherein the current operational state of the processing element comprises a current operating thread.

In Example 87, the subject matter of any one or more of Examples 79-86 optionally include wherein the current operational state of the processing element comprises a current operating process.

In Example 88, the subject matter of any one or more of Examples 79-87 optionally include wherein the current operational state of the processing element comprises a current operating virtual machine.

In Example 89, the subject matter of any one or more of Examples 79-88 optionally include wherein the current operational state of the processing element comprises a current FPGA configuration.

In Example 90, the subject matter of any one or more of Examples 79-89 optionally include wherein the current operational state of the processing element indicates that the processing element is unable to process the combined packet, and wherein the coordinator circuit is to request the processing element to reconfigure itself to an operational state where it is able to process the combined packet.

In Example 91, the subject matter of Example 90 optionally includes wherein to request the processing element to reconfigure itself, the coordinator circuit is to cause instructions to be loaded into an instruction cache of the processing element.

In Example 92, the subject matter of Example 91 optionally includes wherein to cause instructions to be loaded into the instruction cache, the coordinator circuit is to request a memory management unit (MMU) to load the instructions from main memory.

In Example 93, the subject matter of any one or more of Examples 91-92 optionally include wherein to cause instructions to be loaded into the instruction cache, the coordinator circuit is to forward a dummy packet of the same type as the combined packet in order to cause the instructions to be loaded into the instruction cache.

In Example 94, the subject matter of any one or more of Examples 90-93 optionally include wherein to request the processing element to reconfigure itself, the coordinator circuit is to request an FPGA to load a different function.

Example 95 is a method of implementing intelligent packet aggregation, the method comprising: receiving, at a packet parser, a plurality of packets and aggregate the plurality of packets into a combined packet; interfacing with a processing element to determine a current operational state of the processing element; and forwarding the combined packet to the processing element based on the current operational state.

In Example 96, the subject matter of Example 95 optionally includes wherein the processing element comprises a computing process.

In Example 97, the subject matter of any one or more of Examples 95-96 optionally include wherein the processing element comprises a thread.

In Example 98, the subject matter of any one or more of Examples 95-97 optionally include wherein the processing element comprises a virtual machine.

In Example 99, the subject matter of any one or more of Examples 95-98 optionally include wherein the processing element comprises a field-programmable gate array (FPGA).

In Example 100, the subject matter of any one or more of Examples 95-99 optionally include wherein the packet parser includes a large receive offload engine to aggregate the plurality packets.

In Example 101, the subject matter of any one or more of Examples 95-100 optionally include wherein interfacing with the processing element comprises interfacing with a memory management unit (MMU) to inspect a cache memory associated with the processing element.

In Example 102, the subject matter of any one or more of Examples 95-101 optionally include wherein the current operational state of the processing element comprises a current operating thread.

In Example 103, the subject matter of any one or more of Examples 95-102 optionally include wherein the current operational state of the processing element comprises a current operating process.

In Example 104, the subject matter of any one or more of Examples 95-103 optionally include wherein the current operational state of the processing element comprises a current operating virtual machine.

In Example 105, the subject matter of any one or more of Examples 95-104 optionally include wherein the current operational state of the processing element comprises a current FPGA configuration.

In Example 106, the subject matter of any one or more of Examples 95-105 optionally include wherein the current operational state of the processing element indicates that the processing element is unable to process the combined packet, and wherein the method comprises requesting the processing element to reconfigure itself to an operational state where it is able to process the combined packet.

In Example 107, the subject matter of Example 106 optionally includes wherein requesting the processing element to reconfigure itself comprises causing instructions to be loaded into an instruction cache of the processing element.

In Example 108, the subject matter of Example 107 optionally includes wherein causing instructions to be loaded into the instruction cache comprises requesting the MMU to load the instructions from main memory.

In Example 109, the subject matter of any one or more of Examples 107-108 optionally include wherein causing instructions to be loaded into the instruction cache comprises forwarding a dummy packet of the same type as the combined packet in order to cause the instructions to be loaded into the instruction cache.

In Example 110, the subject matter of any one or more of Examples 106-109 optionally include wherein requesting the processing element to reconfigure itself comprises requesting an FPGA to load a different function.

Example 111 is at least one machine-readable medium including instructions, which when executed by a machine, cause the machine to perform operations of any of the methods of Examples 95-110.

Example 112 is an apparatus comprising means for performing any of the methods of Examples 95-110.

Example 113 is an apparatus for implementing intelligent packet aggregation, the apparatus comprising: means for receiving, at a packet parser, a plurality of packets and aggregate the plurality of packets into a combined packet; means for interfacing with a processing element to determine a current operational state of the processing element; and means for forwarding the combined packet to the processing element based on the current operational state.

In Example 114, the subject matter of Example 113 optionally includes wherein the processing element comprises a computing process.

In Example 115, the subject matter of any one or more of Examples 113-114 optionally include wherein the processing element comprises a thread.

In Example 116, the subject matter of any one or more of Examples 113-115 optionally include wherein the processing element comprises a virtual machine.

In Example 117, the subject matter of any one or more of Examples 113-116 optionally include wherein the processing element comprises a field-programmable gate array (FPGA).

In Example 118, the subject matter of any one or more of Examples 113-117 optionally include wherein the packet parser includes a large receive offload engine to aggregate the plurality packets.

In Example 119, the subject matter of any one or more of Examples 113-118 optionally include wherein the means for interfacing with the processing element comprise means for interfacing with a memory management unit (MMU) to inspect a cache memory associated with the processing element.

In Example 120, the subject matter of any one or more of Examples 113-119 optionally include wherein the current operational state of the processing element comprises a current operating thread.

In Example 121, the subject matter of any one or more of Examples 113-120 optionally include wherein the current operational state of the processing element comprises a current operating process.

In Example 122, the subject matter of any one or more of Examples 113-121 optionally include wherein the current operational state of the processing element comprises a current operating virtual machine.

In Example 123, the subject matter of any one or more of Examples 113-122 optionally include wherein the current operational state of the processing element comprises a current FPGA configuration.

In Example 124, the subject matter of any one or more of Examples 113-123 optionally include wherein the current operational state of the processing element indicates that the processing element is unable to process the combined packet, and wherein the apparatus comprises means for requesting the processing element to reconfigure itself to an operational state where it is able to process the combined packet.

In Example 125, the subject matter of Example 124 optionally includes wherein the means for requesting the processing element to reconfigure itself comprise means for causing instructions to be loaded into an instruction cache of the processing element.

In Example 126, the subject matter of Example 125 optionally includes wherein the means for causing instructions to be loaded into the instruction cache comprise means for requesting the MMU to load the instructions from main memory.

In Example 127, the subject matter of any one or more of Examples 125-126 optionally include wherein the means for causing instructions to be loaded into the instruction cache comprise means for forwarding a dummy packet of the same type as the combined packet in order to cause the instructions to be loaded into the instruction cache.

In Example 128, the subject matter of any one or more of Examples 124-127 optionally include wherein the means for requesting the processing element to reconfigure itself comprise means for requesting an FPGA to load a different function.

Example 129 is at least one machine-readable medium including instructions for implementing intelligent packet aggregation, which when executed by a machine, cause the machine to: receive, at a packet parser, a plurality of packets and aggregate the plurality of packets into a combined packet; interface with a processing element to determine a current operational state of the processing element; and forward the combined packet to the processing element based on the current operational state.

In Example 130, the subject matter of Example 129 optionally includes wherein the processing element comprises a computing process.

In Example 131, the subject matter of any one or more of Examples 129-130 optionally include wherein the processing element comprises a thread.

In Example 132, the subject matter of any one or more of Examples 129-131 optionally include wherein the processing element comprises a virtual machine.

In Example 133, the subject matter of any one or more of Examples 129-132 optionally include wherein the processing element comprises a field-programmable gate array (FPGA).

In Example 134, the subject matter of any one or more of Examples 129-133 optionally include wherein the packet parser includes a large receive offload engine to aggregate the plurality packets.

In Example 135, the subject matter of any one or more of Examples 129-134 optionally include wherein the instructions to interface with the processing element comprise instructions to interface with a memory management unit (MMU) to inspect a cache memory associated with the processing element.

In Example 136, the subject matter of any one or more of Examples 129-135 optionally include wherein the current operational state of the processing element comprises a current operating thread.

In Example 137, the subject matter of any one or more of Examples 129-136 optionally include wherein the current operational state of the processing element comprises a current operating process.

In Example 138, the subject matter of any one or more of Examples 129-137 optionally include wherein the current operational state of the processing element comprises a current operating virtual machine.

In Example 139, the subject matter of any one or more of Examples 129-138 optionally include wherein the current operational state of the processing element comprises a current FPGA configuration.

In Example 140, the subject matter of any one or more of Examples 129-139 optionally include wherein the current operational state of the processing element indicates that the processing element is unable to process the combined packet, and wherein the medium comprises instructions to request the processing element to reconfigure itself to an operational state where it is able to process the combined packet.

In Example 141, the subject matter of Example 140 optionally includes wherein the instructions to request the processing element to reconfigure itself comprise instructions to cause instructions to be loaded into an instruction cache of the processing element.

In Example 142, the subject matter of Example 141 optionally includes wherein the instructions to cause instructions to be loaded into the instruction cache comprise instructions to request the MMU to load the instructions from main memory.

In Example 143, the subject matter of any one or more of Examples 141-142 optionally include wherein the instructions to cause instructions to be loaded into the instruction cache comprise instructions to forward a dummy packet of the same type as the combined packet in order to cause the instructions to be loaded into the instruction cache.

In Example 144, the subject matter of any one or more of Examples 140-143 optionally include wherein the instructions to request the processing element to reconfigure itself comprise instructions to request an FPGA to load a different function.

Example 145 is a network interface device for implementing flexible packet processing, the network interface device comprising: a packet parser to: receive a packet; and determine from analyzing the packet, a corresponding processing element that is used to process the packet; and a coordinator circuit to: determine whether the processing element is active in a computing unit; load the processing element when it is not active; and forward the packet to the processing element.

In Example 146, the subject matter of Example 145 optionally includes wherein the processing element comprises a computing process.

In Example 147, the subject matter of any one or more of Examples 145-146 optionally include wherein the processing element comprises a thread.

In Example 148, the subject matter of any one or more of Examples 145-147 optionally include wherein the processing element comprises a virtual machine.

In Example 149, the subject matter of any one or more of Examples 145-148 optionally include wherein the processing element comprises a field-programmable gate array (FPGA) program.

In Example 150, the subject matter of any one or more of Examples 145-149 optionally include wherein the computing unit comprises a central processing unit (CPU).

In Example 151, the subject matter of any one or more of Examples 145-150 optionally include wherein the computing unit comprises a processor core.

In Example 152, the subject matter of any one or more of Examples 145-151 optionally include wherein the computing unit comprises a CPU complex.

In Example 153, the subject matter of any one or more of Examples 145-152 optionally include wherein the computing unit comprises a field-programmable gate array (FPGA).

In Example 154, the subject matter of any one or more of Examples 145-153 optionally include wherein the computing unit comprises a graphics processing unit (GPU).

In Example 155, the subject matter of any one or more of Examples 145-154 optionally include wherein to determine from analyzing the packet, the corresponding processing element that is used to process the packet, the packet parser is to use a TCP offload engine to inspect the packet and identify the corresponding processing element.

In Example 156, the subject matter of any one or more of Examples 145-155 optionally include wherein to determine whether the processing element is active in the computing unit, the coordinator circuit is to interface with the computing unit to determine whether the processing element is active.

In Example 157, the subject matter of Example 156 optionally includes wherein the computing unit is a processor core, and wherein to interface with the computing unit, the coordinator circuit is to receive an indication of the contents of a cache operated by the computing unit.

In Example 158, the subject matter of Example 157 optionally includes wherein the indication of the contents of the cache are provided by a memory management unit (MMU).

In Example 159, the subject matter of any one or more of Examples 156-158 optionally include wherein the computing unit is an FPGA, and wherein to interface with the computing unit, the coordinator circuit is to communicate with an FPGA interface to determine whether the processing element is active in the computing unit.

In Example 160, the subject matter of Example 159 optionally includes wherein the FPGA interface maintains a record of which FPGA programs have been loaded in the FPGA.

In Example 161, the subject matter of any one or more of Examples 145-160 optionally include wherein the computing unit is a processor core, and wherein to load the processing element when it is not active, the coordinator circuit is to store instructions and data in a cache of the processor core to process the packet.

In Example 162, the subject matter of Example 161 optionally includes wherein to store instructions and data in the cache of the processor core, the coordinator circuit is to pass an address to a cache controller of the processor core.

In Example 163, the subject matter of any one or more of Examples 161-162 optionally include wherein the cache includes a general use portion controlled by the processor core, and a reserved portion controlled by the network interface device.

In Example 164, the subject matter of any one or more of Examples 161-163 optionally include wherein to store the instructions and data, the coordinator circuit is to store the instructions and data in the general use portion controlled by the processor core.

In Example 165, the subject matter of any one or more of Examples 161-164 optionally include wherein to store the instructions and data, the coordinator circuit is to store the instructions and data in the reserved portion controlled by the network interface device.

In Example 166, the subject matter of Example 165 optionally includes wherein the coordinator circuit is to evict content from the reserved portion of the cache.

In Example 167, the subject matter of Example 166 optionally includes wherein to evict content from the reserved portion of the cache, the coordinator circuit is to: determine a priority of existing instructions loaded in the reserved portion of cache; determine a priority of instructions that are inactive and would need to be loaded into the reserved portion of cache to process the packet; and evict the existing instructions loaded in the reserved portion of cache when the priority of the existing instructions is lower than the priority of the inactive instructions.

In Example 168, the subject matter of any one or more of Examples 166-167 optionally include wherein to evict content from the reserved portion of the cache, the coordinator circuit is to: determine whether any packets are being processed by existing instructions loaded in the reserved portion of cache; and evict the existing instructions from the reserved portion of cache when they are not being used to process packets.

In Example 169, the subject matter of any one or more of Examples 166-168 optionally include wherein to evict content from the reserved portion of the cache, the coordinator circuit is to: check a time-to-live (TTL) value of existing instructions loaded in the reserved portion of cache; and evict the existing instructions from the reserved portion of cache after the TTL value has expired.

In Example 170, the subject matter of Example 169 optionally includes wherein the coordinator circuit is to increase the TTL value of existing instructions loaded in the reserved portion of cache when packets are forwarded to the reserved portion of the cache for processing by the existing instructions.

In Example 171, the subject matter of any one or more of Examples 145-170 optionally include wherein the computing unit is a processor core, and wherein to load the processing element when it is not active, the coordinator circuit is to: identify a statistical profile of the packet; assign a priority to the packet based on the statistical profile; and store instructions and data in a cache of the processor core to process the packet when the priority of the packet is higher than a priority of instructions in the cache.

In Example 172, the subject matter of Example 171 optionally includes wherein the statistical profile is maintained used an artificial intelligence process.

In Example 173, the subject matter of any one or more of Examples 171-172 optionally include wherein the artificial intelligence includes machine learning process.

In Example 174, the subject matter of any one or more of Examples 171-173 optionally include wherein the statistical profile is maintained using a packet processing histogram.

In Example 175, the subject matter of any one or more of Examples 145-174 optionally include wherein the computing unit is an FPGA, and wherein to load the processing element when it is not active, the coordinator circuit is to cause the FPGA to load a program into an FPGA partition.

In Example 176, the subject matter of Example 175 optionally includes wherein to load the program, the coordinator circuit is to interact with an FPGA interface controller.

In Example 177, the subject matter of Example 176 optionally includes wherein the FPGA includes a partition controlled by the FPGA, and a partition controlled by the FPGA interface controller.

In Example 178, the subject matter of Example 177 optionally includes wherein to load the program, the coordinator circuit is to load the program in the partition controlled by the FPGA.

In Example 179, the subject matter of any one or more of Examples 177-178 optionally include wherein to load the program, the coordinator circuit is to load the program in the partition controlled by the FPGA interface controller.

In Example 180, the subject matter of any one or more of Examples 177-179 optionally include wherein the FPGA interface controller is to unload programs from the partition controlled by the FPGA interface controller.

In Example 181, the subject matter of Example 180 optionally includes wherein to unload programs from the partition controlled by the FPGA interface controller, the FPGA interface controller is to: determine a priority of existing programs loaded in the partition controlled by the FPGA interface controller; determine a priority of a program that is inactive and would need to be loaded into the FPGA to process the packet; and reconfigure at least one of the existing programs in the partition controlled by the FPGA interface controller when the priority of the existing programs is lower than the priority of the program of the inactive processing element.

In Example 182, the subject matter of any one or more of Examples 180-181 optionally include wherein to unload programs from the partition controlled by the FPGA interface controller, the FPGA interface controller is to: determine whether any packets are being processed by an existing program loaded in the partition controlled by the FPGA interface controller; and unload the existing program from the partition controlled by the FPGA interface controller when it is not being used to process packets.

In Example 183, the subject matter of any one or more of Examples 180-182 optionally include wherein to unload programs from the partition controlled by the FPGA interface controller, the FPGA interface controller is to: check a time-to-live (TTL) value of an existing program loaded in the partition controlled by the FPGA interface controller; and unload the existing program from the partition controlled by the FPGA interface controller after the TTL value has expired.

In Example 184, the subject matter of Example 183 optionally includes wherein the FPGA interface controller is to increase the TTL value of the existing program loaded in the partition controlled by the FPGA interface controller when packets are forwarded to the partition controlled by the FPGA interface controller for processing by the existing program.

In Example 185, the subject matter of any one or more of Examples 145-184 optionally include wherein the computing unit is an FPGA, and wherein to load the processing element when it is not active, the coordinator circuit is to: identify a statistical profile of the packet; assign a priority to the packet based on the statistical profile; and reconfigure an existing program in the FPGA with a program to process the packet when the priority of the packet is higher than a priority of the existing program in the FPGA.

In Example 186, the subject matter of Example 185 optionally includes wherein the statistical profile is maintained used an artificial intelligence process.

In Example 187, the subject matter of any one or more of Examples 185-186 optionally include wherein the artificial intelligence includes machine learning process.

In Example 188, the subject matter of any one or more of Examples 185-187 optionally include wherein the statistical profile is maintained using a packet processing histogram.

Example 189 is a method of flexible packet processing, the method comprising: receiving a packet; determining from analyzing the packet, a corresponding processing element that is used to process the packet; determining whether the processing element is active in a computing unit; loading the processing element when it is not active; and forwarding the packet to the processing element.

In Example 190, the subject matter of Example 189 optionally includes wherein the processing element comprises a computing process.

In Example 191, the subject matter of any one or more of Examples 189-190 optionally include wherein the processing element comprises a thread.

In Example 192, the subject matter of any one or more of Examples 189-191 optionally include wherein the processing element comprises a virtual machine.

In Example 193, the subject matter of any one or more of Examples 189-192 optionally include wherein the processing element comprises a field-programmable gate array (FPGA) program.

In Example 194, the subject matter of any one or more of Examples 189-193 optionally include wherein the computing unit comprises a central processing unit (CPU).

In Example 195, the subject matter of any one or more of Examples 189-194 optionally include wherein the computing unit comprises a processor core.

In Example 196, the subject matter of any one or more of Examples 189-195 optionally include wherein the computing unit comprises a CPU complex.

In Example 197, the subject matter of any one or more of Examples 189-196 optionally include wherein the computing unit comprises a field-programmable gate array (FPGA).

In Example 198, the subject matter of any one or more of Examples 189-197 optionally include wherein the computing unit comprises a graphics processing unit (GPU).

In Example 199, the subject matter of any one or more of Examples 189-198 optionally include wherein determining the corresponding processing element that is used to process the packet comprises using a TCP offload engine to inspect the packet and identify the corresponding processing element.

In Example 200, the subject matter of any one or more of Examples 189-199 optionally include wherein determining whether the processing element is active in the computing unit comprises interfacing with the computing unit to determine whether the processing element is active.

In Example 201, the subject matter of Example 200 optionally includes wherein the computing unit is a processor core, and wherein interfacing with the computing unit comprises receiving an indication of the contents of a cache operated by the computing unit.

In Example 202, the subject matter of Example 201 optionally includes wherein the indication of the contents of the cache are provided by a memory management unit (MMU).

In Example 203, the subject matter of any one or more of Examples 200-202 optionally include wherein the computing unit is an FPGA, and wherein interfacing with the computing unit comprises communicating with an FPGA interface to determine whether the processing element is active in the computing unit.

In Example 204, the subject matter of Example 203 optionally includes wherein the FPGA interface maintains a record of which FPGA programs have been loaded in the FPGA.

In Example 205, the subject matter of any one or more of Examples 189-204 optionally include wherein the computing unit is a processor core, and wherein loading the processing element when it is not active comprises storing instructions and data in a cache of the processor core to process the packet.

In Example 206, the subject matter of Example 205 optionally includes wherein storing instructions and data in the cache of the processor core comprises passing an address to a cache controller of the processor core.

In Example 207, the subject matter of any one or more of Examples 205-206 optionally include wherein the cache includes a general use portion controlled by the processor core, and a reserved portion controlled by the network interface device.

In Example 208, the subject matter of any one or more of Examples 205-207 optionally include wherein storing the instructions and data comprises storing the instructions and data in the general use portion controlled by the processor core.

In Example 209, the subject matter of any one or more of Examples 205-208 optionally include wherein storing the instructions and data comprises storing the instructions and data in the reserved portion controlled by the network interface device.

In Example 210, the subject matter of Example 209 optionally includes evicting content from the reserved portion of the cache.

In Example 211, the subject matter of Example 210 optionally includes wherein evicting content from the reserved portion of the cache comprises: determining a priority of existing instructions loaded in the reserved portion of cache; determining a priority of instructions that are inactive and would need to be loaded into the reserved portion of cache to process the packet; and evicting the existing instructions loaded in the reserved portion of cache when the priority of the existing instructions is lower than the priority of the inactive instructions.

In Example 212, the subject matter of any one or more of Examples 210-211 optionally include evicting content from the reserved portion of the cache comprises: determining whether any packets are being processed by existing instructions loaded in the reserved portion of cache; and evicting the existing instructions from the reserved portion of cache when they are not being used to process packets.

In Example 213, the subject matter of any one or more of Examples 210-212 optionally include wherein evicting content from the reserved portion of the cache comprises: checking a time-to-live (TTL) value of existing instructions loaded in the reserved portion of cache; and evicting the existing instructions from the reserved portion of cache after the TTL value has expired.

In Example 214, the subject matter of Example 213 optionally includes increasing the TTL value of existing instructions loaded in the reserved portion of cache when packets are forwarded to the reserved portion of the cache for processing by the existing instructions.

In Example 215, the subject matter of any one or more of Examples 189-214 optionally include wherein the computing unit is a processor core, and wherein loading the processing element when it is not active comprises: identifying a statistical profile of the packet; assigning a priority to the packet based on the statistical profile; and storing instructions and data in a cache of the processor core to process the packet when the priority of the packet is higher than a priority of instructions in the cache.

In Example 216, the subject matter of Example 215 optionally includes wherein the statistical profile is maintained used an artificial intelligence process.

In Example 217, the subject matter of any one or more of Examples 215-216 optionally include wherein the artificial intelligence includes machine learning process.

In Example 218, the subject matter of any one or more of Examples 215-217 optionally include wherein the statistical profile is maintained using a packet processing histogram.

In Example 219, the subject matter of any one or more of Examples 189-218 optionally include wherein the computing unit is an FPGA, and wherein loading the processing element when it is not active comprises causing the FPGA to load a program into an FPGA partition.

In Example 220, the subject matter of Example 219 optionally includes wherein loading the program comprises interacting with an FPGA interface controller.

In Example 221, the subject matter of Example 220 optionally includes wherein the FPGA includes a partition controlled by the FPGA, and a partition controlled by the FPGA interface controller.

In Example 222, the subject matter of Example 221 optionally includes wherein loading the program comprises loading the program in the partition controlled by the FPGA.

In Example 223, the subject matter of any one or more of Examples 221-222 optionally include wherein loading the program comprises loading the program in the partition controlled by the FPGA interface controller.

In Example 224, the subject matter of any one or more of Examples 221-223 optionally include wherein the FPGA interface controller is to unload programs from the partition controlled by the FPGA interface controller.

In Example 225, the subject matter of Example 224 optionally includes wherein unloading programs from the partition controlled by the FPGA interface controller comprises: determining a priority of existing programs loaded in the partition controlled by the FPGA interface controller; determining a priority of a program that is inactive and would need to be loaded into the FPGA to process the packet; and reconfiguring at least one of the existing programs in the partition controlled by the FPGA interface controller when the priority of the existing programs is lower than the priority of the program of the inactive processing element.

In Example 226, the subject matter of any one or more of Examples 224-225 optionally include wherein unloading programs from the partition controlled by the FPGA interface controller comprises: determining whether any packets are being processed by an existing program loaded in the partition controlled by the FPGA interface controller; and unloading the existing program from the partition controlled by the FPGA interface controller when it is not being used to process packets.

In Example 227, the subject matter of any one or more of Examples 224-226 optionally include wherein unloading programs from the partition controlled by the FPGA interface controller comprises: checking a time-to-live (TTL) value of an existing program loaded in the partition controlled by the FPGA interface controller; and unloading the existing program from the partition controlled by the FPGA interface controller after the TTL value has expired.

In Example 228, the subject matter of Example 227 optionally includes wherein the FPGA interface controller is to increase the TTL value of the existing program loaded in the partition controlled by the FPGA interface controller when packets are forwarded to the partition controlled by the FPGA interface controller for processing by the existing program.

In Example 229, the subject matter of any one or more of Examples 189-228 optionally include wherein the computing unit is an FPGA, and wherein loading the processing element when it is not active comprises: identifying a statistical profile of the packet; assigning a priority to the packet based on the statistical profile; and reconfiguring an existing program in the FPGA with a program to process the packet when the priority of the packet is higher than a priority of the existing program in the FPGA.

In Example 230, the subject matter of Example 229 optionally includes wherein the statistical profile is maintained used an artificial intelligence process.

In Example 231, the subject matter of any one or more of Examples 229-230 optionally include wherein the artificial intelligence includes machine learning process.

In Example 232, the subject matter of any one or more of Examples 229-231 optionally include wherein the statistical profile is maintained using a packet processing histogram.

In Example 233, the subject matter of any one or more of Examples 189-232 optionally include wherein loading the processing element when it is not active comprises using a just in time (JIT) mechanism to configure the processing element to process the packet.

Example 234 is at least one machine-readable medium including instructions, which when executed by a machine, cause the machine to perform operations of any of the methods of Examples 189-233.

Example 235 is an apparatus comprising means for performing any of the methods of Examples 189-233.

Example 236 is an apparatus for implementing flexible packet processing, the apparatus comprising: means for receiving a packet; means for determining from analyzing the packet, a corresponding processing element that is used to process the packet; means for determining whether the processing element is active in a computing unit; means for loading the processing element when it is not active; and means for forwarding the packet to the processing element.

In Example 237, the subject matter of Example 236 optionally includes wherein the processing element comprises a computing process.

In Example 238, the subject matter of any one or more of Examples 236-237 optionally include wherein the processing element comprises a thread.

In Example 239, the subject matter of any one or more of Examples 236-238 optionally include wherein the processing element comprises a virtual machine.

In Example 240, the subject matter of any one or more of Examples 236-239 optionally include wherein the processing element comprises a field-programmable gate array (FPGA) program.

In Example 241, the subject matter of any one or more of Examples 236-240 optionally include wherein the computing unit comprises a central processing unit (CPU).

In Example 242, the subject matter of any one or more of Examples 236-241 optionally include wherein the computing unit comprises a processor core.

In Example 243, the subject matter of any one or more of Examples 236-242 optionally include wherein the computing unit comprises a CPU complex.

In Example 244, the subject matter of any one or more of Examples 236-243 optionally include wherein the computing unit comprises a field-programmable gate array (FPGA).

In Example 245, the subject matter of any one or more of Examples 236-244 optionally include wherein the computing unit comprises a graphics processing unit (GPU).

In Example 246, the subject matter of any one or more of Examples 236-245 optionally include wherein the means for determining the corresponding processing element that is used to process the packet comprise means for using a TCP offload engine to inspect the packet and identify the corresponding processing element.

In Example 247, the subject matter of any one or more of Examples 236-246 optionally include wherein the means for determining whether the processing element is active in the computing unit comprise means for interfacing with the computing unit to determine whether the processing element is active.

In Example 248, the subject matter of Example 247 optionally includes wherein the computing unit is a processor core, and wherein the means for interfacing with the computing unit comprise means for receiving an indication of the contents of a cache operated by the computing unit.

In Example 249, the subject matter of Example 248 optionally includes wherein the indication of the contents of the cache are provided by a memory management unit (MMU).

In Example 250, the subject matter of any one or more of Examples 247-249 optionally include wherein the computing unit is an FPGA, and wherein the means for interfacing with the computing unit comprise means for communicating with an FPGA interface to determine whether the processing element is active in the computing unit.

In Example 251, the subject matter of Example 250 optionally includes wherein the FPGA interface maintains a record of which FPGA programs have been loaded in the FPGA.

In Example 252, the subject matter of any one or more of Examples 236-251 optionally include wherein the computing unit is a processor core, and wherein the means for loading the processing element when it is not active comprise means for storing instructions and data in a cache of the processor core to process the packet.

In Example 253, the subject matter of Example 252 optionally includes wherein the means for storing instructions and data in the cache of the processor core comprise means for passing an address to a cache controller of the processor core.

In Example 254, the subject matter of any one or more of Examples 252-253 optionally include wherein the cache includes a general use portion controlled by the processor core, and a reserved portion controlled by the network interface device.

In Example 255, the subject matter of any one or more of Examples 252-254 optionally include wherein the means for storing the instructions and data comprise means for storing the instructions and data in the general use portion controlled by the processor core.

In Example 256, the subject matter of any one or more of Examples 252-255 optionally include wherein the means for storing the instructions and data comprise means for storing the instructions and data in the reserved portion controlled by the network interface device.

In Example 257, the subject matter of Example 256 optionally includes means for evicting content from the reserved portion of the cache.

In Example 258, the subject matter of Example 257 optionally includes wherein the means for evicting content from the reserved portion of the cache comprise: means for determining a priority of existing instructions loaded in the reserved portion of cache; means for determining a priority of instructions that are inactive and would need to be loaded into the reserved portion of cache to process the packet; and means for evicting the existing instructions loaded in the reserved portion of cache when the priority of the existing instructions is lower than the priority of the inactive instructions.

In Example 259, the subject matter of any one or more of Examples 257-258 optionally include the means for evicting content from the reserved portion of the cache comprise: means for determining whether any packets are being processed by existing instructions loaded in the reserved portion of cache; and means for evicting the existing instructions from the reserved portion of cache when they are not being used to process packets.

In Example 260, the subject matter of any one or more of Examples 257-259 optionally include wherein the means for evicting content from the reserved portion of the cache comprise: means for checking a time-to-live (TTL) value of existing instructions loaded in the reserved portion of cache; and means for evicting the existing instructions from the reserved portion of cache after the TTL value has expired.

In Example 261, the subject matter of Example 260 optionally includes means for increasing the TTL value of existing instructions loaded in the reserved portion of cache when packets are forwarded to the reserved portion of the cache for processing by the existing instructions.

In Example 262, the subject matter of any one or more of Examples 236-261 optionally include wherein the computing unit is a processor core, and wherein the means for loading the processing element when it is not active comprise: means for identifying a statistical profile of the packet; means for assigning a priority to the packet based on the statistical profile; and means for storing instructions and data in a cache of the processor core to process the packet when the priority of the packet is higher than a priority of instructions in the cache.

In Example 263, the subject matter of Example 262 optionally includes wherein the statistical profile is maintained used an artificial intelligence process.

In Example 264, the subject matter of any one or more of Examples 262-263 optionally include wherein the artificial intelligence includes machine learning process.

In Example 265, the subject matter of any one or more of Examples 262-264 optionally include wherein the statistical profile is maintained using a packet processing histogram.

In Example 266, the subject matter of any one or more of Examples 236-265 optionally include wherein the computing unit is an FPGA, and wherein the means for loading the processing element when it is not active comprise means for causing the FPGA to load a program into an FPGA partition.

In Example 267, the subject matter of Example 266 optionally includes wherein the means for loading the program comprise means for interacting with an FPGA interface controller.

In Example 268, the subject matter of Example 267 optionally includes wherein the FPGA includes a partition controlled by the FPGA, and a partition controlled by the FPGA interface controller.

In Example 269, the subject matter of Example 268 optionally includes wherein the means for loading the program comprise means for loading the program in the partition controlled by the FPGA.

In Example 270, the subject matter of any one or more of Examples 268-269 optionally include wherein the means for loading the program comprise means for loading the program in the partition controlled by the FPGA interface controller.

In Example 271, the subject matter of any one or more of Examples 268-270 optionally include wherein the FPGA interface controller is to unload programs from the partition controlled by the FPGA interface controller.

In Example 272, the subject matter of Example 271 optionally includes wherein the means for unloading programs from the partition controlled by the FPGA interface controller comprise: means for determining a priority of existing programs loaded in the partition controlled by the FPGA interface controller; means for determining a priority of a program that is inactive and would need to be loaded into the FPGA to process the packet; and means for reconfiguring at least one of the existing programs in the partition controlled by the FPGA interface controller when the priority of the existing programs is lower than the priority of the program of the inactive processing element.

In Example 273, the subject matter of any one or more of Examples 271-272 optionally include wherein the means for unloading programs from the partition controlled by the FPGA interface controller comprise: means for determining whether any packets are being processed by an existing program loaded in the partition controlled by the FPGA interface controller; and means for unloading the existing program from the partition controlled by the FPGA interface controller when it is not being used to process packets.

In Example 274, the subject matter of any one or more of Examples 271-273 optionally include wherein the means for unloading programs from the partition controlled by the FPGA interface controller comprise: means for checking a time-to-live (TTL) value of an existing program loaded in the partition controlled by the FPGA interface controller; and means for unloading the existing program from the partition controlled by the FPGA interface controller after the TTL value has expired.

In Example 275, the subject matter of Example 274 optionally includes wherein the FPGA interface controller is to increase the TTL value of the existing program loaded in the partition controlled by the FPGA interface controller when packets are forwarded to the partition controlled by the FPGA interface controller for processing by the existing program.

In Example 276, the subject matter of any one or more of Examples 236-275 optionally include wherein the computing unit is an FPGA, and wherein the means for loading the processing element when it is not active comprise: means for identifying a statistical profile of the packet; means for assigning a priority to the packet based on the statistical profile; and means for reconfiguring an existing program in the FPGA with a program to process the packet when the priority of the packet is higher than a priority of the existing program in the FPGA.

In Example 277, the subject matter of Example 276 optionally includes wherein the statistical profile is maintained used an artificial intelligence process.

In Example 278, the subject matter of any one or more of Examples 276-277 optionally include wherein the artificial intelligence includes machine learning process.

In Example 279, the subject matter of any one or more of Examples 276-278 optionally include wherein the statistical profile is maintained using a packet processing histogram.

In Example 280, the subject matter of any one or more of Examples 236-279 optionally include wherein the means for loading the processing element when it is not active comprise means for using a just in time (JIT) mechanism to configure the processing element to process the packet.

Example 281 is at least one machine-readable medium including instructions for implementing flexible packet processing, which when executed by a machine, cause the machine to: receive a packet; determine from analyzing the packet, a corresponding processing element that is used to process the packet; determine whether the processing element is active in a computing unit; load the processing element when it is not active; and forward the packet to the processing element.

In Example 282, the subject matter of Example 281 optionally includes wherein the processing element comprises a computing process.

In Example 283, the subject matter of any one or more of Examples 281-282 optionally include wherein the processing element comprises a thread.

In Example 284, the subject matter of any one or more of Examples 281-283 optionally include wherein the processing element comprises a virtual machine.

In Example 285, the subject matter of any one or more of Examples 281-284 optionally include wherein the processing element comprises a field-programmable gate array (FPGA) program.

In Example 286, the subject matter of any one or more of Examples 281-285 optionally include wherein the computing unit comprises a central processing unit (CPU).

In Example 287, the subject matter of any one or more of Examples 281-286 optionally include wherein the computing unit comprises a processor core.

In Example 288, the subject matter of any one or more of Examples 281-287 optionally include wherein the computing unit comprises a CPU complex.

In Example 289, the subject matter of any one or more of Examples 281-288 optionally include wherein the computing unit comprises a field-programmable gate array (FPGA).

In Example 290, the subject matter of any one or more of Examples 281-289 optionally include wherein the computing unit comprises a graphics processing unit (GPU).

In Example 291, the subject matter of any one or more of Examples 281-290 optionally include wherein the instructions to determine the corresponding processing element that is used to process the packet comprise instructions to use a TCP offload engine to inspect the packet and identify the corresponding processing element.

In Example 292, the subject matter of any one or more of Examples 281-291 optionally include wherein the instructions to determine whether the processing element is active in the computing unit comprise instructions to interface with the computing unit to determine whether the processing element is active.

In Example 293, the subject matter of Example 292 optionally includes wherein the computing unit is a processor core, and wherein the instructions to interface with the computing unit comprise instructions to receive an indication of the contents of a cache operated by the computing unit.

In Example 294, the subject matter of Example 293 optionally includes wherein the indication of the contents of the cache are provided by a memory management unit (MMU).

In Example 295, the subject matter of any one or more of Examples 292-294 optionally include wherein the computing unit is an FPGA, and wherein the instructions to interface with the computing unit comprise instructions to communicate with an FPGA interface to determine whether the processing element is active in the computing unit.

In Example 296, the subject matter of Example 295 optionally includes wherein the FPGA interface maintains a record of which FPGA programs have been loaded in the FPGA.

In Example 297, the subject matter of any one or more of Examples 281-296 optionally include wherein the computing unit is a processor core, and wherein the instructions to load the processing element when it is not active comprise instructions to store instructions and data in a cache of the processor core to process the packet.

In Example 298, the subject matter of Example 297 optionally includes wherein the instructions to store instructions and data in the cache of the processor core comprise instructions to pass an address to a cache controller of the processor core.

In Example 299, the subject matter of any one or more of Examples 297-298 optionally include wherein the cache includes a general use portion controlled by the processor core, and a reserved portion controlled by the network interface device.

In Example 300, the subject matter of any one or more of Examples 297-299 optionally include wherein the instructions to store the instructions and data comprise instructions to store the instructions and data in the general use portion controlled by the processor core.

In Example 301, the subject matter of any one or more of Examples 297-300 optionally include wherein the instructions to store the instructions and data comprise instructions to store the instructions and data in the reserved portion controlled by the network interface device.

In Example 302, the subject matter of Example 301 optionally includes instructions to evict content from the reserved portion of the cache.

In Example 303, the subject matter of Example 302 optionally includes wherein the instructions to evict content from the reserved portion of the cache comprise instructions to: determine a priority of existing instructions loaded in the reserved portion of cache; determine a priority of instructions that are inactive and would need to be loaded into the reserved portion of cache to process the packet; and evict the existing instructions loaded in the reserved portion of cache when the priority of the existing instructions is lower than the priority of the inactive instructions.

In Example 304, the subject matter of any one or more of Examples 302-303 optionally include the instructions to evict content from the reserved portion of the cache comprise instructions to: determine whether any packets are being processed by existing instructions loaded in the reserved portion of cache; and evict the existing instructions from the reserved portion of cache when they are not being used to process packets.

In Example 305, the subject matter of any one or more of Examples 302-304 optionally include wherein the instructions to evict content from the reserved portion of the cache comprise instructions to: check a time-to-live (TTL) value of existing instructions loaded in the reserved portion of cache; and evict the existing instructions from the reserved portion of cache after the TTL value has expired.

In Example 306, the subject matter of Example 305 optionally includes instructions to increase the TTL value of existing instructions loaded in the reserved portion of cache when packets are forwarded to the reserved portion of the cache for processing by the existing instructions.

In Example 307, the subject matter of any one or more of Examples 281-306 optionally include wherein the computing unit is a processor core, and wherein the instructions to load the processing element when it is not active comprise instructions to: identify a statistical profile of the packet; assign a priority to the packet based on the statistical profile; and store instructions and data in a cache of the processor core to process the packet when the priority of the packet is higher than a priority of instructions in the cache.

In Example 308, the subject matter of Example 307 optionally includes wherein the statistical profile is maintained used an artificial intelligence process.

In Example 309, the subject matter of any one or more of Examples 307-308 optionally include wherein the artificial intelligence includes machine learning process.

In Example 310, the subject matter of any one or more of Examples 307-309 optionally include wherein the statistical profile is maintained using a packet processing histogram.

In Example 311, the subject matter of any one or more of Examples 281-310 optionally include wherein the computing unit is an FPGA, and wherein the instructions to load the processing element when it is not active comprise instructions to cause the FPGA to load a program into an FPGA partition.

In Example 312, the subject matter of Example 311 optionally includes wherein the instructions to load the program comprise instructions to interact with an FPGA interface controller.

In Example 313, the subject matter of Example 312 optionally includes wherein the FPGA includes a partition controlled by the FPGA, and a partition controlled by the FPGA interface controller.

In Example 314, the subject matter of Example 313 optionally includes wherein the instructions to load the program comprise instructions to load the program in the partition controlled by the FPGA.

In Example 315, the subject matter of any one or more of Examples 313-314 optionally include wherein the instructions to load the program comprise instructions to load the program in the partition controlled by the FPGA interface controller.

In Example 316, the subject matter of any one or more of Examples 313-315 optionally include wherein the FPGA interface controller is to unload programs from the partition controlled by the FPGA interface controller.

In Example 317, the subject matter of Example 316 optionally includes wherein the instructions to unload programs from the partition controlled by the FPGA interface controller comprise instructions to: determine a priority of existing programs loaded in the partition controlled by the FPGA interface controller; determine a priority of a program that is inactive and would need to be loaded into the FPGA to process the packet; and reconfigure at least one of the existing programs in the partition controlled by the FPGA interface controller when the priority of the existing programs is lower than the priority of the program of the inactive processing element.

In Example 318, the subject matter of any one or more of Examples 316-317 optionally include wherein the instructions to unload programs from the partition controlled by the FPGA interface controller comprise instructions to: determine whether any packets are being processed by an existing program loaded in the partition controlled by the FPGA interface controller; and unload the existing program from the partition controlled by the FPGA interface controller when it is not being used to process packets.

In Example 319, the subject matter of any one or more of Examples 316-318 optionally include wherein the instructions to unload programs from the partition controlled by the FPGA interface controller comprise instructions to: check a time-to-live (TTL) value of an existing program loaded in the partition controlled by the FPGA interface controller; and unload the existing program from the partition controlled by the FPGA interface controller after the TTL value has expired.

In Example 320, the subject matter of Example 319 optionally includes wherein the FPGA interface controller is to increase the TTL value of the existing program loaded in the partition controlled by the FPGA interface controller when packets are forwarded to the partition controlled by the FPGA interface controller for processing by the existing program.

In Example 321, the subject matter of any one or more of Examples 281-320 optionally include wherein the computing unit is an FPGA, and wherein the instructions to load the processing element when it is not active comprise instructions to: identify a statistical profile of the packet; assign a priority to the packet based on the statistical profile; and reconfigure an existing program in the FPGA with a program to process the packet when the priority of the packet is higher than a priority of the existing program in the FPGA.

In Example 322, the subject matter of Example 321 optionally includes wherein the statistical profile is maintained used an artificial intelligence process.

In Example 323, the subject matter of any one or more of Examples 321-322 optionally include wherein the artificial intelligence includes machine learning process.

In Example 324, the subject matter of any one or more of Examples 321-323 optionally include wherein the statistical profile is maintained using a packet processing histogram.

In Example 325, the subject matter of any one or more of Examples 281-324 optionally include wherein the instructions to load the processing element when it is not active comprise instructions to use a just in time (JIT) mechanism to configure the processing element to process the packet.

Example 326 is a network interface device for implementing flexible packet scheduling, the network interface device comprising: a packet parser to: receive a packet; determine from analyzing the packet, a corresponding processing element that is used to process the packet; and store the packet in a queue, and a coordinator circuit to: determine whether the processing element is active in a computing unit; and modify the priority of the packet in the queue based on whether the processing element is active in the computing unit.

In Example 327, the subject matter of Example 326 optionally includes wherein the processing element comprises a computing process.

In Example 328, the subject matter of any one or more of Examples 326-327 optionally include wherein the processing element comprises a thread.

In Example 329, the subject matter of any one or more of Examples 326-328 optionally include wherein the processing element comprises a virtual machine.

In Example 330, the subject matter of any one or more of Examples 326-329 optionally include wherein the processing element comprises a program in a field-programmable gate array (FPGA) program.

In Example 331, the subject matter of any one or more of Examples 326-330 optionally include wherein the computing unit comprises a central processing unit (CPU).

In Example 332, the subject matter of any one or more of Examples 326-331 optionally include wherein the computing unit comprises a processor core.

In Example 333, the subject matter of any one or more of Examples 326-332 optionally include wherein the computing unit comprises a CPU complex.

In Example 334, the subject matter of any one or more of Examples 326-333 optionally include wherein the computing unit comprises a field-programmable gate array (FPGA).

In Example 335, the subject matter of any one or more of Examples 326-334 optionally include wherein the computing unit comprises a graphics processing unit (GPU).

In Example 336, the subject matter of any one or more of Examples 326-335 optionally include wherein to determine the corresponding processing element that is used to process the packet, the packet parser is to use a TCP offload engine to inspect the packet and identify the corresponding processing element.

In Example 337, the subject matter of any one or more of Examples 326-336 optionally include wherein to determine whether the processing element is active in the computing unit, the coordinator circuit is to interface with the computing unit to determine whether the processing element is active.

In Example 338, the subject matter of Example 337 optionally includes wherein the computing unit is a processor core, and wherein to interface with the computing unit, the coordinator circuit is to receive an indication of the contents of a cache operated by the computing unit.

In Example 339, the subject matter of Example 338 optionally includes wherein the indication of the contents of the cache are provided by a memory management unit (MMU).

In Example 340, the subject matter of any one or more of Examples 337-339 optionally include wherein the computing unit is an FPGA, and wherein to interface with the computing unit, the coordinator circuit is to communicate with an FPGA interface to determine whether the processing element is active in the computing unit.

In Example 341, the subject matter of Example 340 optionally includes wherein the FPGA interface maintains a record of which FPGA programs have been loaded in the FPGA.

In Example 342, the subject matter of any one or more of Examples 326-341 optionally include wherein to modify the priority of the packet in the queue based on whether the processing element is active in the computing unit, the coordinator circuit is to increase the priority of the packet when the processing element is active in the computing unit.

In Example 343, the subject matter of Example 342 optionally includes wherein to increase the priority of the packet, the coordinator circuit is to include that the processing element is active with at least two other factors selected from the list of: a packet priority, a round robin order, a committed information rate, and a processing element time-to-live value.

In Example 344, the subject matter of any one or more of Examples 342-343 optionally include wherein to determine whether the processing element is active in the computing unit, the coordinator circuit is to interface with the computing unit to determine whether the processing element is active.

In Example 345, the subject matter of Example 344 optionally includes wherein the computing unit is a processor core, and wherein to interface with the computing unit, the coordinator circuit is to receive an indication of the contents of a cache operated by the computing unit.

In Example 346, the subject matter of Example 345 optionally includes wherein the indication of the contents of the cache are provided by a memory management unit (MMU).

In Example 347, the subject matter of any one or more of Examples 344-346 optionally include wherein the computing unit is an FPGA, and wherein to interface with the computing unit, the coordinator circuit is to communicate with an FPGA interface to determine whether the processing element is active in the computing unit.

In Example 348, the subject matter of Example 347 optionally includes wherein the FPGA interface maintains a record of which FPGA programs have been loaded in the FPGA.

In Example 349, the subject matter of any one or more of Examples 326-348 optionally include wherein to modify the priority of the packet in the queue based on whether the processing element is active in the computing unit, the coordinator circuit is to decrease the priority of the packet when the processing element is not active in the computing unit.

In Example 350, the subject matter of Example 349 optionally includes wherein to decrease the priority of the packet, the coordinator circuit is to include that the processing element is not active with at least two other factors selected from the list of: a packet priority, a round robin order, a committed information rate, and a processing element time-to-live value.

In Example 351, the subject matter of any one or more of Examples 326-350 optionally include wherein to modify the priority of the packet in the queue based on whether the processing element is active in the computing unit, the coordinator circuit is to: determine whether to drop the packet from the queue when the processing element is not active in the computing unit; and drop the packet from the queue based on the determination.

In Example 352, the subject matter of Example 351 optionally includes wherein to determine whether to drop the packet from the queue, the coordinator circuit is to include that the processing element is not active with at least two other factors selected from the list of: an inverse packet priority, a round robin order, an inverse committed information rate, and a processing element time-to-live value.

Example 353 is a method of implementing flexible packet scheduling, the method comprising: receiving a packet; determining from analyzing the packet, a corresponding processing element that is used to process the packet; storing the packet in a queue; determining whether the processing element is active in a computing unit; and modifying the priority of the packet in the queue based on whether the processing element is active in the computing unit.

In Example 354, the subject matter of Example 353 optionally includes wherein the processing element comprises a computing process.

In Example 355, the subject matter of any one or more of Examples 353-354 optionally include wherein the processing element comprises a thread.

In Example 356, the subject matter of any one or more of Examples 353-355 optionally include wherein the processing element comprises a virtual machine.

In Example 357, the subject matter of any one or more of Examples 353-356 optionally include wherein the processing element comprises a program in a field-programmable gate array (FPGA) program.

In Example 358, the subject matter of any one or more of Examples 353-357 optionally include wherein the computing unit comprises a central processing unit (CPU).

In Example 359, the subject matter of any one or more of Examples 353-358 optionally include wherein the computing unit comprises a processor core.

In Example 360, the subject matter of any one or more of Examples 353-359 optionally include wherein the computing unit comprises a CPU complex.

In Example 361, the subject matter of any one or more of Examples 353-360 optionally include wherein the computing unit comprises a field-programmable gate array (FPGA).

In Example 362, the subject matter of any one or more of Examples 353-361 optionally include wherein the computing unit comprises a graphics processing unit (GPU).

In Example 363, the subject matter of any one or more of Examples 353-362 optionally include wherein determining the corresponding processing element that is used to process the packet comprises using a TCP offload engine to inspect the packet and identify the corresponding processing element.

In Example 364, the subject matter of any one or more of Examples 353-363 optionally include wherein determining whether the processing element is active in the computing unit comprises interfacing with the computing unit to determine whether the processing element is active.

In Example 365, the subject matter of Example 364 optionally includes wherein the computing unit is a processor core, and wherein interfacing with the computing unit comprises receiving an indication of the contents of a cache operated by the computing unit.

In Example 366, the subject matter of Example 365 optionally includes wherein the indication of the contents of the cache are provided by a memory management unit (MMU).

In Example 367, the subject matter of any one or more of Examples 364-366 optionally include wherein the computing unit is an FPGA, and wherein interfacing with the computing unit comprises communicating with an FPGA interface to determine whether the processing element is active in the computing unit.

In Example 368, the subject matter of Example 367 optionally includes wherein the FPGA interface maintains a record of which FPGA programs have been loaded in the FPGA.

In Example 369, the subject matter of any one or more of Examples 353-368 optionally include wherein modifying the priority of the packet in the queue based on whether the processing element is active in the computing unit comprises increasing the priority of the packet when the processing element is active in the computing unit.

In Example 370, the subject matter of Example 369 optionally includes wherein increasing the priority of the packet comprises including that the processing element is active with at least two other factors selected from the list of: a packet priority, a round robin order, a committed information rate, and a processing element time-to-live value.

In Example 371, the subject matter of any one or more of Examples 353-370 optionally include wherein modifying the priority of the packet in the queue based on whether the processing element is active in the computing unit comprises decreasing the priority of the packet when the processing element is not active in the computing unit.

In Example 372, the subject matter of Example 371 optionally includes wherein decreasing the priority of the packet comprises including that the processing element is not active with at least two other factors selected from the list of: a packet priority, a round robin order, a committed information rate, and a processing element time-to-live value.

In Example 373, the subject matter of any one or more of Examples 353-372 optionally include wherein modifying the priority of the packet in the queue based on whether the processing element is active in the computing unit comprises: determining whether to drop the packet from the queue when the processing element is not active in the computing unit; and dropping the packet from the queue based on the determination.

In Example 374, the subject matter of Example 373 optionally includes wherein determining whether to drop the packet from the queue comprises including that the processing element is not active with at least two other factors selected from the list of: an inverse packet priority, a round robin order, an inverse committed information rate, and a processing element time-to-live value.

Example 375 is at least one machine-readable medium including instructions, which when executed by a machine, cause the machine to perform operations of any of the methods of Examples 353-374.

Example 376 is an apparatus comprising means for performing any of the methods of Examples 353-374.

Example 377 is an apparatus for implementing flexible packet scheduling, the apparatus comprising: means for receiving a packet; means for determining from analyzing the packet, a corresponding processing element that is used to process the packet; means for storing the packet in a queue; means for determining whether the processing element is active in a computing unit; and means for modifying the priority of the packet in the queue based on whether the processing element is active in the computing unit.

In Example 378, the subject matter of Example 377 optionally includes wherein the processing element comprises a computing process.

In Example 379, the subject matter of any one or more of Examples 377-378 optionally include wherein the processing element comprises a thread.

In Example 380, the subject matter of any one or more of Examples 377-379 optionally include wherein the processing element comprises a virtual machine.

In Example 381, the subject matter of any one or more of Examples 377-380 optionally include wherein the processing element comprises a program in a field-programmable gate array (FPGA) program.

In Example 382, the subject matter of any one or more of Examples 377-381 optionally include wherein the computing unit comprises a central processing unit (CPU).

In Example 383, the subject matter of any one or more of Examples 377-382 optionally include wherein the computing unit comprises a processor core.

In Example 384, the subject matter of any one or more of Examples 377-383 optionally include wherein the computing unit comprises a CPU complex.

In Example 385, the subject matter of any one or more of Examples 377-384 optionally include wherein the computing unit comprises a field-programmable gate array (FPGA).

In Example 386, the subject matter of any one or more of Examples 377-385 optionally include wherein the computing unit comprises a graphics processing unit (GPU).

In Example 387, the subject matter of any one or more of Examples 377-386 optionally include wherein the means for determining the corresponding processing element that is used to process the packet comprise means for using a TCP offload engine to inspect the packet and identify the corresponding processing element.

In Example 388, the subject matter of any one or more of Examples 377-387 optionally include wherein the means for determining whether the processing element is active in the computing unit comprise means for interfacing with the computing unit to determine whether the processing element is active.

In Example 389, the subject matter of Example 388 optionally includes wherein the computing unit is a processor core, and wherein the means for interfacing with the computing unit comprise means for receiving an indication of the contents of a cache operated by the computing unit.

In Example 390, the subject matter of Example 389 optionally includes wherein the indication of the contents of the cache are provided by a memory management unit (MMU).

In Example 391, the subject matter of any one or more of Examples 388-390 optionally include wherein the computing unit is an FPGA, and wherein the means for interfacing with the computing unit comprise means for communicating with an FPGA interface to determine whether the processing element is active in the computing unit.

In Example 392, the subject matter of Example 391 optionally includes wherein the FPGA interface maintains a record of which FPGA programs have been loaded in the FPGA.

In Example 393, the subject matter of any one or more of Examples 377-392 optionally include wherein the means for modifying the priority of the packet in the queue based on whether the processing element is active in the computing unit comprise means for increasing the priority of the packet when the processing element is active in the computing unit.

In Example 394, the subject matter of Example 393 optionally includes wherein the means for increasing the priority of the packet comprise means for including that the processing element is active with at least two other factors selected from the list of: a packet priority, a round robin order, a committed information rate, and a processing element time-to-live value.

In Example 395, the subject matter of any one or more of Examples 377-394 optionally include wherein the means for modifying the priority of the packet in the queue based on whether the processing element is active in the computing unit comprise means for decreasing the priority of the packet when the processing element is not active in the computing unit.

In Example 396, the subject matter of Example 395 optionally includes wherein the means for decreasing the priority of the packet comprise means for including that the processing element is not active with at least two other factors selected from the list of: a packet priority, a round robin order, a committed information rate, and a processing element time-to-live value.

In Example 397, the subject matter of any one or more of Examples 377-396 optionally include wherein the means for modifying the priority of the packet in the queue based on whether the processing element is active in the computing unit comprise: means for determining whether to drop the packet from the queue when the processing element is not active in the computing unit; and means for dropping the packet from the queue based on the determination.

In Example 398, the subject matter of Example 397 optionally includes wherein the means for determining whether to drop the packet from the queue comprise means for including that the processing element is not active with at least two other factors selected from the list of: an inverse packet priority, a round robin order, an inverse committed information rate, and a processing element time-to-live value.

Example 399 is at least one machine-readable medium including instructions for implementing flexible packet scheduling, which when executed by a machine, cause the machine to: receive a packet; determine from analyzing the packet, a corresponding processing element that is used to process the packet; store the packet in a queue; determine whether the processing element is active in a computing unit; and modify the priority of the packet in the queue based on whether the processing element is active in the computing unit.

In Example 400, the subject matter of Example 399 optionally includes wherein the processing element comprises a computing process.

In Example 401, the subject matter of any one or more of Examples 399-400 optionally include wherein the processing element comprises a thread.

In Example 402, the subject matter of any one or more of Examples 399-401 optionally include wherein the processing element comprises a virtual machine.

In Example 403, the subject matter of any one or more of Examples 399-402 optionally include wherein the processing element comprises a program in a field-programmable gate array (FPGA) program.

In Example 404, the subject matter of any one or more of Examples 399-403 optionally include wherein the computing unit comprises a central processing unit (CPU).

In Example 405, the subject matter of any one or more of Examples 399-404 optionally include wherein the computing unit comprises a processor core.

In Example 406, the subject matter of any one or more of Examples 399-405 optionally include wherein the computing unit comprises a CPU complex.

In Example 407, the subject matter of any one or more of Examples 399-406 optionally include wherein the computing unit comprises a field-programmable gate array (FPGA).

In Example 408, the subject matter of any one or more of Examples 399-407 optionally include wherein the computing unit comprises a graphics processing unit (GPU).

In Example 409, the subject matter of any one or more of Examples 399-408 optionally include wherein the instructions to determine the corresponding processing element that is used to process the packet comprise instructions to use a TCP offload engine to inspect the packet and identify the corresponding processing element.

In Example 410, the subject matter of any one or more of Examples 399-409 optionally include wherein the instructions to determine whether the processing element is active in the computing unit comprise instructions to interface with the computing unit to determine whether the processing element is active.

In Example 411, the subject matter of Example 410 optionally includes wherein the computing unit is a processor core, and wherein the instructions to interface with the computing unit comprise instructions to receive an indication of the contents of a cache operated by the computing unit.

In Example 412, the subject matter of Example 411 optionally includes wherein the indication of the contents of the cache are provided by a memory management unit (MMU).

In Example 413, the subject matter of any one or more of Examples 410-412 optionally include wherein the computing unit is an FPGA, and wherein the instructions to interface with the computing unit comprise instructions to communicate with an FPGA interface to determine whether the processing element is active in the computing unit.

In Example 414, the subject matter of Example 413 optionally includes wherein the FPGA interface maintains a record of which FPGA programs have been loaded in the FPGA.

In Example 415, the subject matter of any one or more of Examples 399-414 optionally include wherein the instructions to modify the priority of the packet in the queue based on whether the processing element is active in the computing unit comprise instructions to increase the priority of the packet when the processing element is active in the computing unit.

In Example 416, the subject matter of Example 415 optionally includes wherein the instructions to increase the priority of the packet comprise instructions to include that the processing element is active with at least two other factors selected from the list of: a packet priority, a round robin order, a committed information rate, and a processing element time-to-live value.

In Example 417, the subject matter of any one or more of Examples 399-416 optionally include wherein the instructions to modify the priority of the packet in the queue based on whether the processing element is active in the computing unit comprise instructions to decrease the priority of the packet when the processing element is not active in the computing unit.

In Example 418, the subject matter of Example 417 optionally includes wherein decreasing the priority of the packet comprises including that the processing element is not active with at least two other factors selected from the list of: a packet priority, a round robin order, a committed information rate, and a processing element time-to-live value.

In Example 419, the subject matter of any one or more of Examples 399-418 optionally include wherein the instructions to modify the priority of the packet in the queue based on whether the processing element is active in the computing unit comprise instructions to: determine whether to drop the packet from the queue when the processing element is not active in the computing unit; and drop the packet from the queue based on the determination.

In Example 420, the subject matter of Example 419 optionally includes wherein the instructions to determine whether to drop the packet from the queue comprise instructions to include that the processing element is not active with at least two other factors selected from the list of: an inverse packet priority, a round robin order, an inverse committed information rate, and a processing element time-to-live value.

Example 421 is a network interface device for implementing time-based flexible packet scheduling, the network interface device comprising: a packet parser to: determine from analyzing a packet, a corresponding processing element that is used to process the packet; and store the packet in a queue; and a coordinator circuit to: determine a timing of when the processing element is active in a computing unit; and modify the priority of the packet in the queue based on the timing of when the processing element is active in the computing unit.

In Example 422, the subject matter of Example 421 optionally includes wherein the processing element comprises a computing process.

In Example 423, the subject matter of any one or more of Examples 421-422 optionally include wherein the processing element comprises a thread.

In Example 424, the subject matter of any one or more of Examples 421-423 optionally include wherein the processing element comprises a virtual machine.

In Example 425, the subject matter of any one or more of Examples 421-424 optionally include wherein the processing element comprises a program in a field-programmable gate array (FPGA) program.

In Example 426, the subject matter of any one or more of Examples 421-425 optionally include wherein the computing unit comprises a central processing unit (CPU).

In Example 427, the subject matter of any one or more of Examples 421-426 optionally include wherein the computing unit comprises a processor core.

In Example 428, the subject matter of any one or more of Examples 421-427 optionally include wherein the computing unit comprises a CPU complex.

In Example 429, the subject matter of any one or more of Examples 421-428 optionally include wherein the computing unit comprises a field-programmable gate array (FPGA).

In Example 430, the subject matter of any one or more of Examples 421-429 optionally include wherein the computing unit comprises a graphics processing unit (GPU).

In Example 431, the subject matter of any one or more of Examples 421-430 optionally include wherein to determine the corresponding processing element that is used to process the packet, the packet parser is to use a TCP offload engine to inspect the packet and identify the corresponding processing element.

In Example 432, the subject matter of any one or more of Examples 421-431 optionally include wherein to determine the timing of when the processing element is active in the computing unit, the coordinator circuit is synchronized with the computing unit.

In Example 433, the subject matter of Example 432 optionally includes wherein the coordinator circuit is synchronized with the computing unit using at least one of: IEEE 1588 Precision Time Protocol, IEEE 802.1 Time-Sensitive Networking, Synchronous Ethernet, Network Time Protocol, or Precision Time Measurement.

In Example 434, the subject matter of any one or more of Examples 421-433 optionally include wherein to determine the timing of when the processing element is active in the computing unit, the coordinator circuit is to interface with the computing unit to determine when the processing element is active.

In Example 435, the subject matter of Example 434 optionally includes wherein the computing unit is a processor core, and wherein to interface with the computing unit, the coordinator circuit is to receive an indication of the contents of a cache operated by the computing unit.

In Example 436, the subject matter of Example 435 optionally includes wherein the indication of the contents of the cache are provided by a memory management unit (MMU).

In Example 437, the subject matter of any one or more of Examples 434-436 optionally include wherein the computing unit is an FPGA, and wherein to interface with the computing unit, the coordinator circuit is to communicate with an FPGA interface to determine whether the processing element is active in the computing unit.

In Example 438, the subject matter of Example 437 optionally includes wherein the FPGA interface maintains a record of which FPGA programs have been loaded in the FPGA.

In Example 439, the subject matter of any one or more of Examples 421-438 optionally include wherein to modify the priority of the packet in the queue based on the timing of when the processing element is active in the computing unit, the coordinator circuit is to increase the priority of the packet when the processing element is active or will be active soon in the computing unit.

In Example 440, the subject matter of Example 439 optionally includes wherein to increase the priority of the packet, the coordinator circuit is to include that the processing element is active or will be active soon with at least one factor selected from the list of: a packet priority and a round robin order.

In Example 441, the subject matter of any one or more of Examples 439-440 optionally include wherein to determine the timing of when the processing element is active in the computing unit, the coordinator circuit is to interface with the computing unit to determine when the processing element is active.

In Example 442, the subject matter of Example 441 optionally includes wherein the computing unit is a processor core, and wherein to interface with the computing unit, the coordinator circuit is to receive an indication of the contents of a cache operated by the computing unit.

In Example 443, the subject matter of Example 442 optionally includes wherein the indication of the contents of the cache are provided by a memory management unit (MMU).

In Example 444, the subject matter of any one or more of Examples 441-443 optionally include wherein the computing unit is an FPGA, and wherein to interface with the computing unit, the coordinator circuit is to communicate with an FPGA interface to determine when the processing element is active in the computing unit.

In Example 445, the subject matter of Example 444 optionally includes wherein the FPGA interface maintains a record of which FPGA programs have been loaded in the FPGA.

In Example 446, the subject matter of any one or more of Examples 421-445 optionally include wherein to modify the priority of the packet in the queue based on the timing of when the processing element is active in the computing unit, the coordinator circuit is to decrease the priority of the packet when the processing element is not active or will not be active soon in the computing unit.

In Example 447, the subject matter of Example 446 optionally includes wherein to decrease the priority of the packet, the coordinator circuit is to include that the processing element is not active with at least one factor selected from the list of: a packet priority and a round robin order.

In Example 448, the subject matter of any one or more of Examples 421-447 optionally include wherein to modify the priority of the packet in the queue based on whether the processing element is active in the computing unit, the coordinator circuit is to: determine whether to drop the packet from the queue when the processing element is not active or will not be active soon in the computing unit, and drop the packet from the queue based on the determination.

In Example 449, the subject matter of Example 448 optionally includes wherein to determine whether to drop the packet from the queue, the coordinator circuit is to include that the processing element is not active with at least one factor selected from the list of: an inverse packet priority and a round robin order.

Example 450 is a method of implementing time-based flexible packet scheduling, the method comprising: determining from analyzing a packet, a corresponding processing element that is used to process the packet; storing the packet in a queue; determining a timing of when the processing element is active in a computing unit; and modifying the priority of the packet in the queue based on the timing of when the processing element is active in the computing unit.

In Example 451, the subject matter of Example 450 optionally includes wherein the processing element comprises a computing process.

In Example 452, the subject matter of any one or more of Examples 450-451 optionally include wherein the processing element comprises a thread.

In Example 453, the subject matter of any one or more of Examples 450-452 optionally include wherein the processing element comprises a virtual machine.

In Example 454, the subject matter of any one or more of Examples 450-453 optionally include wherein the processing element comprises a program in a field-programmable gate array (FPGA) program.

In Example 455, the subject matter of any one or more of Examples 450-454 optionally include wherein the computing unit comprises a central processing unit (CPU).

In Example 456, the subject matter of any one or more of Examples 450-455 optionally include wherein the computing unit comprises a processor core.

In Example 457, the subject matter of any one or more of Examples 450-456 optionally include wherein the computing unit comprises a CPU complex.

In Example 458, the subject matter of any one or more of Examples 450-457 optionally include wherein the computing unit comprises a field-programmable gate array (FPGA).

In Example 459, the subject matter of any one or more of Examples 450-458 optionally include wherein the computing unit comprises a graphics processing unit (GPU).

In Example 460, the subject matter of any one or more of Examples 450-459 optionally include wherein determining the corresponding processing element that is used to process the packet comprises using a TCP offload engine to inspect the packet and identify the corresponding processing element.

In Example 461, the subject matter of any one or more of Examples 450-460 optionally include wherein determining the timing of when the processing element is active in the computing unit comprises being synchronized with the computing unit.

In Example 462, the subject matter of Example 461 optionally includes wherein being synchronized with the computing unit is performed by using at least one of: IEEE 1588 Precision Time Protocol, IEEE 802.1 Time-Sensitive Networking, Synchronous Ethernet, Network Time Protocol, or Precision Time Measurement.

In Example 463, the subject matter of any one or more of Examples 450-462 optionally include wherein determining the timing of when the processing element is active in the computing unit comprises interfacing with the computing unit to determine when the processing element is active.

In Example 464, the subject matter of Example 463 optionally includes wherein the computing unit is a processor core, and wherein interfacing with the computing unit comprises receiving an indication of the contents of a cache operated by the computing unit.

In Example 465, the subject matter of Example 464 optionally includes wherein the indication of the contents of the cache are provided by a memory management unit (MMU).

In Example 466, the subject matter of any one or more of Examples 463-465 optionally include wherein the computing unit is an FPGA, and wherein interfacing with the computing unit comprises communicating with an FPGA interface to determine whether the processing element is active in the computing unit.

In Example 467, the subject matter of Example 466 optionally includes wherein the FPGA interface maintains a record of which FPGA programs have been loaded in the FPGA.

In Example 468, the subject matter of any one or more of Examples 450-467 optionally include wherein modifying the priority of the packet in the queue based on the timing of when the processing element is active in the computing unit comprises increasing the priority of the packet when the processing element is active or will be active soon in the computing unit.

In Example 469, the subject matter of Example 468 optionally includes wherein increasing the priority of the packet comprises including that the processing element is active or will be active soon with at least one factor selected from the list of: a packet priority and a round robin order.

In Example 470, the subject matter of any one or more of Examples 468-469 optionally include wherein determining the timing of when the processing element is active in the computing unit comprises interfacing with the computing unit to determine when the processing element is active.

In Example 471, the subject matter of Example 470 optionally includes wherein the computing unit is a processor core, and wherein interfacing with the computing unit comprises receiving an indication of the contents of a cache operated by the computing unit.

In Example 472, the subject matter of Example 471 optionally includes wherein the indication of the contents of the cache are provided by a memory management unit (MMU).

In Example 473, the subject matter of any one or more of Examples 470-472 optionally include wherein the computing unit is an FPGA, and wherein interfacing with the computing unit comprises communicating with an FPGA interface to determine when the processing element is active in the computing unit.

In Example 474, the subject matter of Example 473 optionally includes wherein the FPGA interface maintains a record of which FPGA programs have been loaded in the FPGA.

In Example 475, the subject matter of any one or more of Examples 450-474 optionally include wherein modifying the priority of the packet in the queue based on the timing of when the processing element is active in the computing unit comprises decreasing the priority of the packet when the processing element is not active or will not be active soon in the computing unit.

In Example 476, the subject matter of Example 475 optionally includes wherein decreasing the priority of the packet comprises including that the processing element is not active with at least one factor selected from the list of: a packet priority and a round robin order.

In Example 477, the subject matter of any one or more of Examples 450-476 optionally include wherein modifying the priority of the packet in the queue based on whether the processing element is active in the computing unit comprises: determining whether to drop the packet from the queue when the processing element is not active or will not be active soon in the computing unit; and dropping the packet from the queue based on the determination.

In Example 478, the subject matter of Example 477 optionally includes wherein determining whether to drop the packet from the queue comprises including that the processing element is not active or will not be active soon with at least one factor selected from the list of: an inverse packet priority and a round robin order.

Example 479 is at least one machine-readable medium including instructions, which when executed by a machine, cause the machine to perform operations of any of the methods of Examples 450-478.

Example 480 is an apparatus comprising means for performing any of the methods of Examples 450-478.

Example 481 is an apparatus for implementing time-based flexible packet scheduling, the apparatus comprising: means for determining from analyzing a packet, a corresponding processing element that is used to process the packet; means for storing the packet in a queue; means for determining a timing of when the processing element is active in a computing unit; and means for modifying the priority of the packet in the queue based on the timing of when the processing element is active in the computing unit.

In Example 482, the subject matter of Example 481 optionally includes wherein the processing element comprises a computing process.

In Example 483, the subject matter of any one or more of Examples 481-482 optionally include wherein the processing element comprises a thread.

In Example 484, the subject matter of any one or more of Examples 481-483 optionally include wherein the processing element comprises a virtual machine.

In Example 485, the subject matter of any one or more of Examples 481-484 optionally include wherein the processing element comprises a program in a field-programmable gate array (FPGA) program.

In Example 486, the subject matter of any one or more of Examples 481-485 optionally include wherein the computing unit comprises a central processing unit (CPU).

In Example 487, the subject matter of any one or more of Examples 481-486 optionally include wherein the computing unit comprises a processor core.

In Example 488, the subject matter of any one or more of Examples 481-487 optionally include wherein the computing unit comprises a CPU complex.

In Example 489, the subject matter of any one or more of Examples 481-488 optionally include wherein the computing unit comprises a field-programmable gate array (FPGA).

In Example 490, the subject matter of any one or more of Examples 481-489 optionally include wherein the computing unit comprises a graphics processing unit (GPU).

In Example 491, the subject matter of any one or more of Examples 481-490 optionally include wherein the means for determining the corresponding processing element that is used to process the packet comprise means for using a TCP offload engine to inspect the packet and identify the corresponding processing element.

In Example 492, the subject matter of any one or more of Examples 481-491 optionally include wherein the means for determining the timing of when the processing element is active in the computing unit comprise means for being synchronized with the computing unit.

In Example 493, the subject matter of Example 492 optionally includes wherein being synchronized with the computing unit is performed by using at least one of: IEEE 1588 Precision Time Protocol, IEEE 802.1 Time-Sensitive Networking, Synchronous Ethernet, Network Time Protocol, or Precision Time Measurement.

In Example 494, the subject matter of any one or more of Examples 481-493 optionally include wherein the means for determining the timing of when the processing element is active in the computing unit comprise means for interfacing with the computing unit to determine when the processing element is active.

In Example 495, the subject matter of Example 494 optionally includes wherein the computing unit is a processor core, and wherein the means for interfacing with the computing unit comprise means for receiving an indication of the contents of a cache operated by the computing unit.

In Example 496, the subject matter of Example 495 optionally includes wherein the indication of the contents of the cache are provided by a memory management unit (MMU).

In Example 497, the subject matter of any one or more of Examples 494-496 optionally include wherein the computing unit is an FPGA, and wherein the means for interfacing with the computing unit comprise means for communicating with an FPGA interface to determine whether the processing element is active in the computing unit.

In Example 498, the subject matter of Example 497 optionally includes wherein the FPGA interface maintains a record of which FPGA programs have been loaded in the FPGA.

In Example 499, the subject matter of any one or more of Examples 481-498 optionally include wherein the means for modifying the priority of the packet in the queue based on the timing of when the processing element is active in the computing unit comprise means for increasing the priority of the packet when the processing element is active or will be active soon in the computing unit.

In Example 500, the subject matter of Example 499 optionally includes wherein the means for increasing the priority of the packet comprise means for including that the processing element is active or will be active soon with at least one factor selected from the list of: a packet priority and a round robin order.

In Example 501, the subject matter of any one or more of Examples 499-500 optionally include wherein the means for determining the timing of when the processing element is active in the computing unit comprise means for interfacing with the computing unit to determine when the processing element is active.

In Example 502, the subject matter of Example 501 optionally includes wherein the computing unit is a processor core, and wherein the means for interfacing with the computing unit comprise means for receiving an indication of the contents of a cache operated by the computing unit.

In Example 503, the subject matter of Example 502 optionally includes wherein the indication of the contents of the cache are provided by a memory management unit (MMU).

In Example 504, the subject matter of any one or more of Examples 501-503 optionally include wherein the computing unit is an FPGA, and wherein the means for interfacing with the computing unit comprise means for communicating with an FPGA interface to determine when the processing element is active in the computing unit.

In Example 505, the subject matter of Example 504 optionally includes wherein the FPGA interface maintains a record of which FPGA programs have been loaded in the FPGA.

In Example 506, the subject matter of any one or more of Examples 481-505 optionally include wherein the means for modifying the priority of the packet in the queue based on the timing of when the processing element is active in the computing unit comprise means for decreasing the priority of the packet when the processing element is not active or will not be active soon in the computing unit.

In Example 507, the subject matter of Example 506 optionally includes wherein the means for decreasing the priority of the packet comprise means for including that the processing element is not active with at least one factor selected from the list of: a packet priority and a round robin order.

In Example 508, the subject matter of any one or more of Examples 481-507 optionally include wherein the means for modifying the priority of the packet in the queue based on whether the processing element is active in the computing unit comprise: means for determining whether to drop the packet from the queue when the processing element is not active or will not be active soon in the computing unit; and means for dropping the packet from the queue based on the determination.

In Example 509, the subject matter of Example 508 optionally includes wherein the means for determining whether to drop the packet from the queue comprise means for including that the processing element is not active or will not be active soon with at least one factor selected from the list of: an inverse packet priority and a round robin order.

Example 510 is at least one machine-readable medium including instructions for implementing time-based flexible packet scheduling, which when executed by a machine, cause the machine to: determine from analyzing a packet, a corresponding processing element that is used to process the packet; store the packet in a queue; determine a timing of when the processing element is active in a computing unit; and modify the priority of the packet in the queue based on the timing of when the processing element is active in the computing unit.

In Example 511, the subject matter of Example 510 optionally includes wherein the processing element comprises a computing process.

In Example 512, the subject matter of any one or more of Examples 510-511 optionally include wherein the processing element comprises a thread.

In Example 513, the subject matter of any one or more of Examples 510-512 optionally include wherein the processing element comprises a virtual machine.

In Example 514, the subject matter of any one or more of Examples 510-513 optionally include wherein the processing element comprises a program in a field-programmable gate array (FPGA) program.

In Example 515, the subject matter of any one or more of Examples 510-514 optionally include wherein the computing unit comprises a central processing unit (CPU).

In Example 516, the subject matter of any one or more of Examples 510-515 optionally include wherein the computing unit comprises a processor core.

In Example 517, the subject matter of any one or more of Examples 510-516 optionally include wherein the computing unit comprises a CPU complex.

In Example 518, the subject matter of any one or more of Examples 510-517 optionally include wherein the computing unit comprises a field-programmable gate array (FPGA).

In Example 519, the subject matter of any one or more of Examples 510-518 optionally include wherein the computing unit comprises a graphics processing unit (GPU).

In Example 520, the subject matter of any one or more of Examples 510-519 optionally include wherein the instructions to determine the corresponding processing element that is used to process the packet comprise instructions to use a TCP offload engine to inspect the packet and identify the corresponding processing element.

In Example 521, the subject matter of any one or more of Examples 510-520 optionally include wherein the instructions to determine the timing of when the processing element is active in the computing unit comprise instructions to being synchronized with the computing unit.

In Example 522, the subject matter of Example 521 optionally includes wherein being synchronized with the computing unit is performed by using at least one of: IEEE 1588 Precision Time Protocol, IEEE 802.1 Time-Sensitive Networking, Synchronous Ethernet, Network Time Protocol, or Precision Time Measurement.

In Example 523, the subject matter of any one or more of Examples 510-522 optionally include wherein the instructions to determine the timing of when the processing element is active in the computing unit comprise instructions to interface with the computing unit to determine when the processing element is active.

In Example 524, the subject matter of Example 523 optionally includes wherein the computing unit is a processor core, and wherein the instructions to interface with the computing unit comprise instructions to receive an indication of the contents of a cache operated by the computing unit.

In Example 525, the subject matter of Example 524 optionally includes wherein the indication of the contents of the cache are provided by a memory management unit (MMU).

In Example 526, the subject matter of any one or more of Examples 523-525 optionally include wherein the computing unit is an FPGA, and wherein the instructions to interface with the computing unit comprise instructions to communicate with an FPGA interface to determine whether the processing element is active in the computing unit.

In Example 527, the subject matter of Example 526 optionally includes wherein the FPGA interface maintains a record of which FPGA programs have been loaded in the FPGA.

In Example 528, the subject matter of any one or more of Examples 510-527 optionally include wherein the instructions to modify the priority of the packet in the queue based on the timing of when the processing element is active in the computing unit comprise instructions to increase the priority of the packet when the processing element is active or will be active soon in the computing unit.

In Example 529, the subject matter of Example 528 optionally includes wherein the instructions to increase the priority of the packet comprise instructions to include that the processing element is active or will be active soon with at least one factor selected from the list of: a packet priority and a round robin order.

In Example 530, the subject matter of any one or more of Examples 528-529 optionally include wherein the instructions to determine the timing of when the processing element is active in the computing unit comprise instructions to interface with the computing unit to determine when the processing element is active.

In Example 531, the subject matter of Example 530 optionally includes wherein the computing unit is a processor core, and wherein the instructions to interface with the computing unit comprise instructions to receive an indication of the contents of a cache operated by the computing unit.

In Example 532, the subject matter of Example 531 optionally includes wherein the indication of the contents of the cache are provided by a memory management unit (MMU).

In Example 533, the subject matter of any one or more of Examples 530-532 optionally include wherein the computing unit is an FPGA, and wherein the instructions to interface with the computing unit comprise instructions to communicate with an FPGA interface to determine when the processing element is active in the computing unit.

In Example 534, the subject matter of Example 533 optionally includes wherein the FPGA interface maintains a record of which FPGA programs have been loaded in the FPGA.

In Example 535, the subject matter of any one or more of Examples 510-534 optionally include wherein the instructions to modify the priority of the packet in the queue based on the timing of when the processing element is active in the computing unit comprise instructions to decrease the priority of the packet when the processing element is not active or will not be active soon in the computing unit.

In Example 536, the subject matter of Example 535 optionally includes wherein the instructions to decrease the priority of the packet comprise instructions to include that the processing element is not active with at least one factor selected from the list of: a packet priority and a round robin order.

In Example 537, the subject matter of any one or more of Examples 510-536 optionally include wherein the instructions to modify the priority of the packet in the queue based on whether the processing element is active in the computing unit comprise instructions to: determine whether to drop the packet from the queue when the processing element is not active or will not be active soon in the computing unit; and drop the packet from the queue based on the determination.

In Example 538, the subject matter of Example 537 optionally includes wherein the instructions to determine whether to drop the packet from the queue comprise instructions to include that the processing element is not active or will not be active soon with at least one factor selected from the list of: an inverse packet priority and a round robin order.

Example 539 is at least one machine-readable medium including instructions, which when executed by a machine, cause the machine to perform operations of any of the operations of Examples 1-538.

Example 540 is an apparatus comprising means for performing any of the operations of Examples 1-538.

Example 541 is a system to perform the operations of any of the Examples 1-538.

Example 542 is a method to perform the operations of any of the Examples 1-538.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network interface device for implementing flexible packet processing, the network interface device comprising:
   a packet parser to:
   receive a packet; and
   determine from analyzing the packet, a corresponding processing element that is used to process the packet, wherein the processing element includes at least one of a virtual machine or a field-programmable gate array (FPGA) program; and
   a coordinator circuit to:
   determine whether the processing element is not loaded in a computing unit, the computing unit separate from the network interface device and accessible to the network interface device over an interconnect channel, and the computing unit including a cache that is, at least partially, controlled by the network interface device;
   load and initiate execution of the processing element into the computing unit for processing the packet when the processing element is not loaded; and
   forward the packet to the processing element.

2. The device of claim 1, wherein the processing element comprises a computing process.

3. The device of claim 1, wherein the computing unit comprises a central processing unit (CPU).

4. The device of claim 1, wherein to determine whether the processing element is not loaded in the computing unit, the coordinator circuit is to interface with the computing unit to determine whether the processing element is not loaded.

5. The device of claim 4, wherein the computing unit is a processor core, and wherein to interface with the computing unit, the coordinator circuit is to receive an indication of the contents of a cache operated by the computing unit.

6. The device of claim 5, wherein the indication of the contents of the cache are provided by a memory management unit (MMU).

7. The device of claim 4, wherein the computing unit is an FPGA, and wherein to interface with the computing unit, the coordinator circuit is to communicate with an FPGA interface to determine whether the processing element is not loaded in the computing unit.

8. The device of claim 7, wherein the FPGA interface maintains a record of which FPGA programs have been loaded in the FPGA.

9. The device of claim 1, wherein the computing unit is a processor core, and wherein to load the processing element when it is not loaded, the coordinator circuit is to store instructions and data in a cache of the processor core to process the packet.

10. The device of claim 9, wherein to store instructions and data in the cache of the processor core, the coordinator circuit is to pass an address to a cache controller of the processor core.

11. The device of claim 9, wherein the cache includes a general use portion controlled by the processor core, and a reserved portion controlled by the network interface device.

12. A method of flexible packet processing, the method comprising:
    receiving a packet at a network interface device;
    determining from analyzing the packet, a corresponding processing element that is used to process the packet, wherein the processing element includes at least one of a virtual machine or a field-programmable gate array (FPGA) program;
    determining whether the processing element is not loaded in a computing unit, which is separate from the network interface device and accessible to the network interface device over an interconnect channel, the computing unit including a cache that is, at least partially, controlled by the network interface device;
    loading and initiating execution of the processing element into the computing unit for processing the packet when the processing element is not loaded; and
    forwarding the packet to the processing element.

13. The method of claim 12, wherein the processing element comprises a thread.

14. The method of claim 12, wherein the computing unit is a processor core, and wherein loading the processing element when it is not loaded comprises storing instructions and data in a cache of the processor core to process the packet.

15. The method of claim 14, wherein storing instructions and data in the cache of the processor core comprises passing an address to a cache controller of the processor core.

16. The method of claim 14, wherein the cache includes a general use portion controlled by the processor core, and a reserved portion controlled by the network interface device.

17. The method of claim 14, wherein storing the instructions and data comprises storing the instructions and data in the general use portion controlled by the processor core.

18. The method of claim 14, wherein storing the instructions and data comprises storing the instructions and data in the reserved portion controlled by the network interface device.

19. The method of claim 18, further comprising evicting content from the reserved portion of the cache.

20. The method of claim 19, wherein evicting content from the reserved portion of the cache comprises:
    determining a priority of existing instructions loaded in the reserved portion of cache;
    determining a priority of instructions that are inactive and would need to be loaded into the reserved portion of cache to process the packet; and
    evicting the existing instructions loaded in the reserved portion of cache when the priority of the existing instructions is lower than the priority of the inactive instructions.

21. At least one non-transitory machine-readable medium including instructions for implementing flexible packet processing, which when executed by a machine, cause the machine to:

receive a packet at a network interface device;
determine from analyzing the packet, a corresponding processing element that is used to process the packet, wherein the processing element includes at least one of a virtual machine or a field-programmable gate array (FPGA) program;
determine whether the processing element is not loaded in a computing unit, which is separate from the network interface device and accessible to the network interface device over an interconnect channel, the computing unit including a cache that is, at least partially, controlled by the network interface device;
load and initiate execution of the processing element into the computing unit for processing the packet when the processing element is not loaded; and
forward the packet to the processing element.

22. The non-transitory medium of claim 21, wherein the computing unit is a processor core, and wherein the instructions to load the processing element when it is not loaded comprise instructions to:
identify a statistical profile of the packet;
assign a priority to the packet based on the statistical profile; and
store instructions and data in a cache of the processor core to process the packet when the priority of the packet is higher than a priority of instructions in the cache.

\* \* \* \* \*